US011987915B2

(12) United States Patent
Chang et al.

(10) Patent No.: US 11,987,915 B2
(45) Date of Patent: *May 21, 2024

(54) FOAMED ARTICLES AND METHODS OF MAKING THE SAME

(71) Applicant: NIKE, Inc., Beaverton, OR (US)

(72) Inventors: Yihua Chang, Portland, OR (US); Lyle R. Hanson, Beaverton, OR (US); Petr Khlyabich, Beaverton, OR (US); Richard L. Watkins, Portland, OR (US)

(73) Assignee: NIKE, INC., Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/647,021

(22) Filed: Jan. 5, 2022

(65) Prior Publication Data
US 2023/0091558 A1 Mar. 23, 2023

Related U.S. Application Data

(60) Provisional application No. 63/246,486, filed on Sep. 21, 2021.

(51) Int. Cl.
C08J 9/35 (2006.01)
C08J 9/00 (2006.01)
(Continued)

(52) U.S. Cl.
CPC ........ D04H 1/43916 (2020.05); C08J 9/0061 (2013.01); C08J 9/122 (2013.01);
(Continued)

(58) Field of Classification Search
CPC ...... A43B 13/04; A43B 13/187; A43D 95/06; B29C 44/3453; B29D 35/122;
(Continued)

(56) References Cited

U.S. PATENT DOCUMENTS 6,461,725 B1 10/2002 Kanada et al.
9,956,732 B2 5/2018 Murphy et al.
(Continued)

FOREIGN PATENT DOCUMENTS

CN 105246956 A 1/2016
CN 108928086 A 12/2018
(Continued)

OTHER PUBLICATIONS

International Search Report and Written Opinion for PCT/US2022/011210, dated Jun. 3, 2022.
(Continued)

Primary Examiner — Lawrence D Ferguson
(74) Attorney, Agent, or Firm — THOMAS | HORSTEMEYER, LLP

(57) ABSTRACT

Foamed articles including a foamed thermoplastic elastomeric material, methods of making the articles, and methods for manufacturing articles of footwear, apparel, and athletic equipment incorporating the articles are provided. One exemplary method for making a foamed article comprises placing an article comprising a foamable fibrous element and carbon dioxide in a vessel, the foamable fibrous element comprising a plurality of filaments, fibers, and/or yarns, wherein each member of the plurality comprises a foamable material; maintaining the vessel at a first pressure and first temperature at which the carbon dioxide is a liquid and carbon dioxide is soluble in the foamable material; optionally exposing the infused article to a second temperature and second pressure; and subjecting the article to a third pressure and third temperature at which the infused carbon dioxide phase transitions to a gas, thereby expanding the foamable material into a foamed material and forming the foamed article.

20 Claims, 24 Drawing Sheets

(51) Int. Cl.
*C08J 9/12* (2006.01)
*D04H 1/4391* (2012.01)

(52) U.S. Cl.
CPC .............. *C08J 9/35* (2013.01); *C08J 2203/06* (2013.01); *C08J 2323/08* (2013.01); *C08J 2329/04* (2013.01); *C08J 2375/04* (2013.01)

(58) Field of Classification Search
CPC ................ B29D 35/126; B29D 35/142; B29K 2021/003; B29L 2031/50; B29L 2031/52; C08J 2201/032; C08J 2203/06; C08J 2300/22; C08J 2300/26; C08J 9/122
See application file for complete search history.

(56) References Cited

U.S. PATENT DOCUMENTS

| | | |
|---|---|---|
| 11,685,816 B2 | 6/2023 | Chang et al. |
| 2005/0031816 A1 | 2/2005 | Chang et al. |
| 2009/0130420 A1 | 5/2009 | Thiagarajan et al. |
| 2009/0148665 A1 | 6/2009 | Thiagarajan et al. |
| 2010/0029793 A1 | 2/2010 | Witt et al. |
| 2010/0222442 A1 | 9/2010 | Prissok et al. |
| 2013/0324629 A1 | 12/2013 | Kanada et al. |
| 2014/0259329 A1 | 9/2014 | Watkins et al. |
| 2014/0259753 A1 | 9/2014 | Watkins et al. |
| 2014/0275306 A1 | 9/2014 | Watkins et al. |
| 2016/0075113 A1 | 3/2016 | Chang et al. |
| 2016/0137806 A1 | 5/2016 | Kumar et al. |
| 2018/0213885 A1 | 8/2018 | Darland |
| 2018/0237605 A1 | 8/2018 | Chang et al. |
| 2018/0273718 A1 | 9/2018 | Luo et al. |
| 2018/0290348 A1 | 10/2018 | Su |
| 2019/0308346 A1 | 10/2019 | Farris et al. |
| 2020/0281314 A1 | 9/2020 | Stockbridge et al. |
| 2020/0291199 A1 | 9/2020 | Bi et al. |
| 2020/0390188 A1 | 12/2020 | Cass |
| 2021/0138734 A1 | 5/2021 | Maben et al. |
| 2021/0148017 A1 | 5/2021 | Baranek et al. |
| 2022/0212377 A1 | 7/2022 | Chang et al. |

FOREIGN PATENT DOCUMENTS

| | | |
|---|---|---|
| EP | 1008637 A2 | 6/2000 |
| EP | 1935621 A1 | 6/2008 |
| EP | 3429386 A1 | 1/2019 |
| JP | H11170288 A | 6/1999 |
| TW | I614293 B | 2/2018 |
| WO | 2000018557 A1 | 4/2000 |
| WO | 2002078824 A1 | 10/2002 |
| WO | 2015177571 A1 | 11/2015 |
| WO | 2017075131 A1 | 5/2017 |
| WO | 2018222968 A1 | 12/2018 |
| WO | 2021076599 A1 | 4/2021 |

OTHER PUBLICATIONS

International Search Report and Written Opinion for PCT/US2022/011221, dated Jun. 3, 2022.
International Search Report and Written Opinion for PCT/US2022/011223, dated Jun. 28, 2022.
International Preliminary Report on Patentability for PCT/US2022/070027, dated Oct. 6, 2022.
International Search Report and Written Opinion for PCT/US2022/070045, dated Sep. 8, 2022.
Written Opinion of the International Preliminary Examining Authority for PCT/US2022/070045, dated Feb. 28, 2023.
International Preliminary Report on Patentability for PCT/US2022/070034, dated Feb. 28, 2023.
International Preliminary Report on Patentability for PCT/US2022/011223, dated Mar. 15, 2023.
Written Opinion of the International Preliminary Examining Authority for PCT/US2022/011210, dated Apr. 3, 2023.
Written Opinion of the International Preliminary Examining Authority for PCT/US2022/011221, dated Apr. 3, 2023.
Written Opinion of the International Preliminary Examining Authority for PCT/US2022/070034, dated Nov. 16, 2022.
International Preliminary Report on Patentability for PCT/US2022/070032, dated Nov. 17, 2022.
International Preliminary Report on Patentability for PCT/US2022/011208, dated Nov. 23, 2022.
International Preliminary Report on Patentability for PCT/US2022/070031, dated Nov. 29, 2022.
International Search Report and Written Opinion for PCT/US2022/070027, dated Mar. 17, 2022.
International Search Report and Written Opinion for PCT/US2022/070031, dated Mar. 18, 2022.
International Search Report and Written Opinion for PCT/US2022/011208, dated Mar. 22, 2022.
International Search Report and Written Opinion for PCT/US2022/070032, dated Apr. 26, 2022.
International Search Report and Written Opinion for PCT/US2022/070034, dated Apr. 19, 2022.
International Preliminary Report on Patentability for PCT/US2022/070045, mailed Aug. 29, 2023.
Overview of materials for Ethylene Vinyl Alcohol (EVOH) flyer, 3 pages.
Shore (Durometer) Hardness Testing of Plastics, MatWeb Material Property Data, 3 pages.
Shore (Durometer) Hardness Testing of Plastics, MatWeb Materials Property Data, 3 pages.
International Preliminary Report on Patentability for PCT/US2022/011221, mailed Dec. 13, 2023.
International Preliminary Report on Patentability for PCT/US2022/011210, mailed Dec. 20, 2023.

FIG. 1A
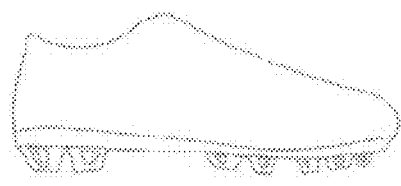
FIG. 1B
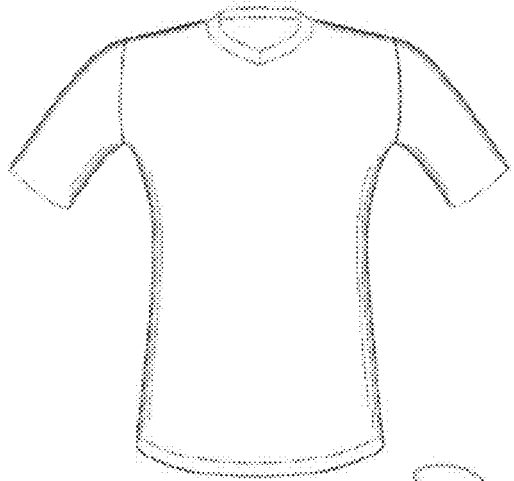
FIG. 1C
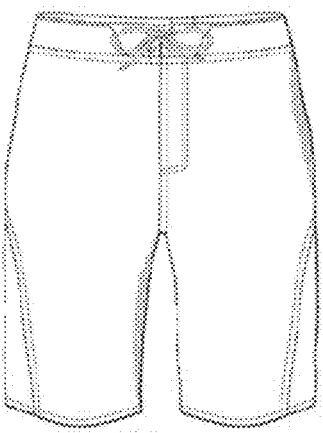
FIG. 1D
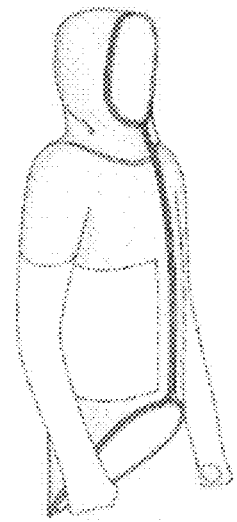
FIG. 1E
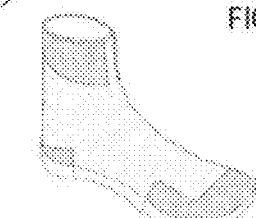
FIG. 1F
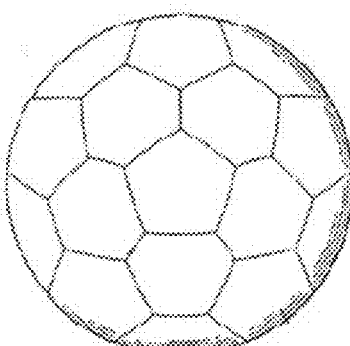
FIG. 1G
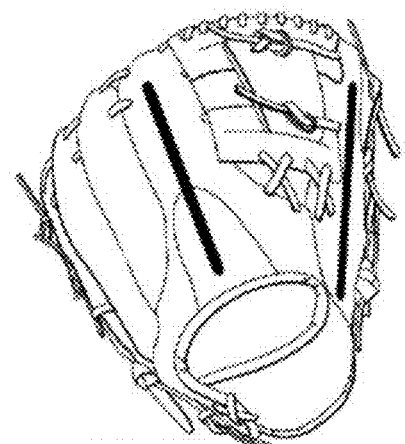
FIG. 1H
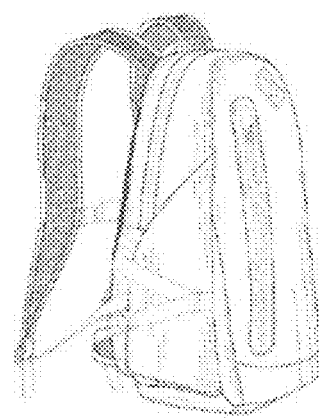
FIG. 1I
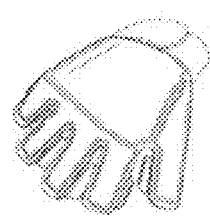
FIG. 1J
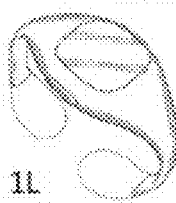
FIG. 1K
FIG. 1L
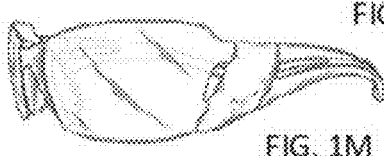
FIG. 1M

FOAMED ARTICLES AND METHODS OF MAKING THE SAME

CROSS REFERENCE TO RELATED APPLICATIONS

This application claims the benefit of U.S. Provisional Application No. 63/246,486 filed on Sep. 21, 2021, which is incorporated herein by reference in its entirety.

TECHNICAL FIELD

The present disclosure is directed to foamed articles. More specifically, the present disclosure relates to foamed articles including a foamed thermoplastic elastomeric material, methods of making such foamed articles, and method for manufacturing articles of footwear including such foamed articles.

BACKGROUND

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

BRIEF DESCRIPTION OF THE DRAWINGS

Further aspects of the present disclosure will be readily appreciated upon review of the detailed description, described below, when taken in conjunction with the accompanying drawings.

DESCRIPTION

Figure 1N:
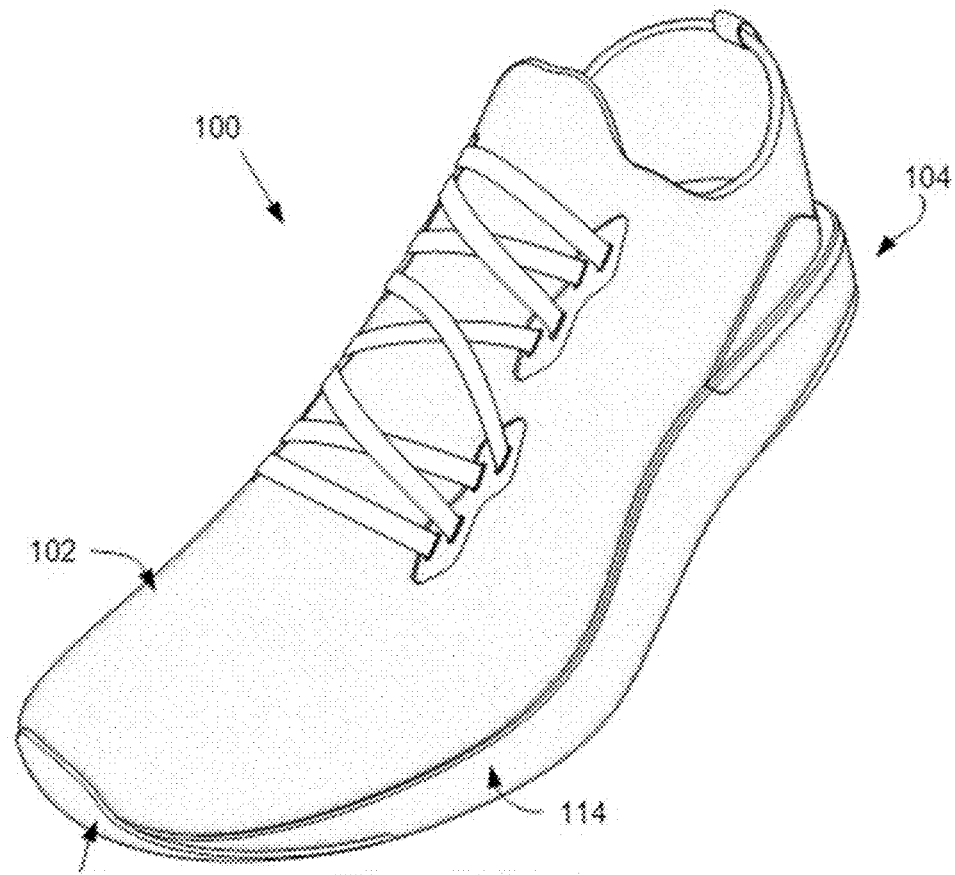
FIGS. 1A-1M illustrate various articles of footwear, apparel, and athletic equipment, including containers, electronic equipment, and vision wear, that are or comprise foamed articles in accordance with the present disclosure, while FIGS. 1N(a)-1Q(e) illustrate additional details regarding different types of footwear.
Figure 1N:
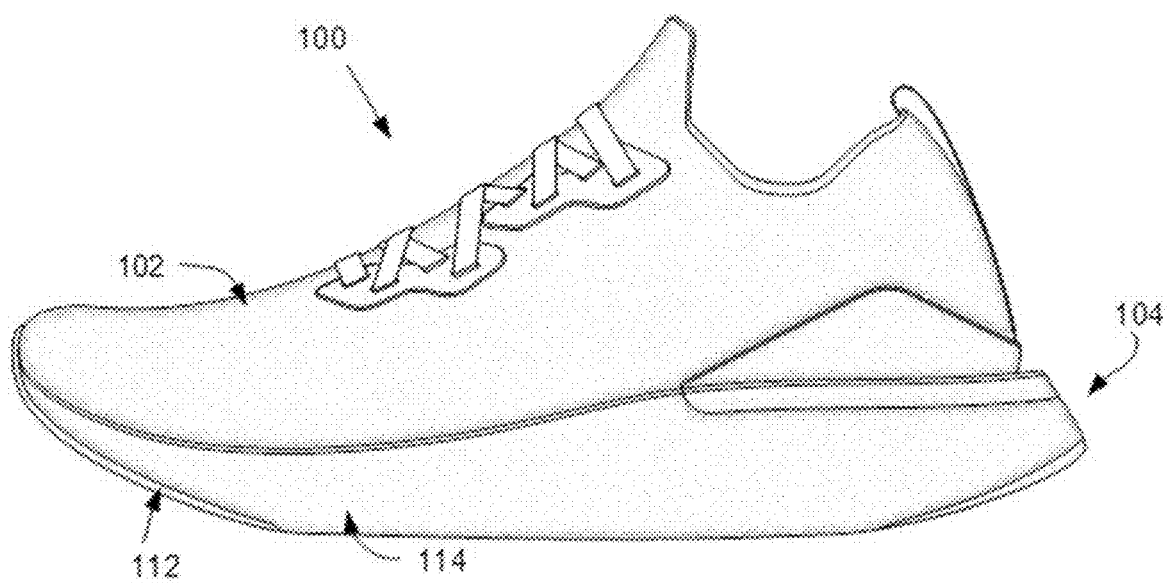

New foamed articles including a foamed thermoplastic elastomeric material and methods for making such foamed articles have been identified. The methods described herein include a step of infusing carbon dioxide into a solid foamable material of an article, i.e., a solid article. Following the infusing, the infused solid foamable material is foamed without thermally softening the solid foamable material by expanding the infused carbon dioxide, e.g., by phase transitioning the infused carbon dioxide to carbon dioxide gas, which in turn expands the solid foamable material into a foamed material into a foam, e.g., a foam having a multi-cellular foam structure. In this way, the solid foamable material is physically foamed without being melted in the process. The foamed articles described herein include one or more foamed materials which are physically foamed materials. It has been found that these physically foamed materials, which comprise a thermoplastic elastomeric material as described herein have a low density, a uniform multi-cellular foam structure, and/or other beneficial properties making the foamed materials suitable for use in many mass-produced consumer products, including articles of apparel, footwear, and sporting equipment. FIGS. 1A-1M illustrate various articles of footwear, apparel, and athletic equipment, including containers, electronic equipment, and vision wear, that are or comprise foamed articles in accordance with the present disclosure, while FIGS. 1N(a)-1Q(e) illustrate additional details regarding different types of footwear.

It has also been found that the multi-step foaming processes described herein can be easily adapted for use with conventional materials and manufacturing lines, as they use simpler, less expensive and more energy-efficient equipment and processes than other physical foaming processes. For example, maintaining the carbon dioxide as a liquid and holding the solid foamable material in the liquid carbon dioxide requires maintaining less extreme temperatures and pressures (and thus requires less expensive, more energy-efficient equipment) than using supercritical carbon dioxide to infuse the solid foamable material. In many aspects, the step of expanding the solid foamable material into the foamed material can be conducted at or near atmospheric pressure and at relatively low temperatures well below the melting temperature of the foamable material, and so can be conducted using simple, inexpensive heating methods and equipment, making the overall foaming process efficient and cost-effective. Additionally, the present disclosure can be applied to a wide range of solid foamable materials, and to articles have a number of different geometries, including but not limited to sheets of solid foamable material(s). Further, by using articles comprising two or more types of solid foamable materials, articles comprising two or more portion or regions of solid foamable material, and articles comprising a combination of one or more solid foamable material and one or more solid non-foamable material, and/or by varying the processing conditions, the processes for foaming solid articles described herein can be adapted to selectively foam portions or regions of an article without the need for additional tooling or equipment.

Using a foamed thermoplastic elastomeric material in the foamed articles disclosed herein can reduce the weight or density of the articles as compared to articles without foamed materials, i.e., articles comprising only solid materials. Additionally or alternatively, by using a foamed material in place of an unfoamed material, the total amount of material needed to provide the same volume is reduced, reducing material costs and making the foamed article more sustainable as compared to a comparable article without foamed material. Furthermore, by using a foamed thermoplastic elastomeric material, alone or in combination with one or more additional thermoplastic material, to form the foamed article, components of the foamed article or the entire foamed article can comprise recycled thermoplastic materials, and, in turn, the components or the entire foamed article can be recycled themselves. In some aspect, by controlling the foaming conditions and, optionally, controlling the optional stabilization process, the overall volume of the foamed article may be increased within a predicted or pre-determined range. The increase in volume can be relatively small, for example, an increase in volume of less than 10 percent, or less than 5 percent, as compared to the total volume of the article prior to undergoing the foaming process Alternatively, the increase in volume can be relatively large, for example, an increase in volume of greater than 20 percent, or greater than 40 percent as compared to the total volume of the article prior to undergoing the foaming process.

In some aspects, the foamed material of the foamed article is a stabilized foam material which has undergone a stabilization process. In some aspects, the foamed article includes layers or regions of foamed material adjacent to layers or regions of solid (i.e., unfoamed) material. In some aspects, the foamed article can be a cushioning element, such as a fluid-filled bladder. In some aspects, the thermoplastic elastomeric material can comprise one or more thermoplastic polyurethanes. In some aspects, in addition to the thermoplastic elastomeric material, the foamed article can further include a second material, such as a second thermoplastic material, including a second thermoplastic material which does not foam during the foaming process.

In one aspect, the present disclosure is directed to a method for making a foamed article. The foaming process as disclosed herein is a multi-step process which includes first infusing a solid foamable material with carbon dioxide, and then exposing the infused article to conditions which cause the carbon dioxide infused in the solid foamable material to undergo a phase change, which expands and foams the solid foamable material into a foamed material. Optionally, prior to the foaming step, the infused article can be exposed to and held (e.g., stored) at a pressure and temperature at which the infused carbon dioxide remains infused in the article, allowing the infused article to be foamed at a later time. Alternatively, the infused article can be exposed to and held conditions at which a portion of the infused carbon dioxide diffuses out of it, for a duration of time to allow diffusion of carbon dioxide out of a selected portion of the infused article. In this manner, infused carbon dioxide can be removed from selected regions or portions of the article prior to foaming, which results in only selected regions or portions of the article foaming when exposed to the foaming conditions. Optionally, after undergoing foaming, the foamed article can be stabilized to release residual carbon dioxide and/or to release residual stress in the article.

In another aspect, the present disclosure is directed to a foamed article. The foamed article comprises or consists essentially of a foamed material, wherein the foamed material is a physically-expanded foam formed of a thermoplastic elastomeric material comprising one or more first thermoplastic elastomers. The foamed material is the product of infusing carbon dioxide into a solid foamable comprising the thermoplastic elastomeric material, and producing a phase change causing the infused carbon dioxide to expand, thereby foaming the solid foamable material into the foamed material without thermally softening the solid foamable material. Optionally, the foamed article can comprise additional foamed materials, or additional unfoamed materials. Optionally, the foamed article can be a stabilized foam article, from which residual carbon dioxide has been removed, or from which residual stresses created during the foaming process have been reduced or removed.

In one aspect, disclosed herein is a method for making a foamed article, the method comprising:

placing an article and carbon dioxide in a vessel, wherein the article comprises a foamable fibrous element comprising or consisting essentially of a first plurality of filaments, fibers, or yarns, or any combination thereof, wherein each of the first plurality of filaments, fibers, yarns, or any combination thereof, individually comprises or consists essentially of a solid foamable material which is a thermoplastic elastomeric material comprising one or more first thermoplastic elastomers;

after the placing, maintaining the vessel at a first pressure and a first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the foamable fibrous element of the article, thereby forming an infused article;

following the maintaining and holding, optionally exposing the infused article to a second pressure and second temperature at which the carbon dioxide remains infused within at least a portion of the solid foamable material of the foamable fibrous element;

following the maintaining and holding and the optional exposing, subjecting the article to a third pressure and third temperature at which the carbon dioxide infused in the solid foamable material of the foamable fibrous element phase transitions to a gas, thereby expanding the solid foamable material of the foamable fibrous element into a foamed material and forming the foamed article including a foamed foamable fibrous element.

In some aspects, following the subjecting and expanding, the method optionally comprises bringing the foamed article to a fourth temperature and a fourth pressure and holding the foamed article at or below the fourth temperature, the fourth pressure, or both, for a duration of time. In another aspect, following the subjecting and expanding or following the optional bringing, the method further comprises stabilizing the foamed article at a fifth pressure and fifth temperature at which the carbon dioxide diffuses out of the foamed material of the foamed article while maintaining the foamed material in a foam structure, forming a stabilized foamed article.

In another aspect, disclosed herein is a foamed article manufactured by the disclosed method.

In yet another aspect, disclosed herein is a foamed article comprising a foamed material which is a physically-expanded foam formed of a thermoplastic elastomeric material comprising one or more first thermoplastic elastomers. In one aspect, the foamed article is manufactured by the disclosed method.

The present disclosure can be described in accordance with the following numbered aspects, which should not be confused with the claims.

In accordance with Aspect 1, the present disclosure is directed to a method for making a foamed article, the method comprising:

placing an article and carbon dioxide ($CO_2$) in a vessel, wherein the article comprises a foamable fibrous element comprising or consisting essentially of a first plurality of filaments, fibers, yarns, or any combination thereof, wherein each of the first plurality of filaments, fibers, yarns, or any combination thereof, individually comprises or consists essentially of a solid foamable material which is a thermoplastic elastomeric material comprising one or more first thermoplastic elastomers;

after the placing, maintaining the vessel at a first pressure and first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the solid foamable material of the foamable fibrous element, thereby forming an infused article;

following the maintaining and holding, optionally exposing the infused article to a second pressure and second temperature at which the carbon dioxide remains infused within at least a portion of the solid foamable material of the foamable fibrous element;

following the maintaining and holding and the optional exposing, subjecting the infused article to a third pressure and third temperature at which the carbon dioxide infused in the solid foamable material of the foamable fibrous element phase transitions to a gas, thereby expanding the solid foamable material of the foamable fibrous element into a foamed material and forming the foamed article including a foamed foamable fibrous element.

In accordance with Aspect 2, the present disclosure is directed to the method of Aspect 1, further comprising following the subjecting and expanding, bringing the foamed article to a fourth temperature and fourth pressure, and holding the foamed article at or below the fourth temperature, the fourth pressure, or both, for a duration of time.

In accordance with Aspect 3, the present disclosure is directed to the method of Aspect 1 or 2, further comprising following the subjecting and expanding or following the optional bringing, stabilizing the foamed article at a fifth pressure and fifth temperature at which the carbon dioxide diffuses out of the foamed material of the foamed article while maintaining the foamed material in a foam structure, forming a stabilized foamed article.

In accordance with Aspect 4, the present disclosure is directed to the method of Aspect 3, wherein the stabilizing comprises holding the foamed article at the fifth pressure and fifth temperature for a duration of time sufficient to remove substantially all of the carbon dioxide from the foamed material.

In accordance with Aspect 5, the present disclosure is directed to the method of any one of the preceding Aspects, wherein, at the first pressure and temperature, the liquid carbon dioxide is soluble in the solid foamable material at a concentration of from about 1 weight percent to about 30 weight percent, optionally from about 5 weight percent to about 20 weight percent.

In accordance with Aspect 6, the present disclosure is directed to the method of any one of the preceding Aspects, wherein the foamed material of the foamed article is substantially opaque.

In accordance with Aspect 7, the present disclosure is directed to, the method of any one of the preceding Aspects, wherein the foamed material has a split-tear value of from about 2.5 kilograms per centimeter to about 3.0 kilograms per centimeter.

In accordance with Aspect 8, the present disclosure is directed to, the method of any one of the preceding Aspects, wherein the foamed material has an Asker C hardness of from about 10 to about 50.

In accordance with Aspect 9, the present disclosure is directed to the method of any one of the preceding Aspects, wherein the foamable fibrous element comprises:

a first yarn comprising a core and a solid foamable material surrounding the core, optionally wherein the core comprises or consists essentially of a second solid foamable material.

In accordance with Aspect 10, the present disclosure is directed to the method of Aspect 9, wherein the solid foamable material is attached to the core.

In accordance with Aspect 11, the present disclosure is directed to the method of Aspect 10, wherein the solid foamable material substantially surrounds the core.

In accordance with Aspect 12, the present disclosure is directed to the method of Aspect 10, wherein the solid foamable material partially surrounds the core.

In accordance with Aspect 13, the present disclosure is directed to the method of any one of Aspects 9-12, wherein the core has a percent elongation of less than 30 percent, or of less than 25 percent, or from about 5 percent to about 25 percent.

In accordance with Aspect 14, the present disclosure is directed to the method of any one of Aspects 9-13, wherein the core has a breaking strength of at least 1.5 kilograms force per centimeter squared, or from about 1.5 to about 10 kilograms force per centimeter squared.

In accordance with Aspect 15, the present disclosure is directed to the method of any one of Aspects 9-13, wherein the core has a linear mass density from about 60 to about 70,000 denier, from about 100 to about 1,000 denier, or from about 150 to about 500 denier.

In accordance with Aspect 16, the present disclosure is directed to the method of any one of Aspects 9-13, wherein the core has a tenacity from about 1.5 to about 10.0 grams per denier, or from about 1.5 to about 4.0 grams per denier, or from about 2.5 to about 4.0 grams per denier.

In accordance with Aspect 17, the present disclosure is directed to the method of any one of Aspects 9-16, wherein the core includes a core yarn.

In accordance with Aspect 18, the present disclosure is directed to the method of Aspect 17, wherein the core yarn comprises a plurality of fibers or filaments, optionally wherein the core yarn is at least one of a spun yarn, a twisted yarn, and an entangled yarn.

In accordance with Aspect 19, the present disclosure is directed to the method of Aspect 17, wherein the core yarn is a monofilament yarn.

In accordance with Aspect 20, the present disclosure is directed to the method of Aspect 19, wherein the core material comprises a polyester, optionally wherein the polyester is a polyester terephthalate (PET).

In accordance with Aspect 21, the present disclosure is directed to the method of Aspect 20, wherein the core comprises an entangled multi-filament yarn.

In accordance with Aspect 22, the present disclosure is directed to the method of any one of Aspects 9-21, wherein the core has a cross-sectional diameter and the solid foamable material has an average thickness such that the cross-sectional diameter of the core is at least 3 times smaller than the average thickness of the solid foamable material.

In accordance with Aspect 23, the present disclosure is directed to the method of any one of Aspects 9-21, wherein the solid foamable material has an average thickness from about 0.4 millimeters to about 3.0 millimeters.

In accordance with Aspect 24, the present disclosure is directed to the method of any one of Aspects 9-23, wherein the yarn has an average cross-sectional diameter of less than about 4.0 millimeters.

In accordance with Aspect 25, the present disclosure is directed to the method of any one of the preceding Aspects, wherein the foamable fibrous element is a textile element or a portion of a textile element.

In accordance with Aspect 26, the present disclosure is directed to the method of Aspect 25, wherein the textile element comprises or consists essentially of a knit textile, a woven textile, a crocheted textile, a braided textile, a tatted textile, a non-woven textile, or any combination thereof.

In accordance with Aspect 27, the present disclosure is directed to the method of Aspect 26, wherein the textile element comprises a knit textile comprising a first area, wherein the first area comprises a first plurality of knit loops comprising a first yarn; wherein the first yarn comprises or consist essentially of a foamable material according to any one of Aspects 1-9.

In accordance with Aspect 28, the present disclosure is directed to the method of Aspect 27, wherein the textile element comprises a knit textile comprising a first area, wherein the first area comprises a first plurality of knit loops comprising the first yarn and a second plurality of loops comprising a second yarn, wherein the first yarn, or the second yarn, or both the first yarn and the second yarn comprise or consist essentially of a foamable material according to any one of Aspects 1-9.

In accordance with Aspect 29, the present disclosure is directed to the method of Aspect 28, wherein the first plurality of knit loops and the second plurality of knit loops are interlooped with each other in a knit structure.

In accordance with Aspect 30, the present disclosure is directed to the method of Aspect 26, wherein the textile element comprises a knit textile comprising a first area, wherein the first area comprises a plurality of knit loops comprising a first yarn; and a second yarn at least partially inlaid within the first area of the knit textile such that the second yarn extends between at least a first loop and a second loop of the plurality of knit loops, wherein the first yarn, the second yarn, or both the first yarn and the second yarn comprise or consist essentially of a foamable material according to any one of Aspects 1-9.

In accordance with Aspect 31, the present disclosure is directed to the method of any one of Aspects 27-30, wherein the second yarn includes a first portion that is exposed on a first surface in the first area.

In accordance with Aspect 32, the present disclosure is directed to the method of Aspect 31, wherein the first portion has a length that is greater than or equal to the length of a portion of a first course that includes at least three consecutive knit loops, the first course being in the first area.

In accordance with Aspect 33, the present disclosure is directed to the method of Aspect 31, where the second yarn additionally includes a second portion that is exposed on the first surface in the first area, and where the second yarn includes a covered portion extending from the first portion to the second portion.

In accordance with Aspect 34, the present disclosure is directed to the method of Aspect 33, where a length of the second portion is larger than a length of the first portion.

In accordance with Aspect 35, the present disclosure is directed to the method of Aspect 31, where a second course extends through a second area with a second surface, where the second yarn is at least partially interlooped or inlaid within the second course, and where the second yarn includes a second portion that is exposed on the second surface in the second area.

In accordance with Aspect 36, the present disclosure is directed to the method of Aspect 35, where the second portion of the second yarn includes a length that is larger than a length of the first portion of the second yarn.

In accordance with Aspect 37, the present disclosure is directed to the method of Aspect 36, wherein the textile element is a knit textile, and the first yarn is present in the knit structure of the knit textile, optionally wherein the first yarn is inlaid in the knit textile.

In accordance with Aspect 38, the present disclosure is directed to the method of any one of Aspects 33-37, the textile element further comprising a third yarn, optionally wherein the third yarn is inlaid between at least a first loop and a second loop of the knit textile, and optionally wherein the third yarn comprises or consists essentially of a foamable material according to any one of Aspects 1-8 or 76-103.

In accordance with Aspect 39, the present disclosure is directed to the method of Aspect 26, wherein the textile element comprises a non-woven textile.

In accordance with Aspect 40, the present disclosure is directed to the method of Aspect 39, wherein the non-woven textile comprises a felt or web structure comprising the first plurality of filaments, fibers, or yarns, wherein the first plurality of fibers, filaments, or yarns are bonded together.

In accordance with Aspect 41, the present disclosure is directed to the method of Aspect 40, wherein the first plurality of fibers, filaments, or yarns are bonded by chemical bonds, mechanical bonds, or any combination thereof.

In accordance with Aspect 42, the present disclosure is directed to the method of 41, wherein the chemical bonds, mechanical bonds, or combination thereof are formed using thermal welding, hydro-entanglement, ultrasonic welding, needlepunching, meltblowing, or any combination thereof, optionally wherein the thermal welding is achieved with calendering or without calendering, or optionally wherein the chemical bonds are achieved using a binder, optionally wherein the binder includes a polymeric emulsion, a polymeric dispersion, a polymeric solution, a polymeric fiber, or a polymeric powder.

In accordance with Aspect 43, the present disclosure is directed to the method of any one of Aspects 39-42, wherein the non-woven textile is produced from extruded fibers, optionally wherein the non-woven textile produced from extruded fibers is produced using a meltblowing process, a spunbonding process, or any combination thereof.

In accordance with Aspect 44, the present disclosure is directed to the method of any one of Aspects 25-43, wherein the textile element comprises a first yarn and a second yarn, and the first yarn and the second yarn are in contact with each other, wherein the first yarn, the second yarn, or both the first yarn and the second yarn comprise or consist essentially of a foamable material according to any one of Aspects 1-8 or 76-103.

In accordance with Aspect 45, the present disclosure is directed to the method of Aspect 44, wherein the first yarn is inlaid in the textile element.

In accordance with Aspect 46, the present disclosure is directed to the method of Aspect 26, wherein the textile element comprises a crocheted textile comprising a first area,
wherein the first area comprises a plurality of crocheted loops comprising a first yarn forming a first area of a crocheted textile; or comprises a plurality of crocheted loops comprising the first yarn and a second yarn, where the first yarn and the second yarn form the first area of the crocheted textile; or comprises a plurality of crocheted loops comprising the first yarn with the second yarn at least partially inlaid within the first area of the crocheted textile such that the second yarn extends between at least a first loop and a second loop of the plurality of crocheted loops; wherein the first yarn, the second yarn, or the first yarn and the second yarn comprise or consist essentially of a foamable material according to any one of Aspects 1-8 or 76-103.

In accordance with Aspect 47, the present disclosure is directed to the method of Aspect 46, wherein the first portion has a length that is greater than or equal to the length of a portion of a first course that includes at least three consecutive crocheted loops, the first course being in the first area In accordance with Aspect 48, the present disclosure is directed to the method of Aspect 46 or 47, wherein the second yarn is interlooped with the first yarn, forming a second crocheted course.

In accordance with Aspect 49, the present disclosure is directed to the method of any one of Aspects 46-48, the textile element further comprising a third yarn, optionally wherein the third yarn is interlooped with the first yarn, or is interlooped with the second yarn, or is interlooped with both the first and second yarn; or is inlaid between the first and second courses; optionally wherein the third yarn comprises or consists essentially of a foamable material according to any one of Aspects 1-8 or 76-103.

In accordance with Aspect 50, the present disclosure is directed to the method of Aspect 26, wherein the textile element comprises a woven textile.

In accordance with Aspect 51, the present disclosure is directed to the method of Aspect 50, wherein the woven textile comprises a plurality of warp yarns oriented along a first direction, forming a warp, wherein the plurality of warp yarns comprises or consists essentially of a foamable material according to any one of Aspects 1-8 or 76-103.

In accordance with Aspect 52, the present disclosure is directed to the method of Aspect 51, wherein the woven textile comprises a second plurality of yarns oriented along a second direction distinct from the first direction, forming a weft comprising a plurality of weft yarns, optionally wherein the warp and weft are oriented at approximately right angles from each other, optionally wherein the second plurality of yarns comprises or consists essentially of a foamable material according to any one of Aspects 1-8 or 76-103.

In accordance with Aspect 53, the present disclosure is directed to the method of Aspect 52, wherein the warp and weft are interwoven.

In accordance with Aspect 54, the present disclosure is directed to the method of Aspect 26, wherein the textile element comprises a braided textile, wherein the braided textile comprises a first yarn, optionally a second yarn, or optionally a first yarn, a second yarn, and a third yarn, and wherein the yarns are braided with each other, wherein the first yarn, or the second yarn, or the third yarn, or any combination thereof, comprises or consists essentially of a foamable material according to any one of Aspects 1-8 or 76-103.

In accordance with Aspect 55, the present disclosure is directed to the method of any one of Aspects 26-54, wherein the textile element comprises an embroidered region further comprising a yarn comprising the foamable material of any one of Aspects 1-8 or 76-103.

In accordance with Aspect 56, the present disclosure is directed to the method of any one of Aspects 1-38, wherein the textile element comprises a knit textile comprising a first fiber, a first filament, or a first yarn, and optionally a second fiber, second filament, or second yarn, optionally wherein the first fiber, first filament, or first yarn comprises or consists essentially of a foamable material according to any one of Aspects 1-8 or 76-103, or wherein the second fiber, second filament, or second yarn comprises or consists essentially of a foamable material according to any one of Aspects 1-8 or 76-103, or wherein both the first fiber, first filament, or first yarn and second fiber, second filament, or second yarn comprise or consist essentially of a foamable material according to any one of Aspects 1-8 or 76-103.

In accordance with Aspect 57, the present disclosure is directed to the method of Aspect 56, wherein, in the knit textile, the first and second yarns at least partly form a plurality of interconnected courses on a surface of the knit textile, the surface having at least a first zone and a second zone, wherein the first zone comprises an increased concentration of the second yarn compared to the second zone; optionally wherein the surface is an outer surface of the knit textile; optionally wherein both the first zone and the second zone comprise portions of both the first yarn and the second yarn.

In accordance with Aspect 58, the present disclosure is directed to the method of Aspect 57, wherein, in the knit textile, the surface includes at least the first zone, the second zone, and a third zone, wherein the second zone is positioned between the first and third zones, the first zone comprises the increased concentration of the second yarn compared to the second zone, and wherein the third zone comprises an increased concentration of the first yarn compared to the second zone.

In accordance with Aspect 59, the present disclosure is directed to the method according to Aspect 57, wherein each course of the plurality of interconnected courses includes the first yarn and the second yarn.

In accordance with Aspect 60, the present disclosure is directed to the method according to any one of Aspects 57-59, wherein the plurality of interconnected courses comprises a first course interconnected to a second course.

In accordance with Aspect 61, the present disclosure is directed to the method according to Aspect 60, wherein, in the first course, the first yarn extends from the third zone into the second zone and the second yarn extends from the second zone into the first zone, and wherein, in the second course, the first yarn extends from the third zone into the second zone and is interlooped with at least a portion of the first yarn of the first course in a first portion of the second zone.

In accordance with Aspect 62, the present disclosure is directed to the method according to Aspect 60 or 61, wherein, in the second course, the second yarn extends from the second zone into the first zone, and wherein the second yarn of the second course is interlooped with at least a portion of the first yarn of the first course in a second portion of the second zone.

In accordance with Aspect 63, the present disclosure is directed to the method according to any one of Aspects 60-62, wherein, in the second course, the second yarn of the second course is interlooped with at least a portion of the second yarn of the first course in a third portion of the second zone.

In accordance with Aspect 64, the present disclosure is directed to the method according to any one of Aspects 60-62, wherein, in the second zone, adjacent courses of the plurality of interconnected courses have a different number of loops of the first yarn.

In accordance with Aspect 65, the present disclosure is directed to the method according to any one of Aspects 60-63, wherein, in the second zone, at least some of the adjacent courses of the plurality of interconnected courses have different numbers of loops of the second yarn.

In accordance with Aspect 66, the present disclosure is directed to the method according to any one of Aspects 60-65, wherein, in the second zone, at least some of the adjacent courses of the plurality of interconnected courses have different numbers of loops of the first yarn and the second yarn.

In accordance with Aspect 67, the present disclosure is directed to the method according to any one of Aspects 60-66, wherein, in the second zone, a first wale having loops of the first yarn is adjacent to a second wale having loops of the second yarn.

In accordance with Aspect 68, the present disclosure is directed to the method according to any one of Aspects 60-67, wherein the knit textile is an upper for an article of footwear.

In accordance with Aspect 69, the present disclosure is directed to the method according to Aspect 68, wherein the first zone forms at least a portion of a forefoot opening area and/or an ankle collar area.

In accordance with Aspect 70, the present disclosure is directed to the method according to any one of Aspects 56-69, wherein the first yarn exhibits a tenacity of at least about 0.9 grams/denier, optionally of from about 1 gram/denier to about 5 grams/denier, from about 1.5 grams/denier to about 4.5 grams/denier, or of from about 2.0 grams/denier to about 4.5 grams/denier.

In accordance with Aspect 71, the present disclosure is directed to the method according to any one of Aspects 56-70, wherein the first yarn exhibits an elongation of less than about 130 percent, optionally of about 10 percent to about 130 percent, about 20 percent to about 130 percent, or about 40 percent to about 130 percent.

In accordance with Aspect 72, the present disclosure is directed to the method according to any one of Aspects 56-71, wherein the first yarn exhibits a shrinkage of less than about 60 percent, optionally about 0 percent to about 60 percent, about 0 percent to about 30 percent, or about 0 percent to about 20 percent.

In accordance with Aspect 73, the present disclosure is directed to the method according to any one of Aspects 56-72, wherein the first yarn or the second yarn or the third yarn or any combination thereof is essentially free of dye.

In accordance with Aspect 74, the present disclosure is directed to the method according to any one of Aspects 56-73, wherein the first yarn or the second yarn or the third yarn or any combination thereof is a package dyed yarn.

In accordance with Aspect 75, the present disclosure is directed to the method according to any one of Aspects 56-73, wherein the first yarn or the second yarn or the third yarn or any combination thereof is a solution dyed yarn.

In accordance with Aspect 76, the present disclosure is directed to the method of any one of the preceding Aspects, wherein the foamable material comprises a polymeric component including all of the polymers present in the foamable material, and the polymeric component consists of the one or more first thermoplastic elastomers.

In accordance with Aspect 77, the present disclosure is directed to the method of Aspect 76, wherein the one or more first thermoplastic elastomers comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In accordance with Aspect 78, the present disclosure is directed to the method of Aspect 76 or 77, wherein the one or more first thermoplastic elastomers comprise or consist essentially of one or more thermoplastic elastomeric polyamide homopolymers or copolymers.

In accordance with Aspect 79, the present disclosure is directed to the method of any one of Aspects 76-78, wherein the first one or more thermoplastic elastomers comprise or consist essentially of polyether block polyamide (PEBA) copolymer elastomers.

In accordance with Aspect 80, the present disclosure is directed to the method of any one of Aspects 76-79, wherein the one or more first thermoplastic elastomers comprise or consist essentially of one or more thermoplastic elastomeric styrenic homopolymers or copolymers.

In accordance with Aspect 81, the present disclosure is directed to the method of any one of Aspects 76-80, wherein the one or more first thermoplastic elastomers comprise or consist essentially of styrene butadiene styrene (SBS) block copolymer elastomers, styrene ethylene butylene styrene (SEBS) copolymer elastomers, styrene acrylonitrile (SAN) copolymer elastomers, or any combination thereof.

In accordance with Aspect 82, the present disclosure is directed to the method of any one of Aspects 76-81, wherein the one or more first thermoplastic elastomers comprise or consist essentially of one or more thermoplastic polyurethane elastomeric homopolymers or copolymers.

In accordance with Aspect 83, the present disclosure is directed to the method of any one of Aspects 76-82, wherein the one or more first thermoplastic elastomers comprise or consist essentially of thermoplastic polyester-polyurethane elastomers, polyether-polyurethane elastomers, polycarbonate-polyurethane elastomers, or combinations thereof.

In accordance with Aspect 84, the present disclosure is directed to the method of any one of Aspects 76-83, wherein the one or more first thermoplastic elastomers of the foamable material comprises or consists essentially of one or more thermoplastic polyester-polyurethane elastomers, optionally wherein the polymeric component of the foamable material consists of one or more thermoplastic polyester-polyurethane elastomers.

In accordance with Aspect 85, the present disclosure is directed to the method of any one of Aspects 76-83, wherein the one or more first thermoplastic elastomers comprise or consist essentially of one or more thermoplastic polyolefin elastomeric homopolymers or copolymers.

In accordance with Aspect 86, the present disclosure is directed to the method of any one of Aspects 76-85, wherein the one or more first thermoplastic elastomers comprise or consist essentially of thermoplastic elastomeric polypropylene homopolymers or copolymers, thermoplastic elastomeric polyethylene homopolymers or copolymers, thermoplastic elastomeric polybutylene homopolymers or copolymers, or any combination thereof.

In accordance with Aspect 87, the present disclosure is directed to the method of any one of Aspects 76-85, wherein the one or more first thermoplastic elastomers comprises or consists essentially of thermoplastic elastomeric ethylene-vinyl acetate copolymers.

In accordance with Aspect 88, the present disclosure is directed to the method of Aspect 87, wherein the thermoplastic elastomeric ethylene-vinyl acetate copolymers include from about 25 to about 50 weight percent vinyl acetate content.

In accordance with Aspect 89, the present disclosure is directed to the method of any one of Aspect 76-88, wherein the foamable material comprises a mixture of the polymeric component and a non-polymeric component consisting of one or more non-polymeric additives, optionally wherein the foamable material comprises from about 0.005 to about 20 percent by weight of the non-polymeric component based on a total weight of the foamable material, or about 0.5 to about 10 percent by weight of the non-polymeric additive based on a total weight of the foamable material.

In accordance with Aspect 90, the present disclosure is directed to the method of any one of Aspects 76-89, wherein the one or more first thermoplastic elastomers comprises or consists essentially of one or more recycled first thermoplastic elastomers.

In accordance with Aspect 91, the present disclosure is directed to the method of any one of Aspects 76-87, wherein the foamable material comprises or consists essentially of a blend of the one or more first thermoplastic elastomers and a second material, optionally wherein the second material comprises or consists essentially of one or more second polymers, optionally wherein the one or more second polymers comprise or consist essentially of one or more second thermoplastics.

In accordance with Aspect 92, the present disclosure is directed to the method of any one of Aspects 76-91, wherein the polymeric component of the foamable material consists of a blend of the one or more first thermoplastic elastomers and the one or more second thermoplastics, optionally wherein the blend foams during the steps of subjecting and expanding.

In accordance with Aspect 93, the present disclosure is directed to the method of Aspect 92, wherein the one or more second thermoplastics comprise one or more thermoplastic polyolefin homopolymers or copolymers, one or more thermoplastic polyamide homopolymers or copolymers, one or more thermoplastic polyester homopolymers or copolymers, one or more thermoplastic polyurethane homopolymers or copolymers, one or more thermoplastic styrenic homopolymers or copolymers, or any combination thereof.

In accordance with Aspect 94, the present disclosure is directed to the method of Aspect 92 or 93, wherein the one or more second thermoplastics comprise or consist essentially of thermoplastic polypropylene homopolymers or copolymers, thermoplastic polyethylene homopolymers or copolymers, thermoplastic polybutylene homopolymers or copolymers, or any combination thereof.

In accordance with Aspect 95, the present disclosure is directed to the method of any one of Aspects 91-94, wherein the one or more second thermoplastics comprise or consist essentially of one or more thermoplastic polyethylene copolymers.

In accordance with Aspect 96, the present disclosure is directed to the method of any one of Aspects 91-95, wherein the one or more second thermoplastics comprise or consist essentially of one or more thermoplastic ethylene-vinyl alcohol copolymers.

In accordance with Aspect 97, the present disclosure is directed to the method of Aspect 91, wherein the polymeric component of the foamable material consists of one or more first thermoplastic elastomeric polyurethane homopolymers or copolymers, and one or more second thermoplastic ethylene-vinyl alcohol copolymers.

In accordance with Aspect 98, the present disclosure is directed to the method of Aspect 97, wherein the polymeric component consists of one or more first thermoplastic elastomeric polyester-polyurethane copolymers and one or more second thermoplastic ethylene-vinyl alcohol copolymers.

In accordance with Aspect 99, the present disclosure is directed to the method of any one of Aspects 91-98, wherein the blend comprises one or more recycled first thermoplastic elastomers, or one or more recycled second thermoplastics, or both.

In accordance with Aspect 100, the present disclosure is directed to the method of Aspect 99, wherein the blend is a phase-separated blend of the one or more first thermoplastic elastomers and the one or more second thermoplastics.

In accordance with Aspect 101, the present disclosure is directed to the method of Aspect 100, wherein the phase-separated blend includes one or more phase-separated regions including interfaces between the one or more first thermoplastic elastomers and the one or more second thermoplastics.

In accordance with Aspect 102, the present disclosure is directed to the method of any one of Aspects 91-101, wherein the blend comprises about 95 percent by weight of the one or more first thermoplastic elastomers and about 5 percent by weight of the one or more second thermoplastics based on a total weight of the blend.

In accordance with Aspect 103, the present disclosure is directed to the method of any of Aspects 91-102, wherein the liquid carbon dioxide is soluble in the one or more first thermoplastic elastomers at a concentration of from about 1 weight percent to about 30 weight percent based on a total weight of the one or more first thermoplastic elastomers present in the foamable material, optionally from about 5 weight percent to about 20 weight percent, and wherein the liquid carbon dioxide is soluble in the one or more second thermoplastics at a concentration of at less than 1 weight percent based on a total weight of the one or more second thermoplastics present in the foamable material, optionally less than 0.1 weight percent, or optionally wherein the liquid carbon dioxide is substantially insoluble in the one or more second thermoplastics.

In accordance with Aspect 104, the present disclosure is directed to the method of any one of the preceding Aspects, wherein the article comprises an additional material, wherein the additional material is a separate material from the foamable material, wherein the additional material comprises or consists essentially of one or more polymers, and includes an additional material polymeric component consisting of all the polymers present in the additional material; optionally wherein the additional material is comprises or consists essentially of a second material according to any one of Aspects 91-103, optionally wherein the second material is a thermoplastic material, optionally wherein the additional material comprises the additional material polymeric component mixed with an additional material non-polymeric component consisting of all non-polymeric components present in the additional material, optionally wherein the article comprises an additional fibrous element comprising or consisting essentially of the additional material.

In accordance with Aspect 105, the present disclosure is directed to the method of Aspect 104, wherein the additional fibrous element comprises or consists essentially of a second plurality of filaments, fibers, yarns, or any combination thereof, optionally wherein the second plurality of filaments, fibers, yarns, or any combination thereof comprises or consists essentially of the additional material.

In accordance with Aspect 106, the present disclosure is directed to the method of Aspect 105, wherein the additional fibrous element is a second textile element.

In accordance with Aspect 107, the present disclosure is directed to the method of Aspect 106, wherein the second textile element comprises or consists essentially of a knit textile, a woven textile, a crocheted textile, a braided textile, a tatted textile, a non-woven textile, or any combination thereof.

In accordance with Aspect 108, the present disclosure is directed to the method of any one of the preceding Aspects, wherein the article comprises one or more first portions of the foamable fibrous element, and one or more second portions of the additional fibrous element, and wherein the one or more first portions are distinct from the one or more second portions.

In accordance with Aspect 109, the present disclosure is directed to the method of any one of Aspects 104-108, wherein the additional material further comprises a plasticizer.

In accordance with Aspect 110, the present disclosure is directed to the method of any one of Aspects 104-109, wherein during the expanding step, the additional material remains substantially unfoamed.

In accordance with Aspect 111, the present disclosure is directed to the method of any one of Aspects 104-110, wherein the additional material is a thermoplastic material, optionally wherein the additional material is an additional thermoplastic elastomeric material, optionally wherein the additional thermoplastic elastomeric material is an additional foamable material.

In accordance with Aspect 112, the present disclosure is directed to the method of Aspect 111, wherein the additional material is an additional foamable material, and, during the expanding step, the additional foamable material expands into an additional foamed material.

In accordance with Aspect 113, the present disclosure is directed to the method of Aspect 112, wherein, in the foamed article, a density of the first foamed material differs from a density of the additional foamed material by at least 5 percent, or at least 10 percent, or at least 20 percent.

In accordance with Aspect 114, the present disclosure is directed to the method of Aspect 111, wherein the article comprises a first foamable fibrous element comprising or consisting essentially of the solid foamable material and further comprises the additional material, wherein the additional material is an additional foamable material, and wherein the steps of maintaining and holding comprise holding the article and the liquid carbon dioxide in the vessel for a duration of time sufficient for at least a portion of the liquid carbon dioxide to infuse into the first foamable fibrous element but not into the additional foamable material, and the steps of subjecting and expanding comprise expanding the first foamable fibrous element into a first foamed fibrous element while maintaining the additional foamable material as a substantially unfoamed additional foamable material.

In accordance with Aspect 115, the present disclosure is directed to the method of Aspect 111, wherein the article comprises a first foamable fibrous element comprising or consisting essentially of the solid foamable material and further comprises the additional material, wherein the additional material is not a foamable material, and wherein the steps of maintaining and holding comprise holding the article and the liquid carbon dioxide in the vessel for a duration of time sufficient for at least a portion of the liquid carbon dioxide to infuse into the first foamable fibrous element, and the steps of subjecting and expanding comprise expanding the first foamable fibrous element into a first foamed fibrous element while maintaining the additional material in a substantially unfoamed state.

In accordance with Aspect 116, the present disclosure is directed to the method of Aspect 114 or 115, wherein the additional material is an additional fibrous element.

In accordance with Aspect 117, the present disclosure is directed to the method of Aspect 116, wherein the additional fibrous element is a second yarn or a third yarn.

In accordance with Aspect 118, the present disclosure is directed to the method of Aspect 111, wherein the article comprises the first foamable fibrous element and further comprises the additional material, wherein the additional material is an additional foamable material, the steps of maintaining and holding include holding the article and the liquid carbon dioxide in the vessel for a duration of time sufficient for at least a portion of the liquid carbon dioxide to infuse into the first foamable fibrous element and into the solid additional foamable material, the method includes the optional step of exposing and the exposing comprises exposing the article to a second pressure and second temperature at which the carbon dioxide remains infused within the solid additional foamable material but at which the carbon dioxide diffuses out of the first foamable fibrous element, and the steps of subjecting and expanding comprise expanding the additional foamable material into an additional foamed material while maintaining the first foamable fibrous element as a substantially unfoamed first foamable fibrous element.

In accordance with Aspect 119, the present disclosure is directed to the method of Aspect 111, wherein the additional material is a recycled material comprising one or more recycled polymers, optionally wherein the one or more recycled polymers comprises one or more recycled thermoplastics, optionally wherein the one or more recycled thermoplastics comprises one or more recycled thermoplastic elastomers; optionally wherein the recycled material comprises a recycled material polymeric component consisting of one or more recycled thermoplastics, optionally wherein the recycled material polymeric component comprises or consists essentially of one or more recycled thermoplastic elastomers.

In accordance with Aspect 120, the present disclosure is directed to the method of Aspect 119, wherein the recycled material comprises one or more recycled first thermoplastic elastomers, optionally wherein the one or more recycled first thermoplastic elastomers comprise one or more reground first thermoplastic elastomers, optionally wherein the one or more recycled or reground first thermoplastic elastomers includes a thermoplastic elastomer according to any one of Aspects 76-90.

In accordance with Aspect 121, the present disclosure is directed to the method of Aspect 119 or 120, wherein the recycled material further comprises one or more recycled second thermoplastics, optionally wherein the one or more recycled second thermoplastics comprise one or more reground second thermoplastics, optionally wherein the one or more recycled or reground second thermoplastics includes a thermoplastic according to any one of Aspects 91-103.

In accordance with Aspect 122, the present disclosure is directed to the method of Aspect 121, wherein the recycled material comprises one or more recycled or reground thermoplastic polyurethane elastomers or one or more recycled or reground thermoplastic ethylene-vinyl alcohol copolymers or both.

In accordance with Aspect 123, the present disclosure is directed to the method of Aspect 121 or 122, wherein the recycled material comprises a blend of the one or more recycled or reground thermoplastic elastomers and one or more second thermoplastics, or wherein the recycled material comprises a blend of one or more thermoplastic elastomers and one or more recycled thermoplastics or one or more recycled second thermoplastics, optionally wherein the blend is a phase-separated blend, and optionally wherein the phase-separated blend comprises one or more interfaces between the one or more first thermoplastic elastomers and the one or more second thermoplastics.

In accordance with Aspect 124, the present disclosure is directed to the method of any of Aspects 121-123, wherein the recycled material comprises about 99 percent to about 90 percent by weight of the one or more first thermoplastic elastomers and about 1 percent to about 10 percent by weight of the second thermoplastics based on a total weight of the recycled material, optionally wherein the recycled material comprises about 99 percent to about 93 percent by weight of the one or more first thermoplastic elastomers and about 1 percent to about 7 percent by weight of the one or more second thermoplastics, or about 99 percent to about 95 percent by weight of the one or more first thermoplastic elastomers and about 1 percent to about 5 percent by weight of the one or more second thermoplastic elastomers.

In accordance with Aspect 125, the present disclosure is directed to the method of any one of Aspects 119-124, wherein the recycled material comprises about 99 percent to about 50 percent by weight of recycled or reground polymers based on a total weight of recycled material, optionally from about 99 percent to about 75 percent by weight of recycled or reground polymers.

In accordance with Aspect 126, the present disclosure is directed to the method of any one of Aspects 119-125, wherein the liquid carbon dioxide is soluble in the recycled material at a concentration of from about 1 weight percent to about 30 weight percent based on a total weight of the recycled material, optionally from about 5 weight percent to about 20 weight percent.

In accordance with Aspect 127, the present disclosure is directed to the method of any of Aspects 119-125, wherein the liquid carbon dioxide is soluble in the one or more recycled or reground thermoplastic elastomers at a concentration of from about 1 weight percent to about 30 weight percent based on a total weight of the one or more recycled or reground thermoplastic elastomers, optionally from about 5 weight percent to about 20 weight percent.

In accordance with Aspect 128, the present disclosure is directed to the method of any of Aspects 119-127, wherein the liquid carbon dioxide is soluble in the one or more recycled or reground second thermoplastics at less than 1 weight percent, optionally less than 0.1 weight percent based on a total weight of the one or more recycled or reground second thermoplastics, or optionally wherein the liquid carbon dioxide is substantially insoluble in the one or more recycled or reground second thermoplastics.

In accordance with Aspect 129, the present disclosure is directed to the method of any one of Aspects 120-128, wherein the recycled material comprises a recycled foamed article produced by the method of any one of the preceding Aspects, optionally wherein the recycled foamed article is a reground foamed article.

In accordance with Aspect 130, the present disclosure is directed to the method of any one of Aspects 120-128, wherein the recycled material comprises foamable material, wherein the foamable material is an unfoamed material.

In accordance with Aspect 131, the present disclosure is directed to the method of any of Aspects 120-130, wherein the recycled material further comprises one or more virgin first thermoplastic elastomers, optionally wherein the one or more virgin first thermoplastic elastomers includes one or more virgin thermoplastic polyurethane elastomers.

In accordance with Aspect 132, the present disclosure is directed to the method of any of Aspects 122-131, wherein the recycled material includes one or more nucleating agents or nucleating sites for foaming the recycled material, optionally wherein the one or more nucleating sites include one or more interfaces between phase-separated polymers.

In accordance with Aspect 133, the present disclosure is directed to the method of any one of Aspects 120-132, wherein the solid foamable material is a recycled material.

In accordance with Aspect 134, the present disclosure is directed to the method of any one of Aspects 120-132, wherein the article comprises a first solid foamable material and an additional solid foamable material, and the first solid foamable material is a recycled material, or the additional solid foamable material is a recycled material, or both the first solid foamable material and the additional solid foamable material are recycled materials.

In accordance with Aspect 135, the present disclosure is directed to the method of any one of the preceding Aspects, wherein the article comprises a structural layer comprising or consisting essentially of a structural material.

In accordance with Aspect 136, the present disclosure is directed to the method of Aspect 135, wherein the structural material is an additional material according to any one of Aspects 104-132, optionally wherein the structural material comprises a blend of two or more additional materials, optionally wherein at least one of the two or more additional materials is a recycled material.

In accordance with Aspect 137, the present disclosure is directed to the method of any of Aspects 101-103, wherein the steps of maintaining and expanding comprise nucleating foaming at the one or more interfaces in the foamable material.

In accordance with Aspect 138, the present disclosure is directed to the method of any of the preceding Aspects, wherein the steps of maintaining and holding comprise maintaining the first pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals).

In accordance with Aspect 139, the present disclosure is directed to the method of any of the preceding Aspects, wherein the steps of maintaining and holding comprise maintaining the first temperature of from about −57 degrees Celsius to about 31 degrees Celsius.

In accordance with Aspect 140, the present disclosure is directed to the method of any of the preceding Aspects, wherein the steps of maintaining and holding comprise holding the article at the first pressure and the first temperature for a duration of from about 20 seconds to about 72 hours.

In accordance with Aspect 141, the present disclosure is directed to the method of any of the preceding Aspects, wherein the optional step of exposing comprises exposing the article to the second pressure of from about 1 atmosphere (101 kilopascals) to about 85 atmospheres (8613 kilopascals).

In accordance with Aspect 142, the present disclosure is directed to the method of any of the preceding Aspects, wherein the optional step of exposing comprises exposing the article to the second temperature of more than about 30 degrees below the softening point of the solid foamable material, or more than about 50 degrees below the softening point of the solid foamable material, optionally more than about 100 degrees below the softening point of the solid foamable material.

In accordance with Aspect 143, the present disclosure is directed to the method of any of the preceding Aspects, wherein the optional step of exposing comprises exposing the article to the second pressure and the second temperature for a duration of from about 30 minutes to about 4 weeks.

In accordance with Aspect 144, the present disclosure is directed to the method of any one of the preceding Aspects, wherein the steps of subjecting and expanding comprise subjecting the article to the third pressure of from about 13 pounds per square inch (89.6 kilopascals) to about 16 pounds per square inch (110.3 kilopascals).

In accordance with Aspect 145, the present disclosure is directed to the method of any one of the preceding Aspects, wherein the steps of subjecting and expanding comprise subjecting the article to the third temperature of from about 20 degrees Celsius to about 150 degrees Celsius.

In accordance with Aspect 146, the present disclosure is directed to the method of any one of the preceding Aspects, wherein the steps of subjecting and expanding comprise subjecting the article to the third pressure and the third temperature for a duration of from about 2 seconds to about 5 minutes.

In accordance with Aspect 147, the present disclosure is directed to the method of any one of the preceding Aspects, wherein the optional step of bringing comprises bringing the foamed article to the fourth pressure of from about 0.03 atmospheres (3.04 kilopascals) to about 2 atmospheres (202.65 kilopascals).

In accordance with Aspect 148, the present disclosure is directed to the method of any one of the preceding Aspects, wherein the optional step of bringing comprises bringing the foamed article to the fourth temperature of from about 30 degrees Celsius to about 70 degrees Celsius.

In accordance with Aspect 149, the present disclosure is directed to the method of any one of the preceding Aspects, wherein the optional step of bringing comprises bringing the foamed article to the fourth pressure and the fourth temperature for a duration of from about 15 minutes to about 1 hour.

In accordance with Aspect 150, the present disclosure is directed to the method of any one of Aspects 2-149, wherein, in the optional step of bringing, the fourth temperature is at or below a glass transition temperature of the solid foamable material.

In accordance with Aspect 151, the present disclosure is directed to the method of any one of Aspects 2-149, wherein, in the optional step of bringing, the fourth temperature is from about 10 degrees Celsius less than to about 10 degrees Celsius greater than the glass transition temperature of the solid foamable material.

In accordance with Aspect 152, the present disclosure is directed to the method of any one of the preceding Aspects, wherein, in the foamed article, the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter, optionally wherein, in the stabilized foamed article, the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter.

In accordance with Aspect 153, the present disclosure is directed to the method of any one of the preceding Aspects, wherein, in the foamed article, the foamed material has a volume less than 10 percent greater, optionally less than 5 percent greater, than the foamable material prior to foaming, optionally wherein the foamed article is a stabilized foamed article.

In accordance with Aspect 154, the present disclosure is directed to the method of any one of the preceding Aspects, wherein, in the foamed article, the foamed material has a volume more than 20 percent greater, optionally more than 30 percent greater or more than 40 percent greater, than the foamable material prior to foaming, optionally wherein the foamed article is a stabilized foamed article.

In accordance with Aspect 155, the present disclosure is directed to the method of Aspect 154, wherein the article is a stabilized foamed article, and wherein a change in volume before and after stabilizing the article is from about 0 percent to about 20 percent, optionally from about 0 percent to about 10 percent, or from about 0 percent to about 5 percent.

In accordance with Aspect 156, the present disclosure is directed to the method of any one of the preceding Aspects, wherein the step of subjecting and expanding comprises expanding the foamable material into the foamed material until the foamed material has a density of from about 0.01 gram per cubic centimeter to about 3.0 grams per cubic centimeter.

In accordance with Aspect 157, the present disclosure is directed to the method of any one of the preceding Aspects, wherein, following the steps of subjecting and expanding, the foamed material has an expansion ratio of from about 3:1 to about 120:1 relative to the solid foamable material prior to the subjecting and expanding.

In accordance with Aspect 158, the present disclosure is directed to the method of any one of the preceding Aspects, wherein the solid foamable material has a Shore A hardness of from about 35 A to about 95 A, optionally from about 55 A to about 90 A.

In accordance with Aspect 159, the present disclosure is directed to the method of any one of the preceding Aspects, wherein the foamed material of the foamed article has a Shore A hardness of from about 35 A to about 95 A, optionally from about 55 A to about 90 A.

In accordance with Aspect 160, the present disclosure is directed to the method of any one of the preceding Aspects, wherein the optional step of exposing occurs in the vessel.

In accordance with Aspect 161, the present disclosure is directed to the method of any of the preceding Aspects, wherein the steps of subjecting and expanding occur in the vessel.

In accordance with Aspect 162, the present disclosure is directed to the method of any one of the preceding Aspects, wherein the optional step of exposing further comprises removing the liquid carbon dioxide-infused article from the vessel prior to exposing the article to the optional second pressure and second temperature.

In accordance with Aspect 163, the present disclosure is directed to the method of any one of the preceding Aspects, wherein the step of subjecting further comprise removing the liquid carbon dioxide-infused article from the vessel prior to subjecting the article to the third pressure and third temperature.

In accordance with Aspect 164, the present disclosure is directed to the method of Aspect 163, wherein the step of placing the carbon dioxide in the vessel comprises introducing carbon dioxide vapor into the vessel prior to the steps of maintaining and holding.

In accordance with Aspect 165, the present disclosure is directed to the method of Aspect 164, wherein the introducing the carbon dioxide vapor comprises charging the vessel with the carbon dioxide vapor at a pressure and temperature condition that is a liquid/vapor equilibrium for carbon dioxide.

In accordance with Aspect 166, the present disclosure is directed to the method of Aspect 163 or 164, wherein the method further comprises discharging the liquid carbon dioxide from the vessel after the steps of maintaining and holding, prior to the optional step of exposing, or prior to the steps of subjecting and expanding.

In accordance with Aspect 167, the present disclosure is directed to the method of Aspect 166, wherein discharging the liquid carbon dioxide from the vessel comprises converting the liquid carbon dioxide to carbon dioxide vapor prior to or during the discharging.

In accordance with Aspect 168, the present disclosure is directed to the method of any of the preceding Aspects, wherein the step of subjecting the article to the third temperature and third pressure comprises introducing the article to a fluid bath, optionally wherein the fluid bath is a water bath.

In accordance with Aspect 169, the present disclosure is directed to the method of Aspect 168, wherein the fluid bath has a temperature of from about 20 degrees Celsius to about 90 degrees Celsius.

In accordance with Aspect 170, the present disclosure is directed to the method of Aspect 168 or 169, wherein, during the subjecting, the article is held in the fluid bath for a time of from about 15 seconds to about 5 minutes.

In accordance with Aspect 171, the present disclosure is directed to the method of any one of Aspects 1-167, wherein the step of subjecting comprises subjecting the article to a source of energy or heat, optionally wherein the source of energy or heat comprises steam, microwave energy, infrared (IR) energy, radio frequency (RF) energy, or any combination thereof.

In accordance with Aspect 172, the present disclosure is directed to the method of Aspect 171, wherein the step of subjecting the article to the source of energy or heat increases the temperature of at least a portion of the foamable material of the article to a temperature of from about 60 degrees Celsius to about 150 degrees Celsius, optionally wherein the subjecting is for a duration of from about 2 seconds to about 5 minutes.

In accordance with Aspect 173, the present disclosure is directed to the method of any one of Aspects 3-172, wherein the optional step of stabilizing at the fifth pressure and the fifth temperature comprises placing the foamed article in an oven.

In accordance with Aspect 174, the present disclosure is directed to the method of any one of Aspects 3-173, wherein the optional step of stabilizing comprises stabilizing at the fifth pressure of about atmospheric pressure.

In accordance with Aspect 175, the present disclosure is directed to the method of any one of Aspects 3-174, wherein the optional step of stabilizing comprises stabilizing at the fifth temperature of greater than the glass transition temperature of the solid foamable material.

In accordance with Aspect 176, the present disclosure is directed to the method of any one of Aspects 3-175, wherein the optional step of stabilizing comprises stabilizing at the fifth temperature of from about 30 degrees Celsius to about 70 degrees Celsius, optionally of about 50 degrees Celsius.

In accordance with Aspect 177, the present disclosure is directed to the method of any one of Aspects 3-176, wherein the optional step of stabilizing comprises stabilizing the foamed article at the fifth temperature for from about 15 minutes to about 60 minutes, optionally for from about 30 minutes to about 45 minutes.

In accordance with Aspect 178, the present disclosure is directed to the method of any of the preceding Aspects, wherein the article is configured as a roll, and wherein the step of placing comprises disposing the roll into the vessel, and wherein the steps of subjecting and expanding comprises unrolling the article prior to or during the subjecting, or prior or during the expanding.

In accordance with Aspect 179, the present disclosure is directed to the method of Aspect 178, wherein the step of placing further comprises disposing a porous spacer between adjacent portions of the article prior to or during the placing, and wherein the steps of maintaining and holding comprise flowing the liquid carbon dioxide through the porous spacer to the adjacent portions of the article.

In accordance with Aspect 180, the present disclosure is directed to the method of any one of the preceding Aspects, wherein, during the expanding, at least a portion of the article comprising the solid foamable material expands in length, width, and height due to the expansion of the solid foamable material into the foamable material.

In accordance with Aspect 181, the present disclosure is directed to the method of Aspect 180, wherein, following the expanding, a size of the foamed article is greater in at least one dimension as compared to a size of the article before the placing, optionally wherein the foam article is at least 5 percent larger, or at least 10 percent larger, or at least 15 percent larger, or at least 20 percent larger in one or more of length, width, and height.

In accordance with Aspect 182, the present disclosure is directed to the method of Aspects 180 or 181, wherein the article is a layered sheet, the steps of subjecting and expanding foam at least one layer of the sheet, and following the subjecting and expanding, a thickness of the foamed layered sheet is at least 5 percent greater, or at least 10 percent greater, or at least 15 percent greater, or at least 20 percent greater than a thickness of the layered sheet in its unfoamed state.

In accordance with Aspect 183, the present disclosure is directed to the method of Aspect 181 or 182, wherein the method includes the step of stabilizing, and, following the stabilizing, the stabilized foam article is greater in at least one dimension as compared to a size of the article before the placing, optionally wherein the stabilized foam article is at least 5 percent larger, or at least 10 percent larger, or at least 15 percent larger, or at least 20 percent larger in one or more of length, width, and height.

In accordance with Aspect 184, the present disclosure is directed to the method of any one of the preceding Aspects, wherein the article includes a thermoformed article, optionally wherein the method further comprises a step of thermoforming the article prior to the step of placing.

In accordance with Aspect 185, the present disclosure is directed to the method of Aspect 184, further comprising the step of molding the foamable fibrous element.

In accordance with Aspect 186, the present disclosure is directed to the method of Aspect 185, wherein molding the textile comprises applying a mold to the foamable fibrous element.

In accordance with Aspect 187, the present disclosure is directed to the method of Aspect 186, wherein the mold is a slump mold.

In accordance with Aspect 188, the present disclosure is directed to the method of Aspect 186, wherein the mold is a compression mold.

In accordance with Aspect 189, the present disclosure is directed to the methods of any one of Aspects 186-188, further comprising the step of increasing a temperature of the mold.

In accordance with Aspect 190, the present disclosure is directed to the method of Aspect 189, wherein the step of increasing a temperature of the mold is performed after applying the mold to the foamable fibrous element.

In accordance with Aspect 191, the present disclosure is directed to the method of Aspect 189, wherein the step of increasing a temperature of the mold is performed before applying the mold to the foamable fibrous element.

In accordance with Aspect 192, the present disclosure is directed to the method of any one of the preceding Aspects, wherein the article includes a thermoformed article, optionally wherein the method further comprises a step of thermoforming the foamed article.

In accordance with Aspect 193, the present disclosure is directed to the method of any one of the preceding Aspects, further comprising thermoforming the foamed article, optionally wherein the foamed article is a stabilized foamed article.

In accordance with Aspect 194, the present disclosure is directed to the method of Aspect 192 or 193, wherein the foamed article includes a sheet, optionally wherein the sheet is a layered sheet, optionally wherein the layered sheet comprises at least one unfoamed cap layer, optionally wherein the layered sheet comprises one or more foamed inner layers and two unfoamed cap layers.

In accordance with Aspect 195, the present disclosure is directed to the method of any one of Aspects 192-194, further comprising the step of molding the foamed article, wherein the foamed article comprises a foamed fibrous element.

In accordance with Aspect 196, the present disclosure is directed to the method of any one of Aspects 192-195, wherein molding the textile comprises applying a mold to the foamed fibrous element.

In accordance with Aspect 197, the present disclosure is directed to the method of Aspect 196, wherein the mold is a slump mold.

In accordance with Aspect 198, the present disclosure is directed to the method of Aspect 196, wherein the mold is a compression mold.

In accordance with Aspect 199, the present disclosure is directed to the methods of any one of Aspects 196-198, further comprising the step of increasing a temperature of the mold.

In accordance with Aspect 200, the present disclosure is directed to the method of Aspect 199, wherein the step of increasing a temperature of the mold is performed after applying the mold to the foamed fibrous element.

In accordance with Aspect 201, the present disclosure is directed to the method of Aspect 199, wherein the step of increasing a temperature of the mold is performed before applying the mold to the foamed fibrous element.

In accordance with Aspect 202, the present disclosure is directed to the method of any one of the preceding Aspects, wherein the foamed article is a component of an article of apparel, footwear, or sporting equipment.

In accordance with Aspect 203, the present disclosure is directed to the method of any one of the preceding Aspects, wherein the article is configured as a series of two or more regions including a first region including a first regional material and a second region including a second regional material, wherein the first regional material or the second regional material or both the first regional material and the second regional material include a foamable fibrous element; optionally wherein the first region or the second region forms an outermost surface of the article, or wherein both the first region and the second region individually or jointly form the outermost surface of the article.

In accordance with Aspect 204, the present disclosure is directed to the method of 203, wherein the regions include layers, and wherein the first region or the second region forms an inner layer of the article, or both the first region and the second region individually form separate inner layers of the article, optionally wherein the article is a layered sheet.

In accordance with Aspect 205, the present disclosure is directed to the method of Aspect 203 or 204, wherein, in the article, the first region forms the outermost surface of the article and the second region forms an inner layer of the article.

In accordance with Aspect 206, the present disclosure is directed to the method of any one of Aspects 203-205, wherein, in the article, the first region comprises or consists essentially of the foamable fibrous element, the foamable fibrous element of the first region is a first regional foamable fibrous element, and in the steps of subjecting and expanding, the first regional solid foamable material either remains as the first regional foamable fibrous element, or expands into the foamed material wherein the foamed material of the first region is a first regional foamed fibrous element.

In accordance with Aspect 207, the present disclosure is directed to the method of any one of 203-206, wherein, in the article, the second region comprises or consists essentially of the foamable fibrous element, the foamable fibrous element of the second region is a second regional foamable fibrous element, and in the steps of subjecting and expanding, the second regional foamable fibrous element either remains as the second regional foamable fibrous element, or expands into the foamed material wherein the foamed material of the second region is a second regional foamed fibrous element.

In accordance with Aspect 208, the present disclosure is directed to the method of any one of 203-207, wherein the first regional foamable fibrous element, or the second regional foamable fibrous element, or both, is individually a foamable fibrous element according to any one of Aspects 1-8 or 76-103.

In accordance with Aspect 209, the present disclosure is directed to the method of any one of 203-208, wherein the first regional foamed fibrous element, the second regional foamed fibrous element, or both, individually are a foamed material according to any one of Aspects 1-8 or 152-159.

In accordance with Aspect 210, the present disclosure is directed to the method of any one of 203-207, wherein the first regional material or the second regional material is a barrier material according to Aspect 224.

In accordance with Aspect 211, the present disclosure is directed to the method of any one of Aspects 203-210, wherein the steps of maintaining and holding include holding the article and the liquid carbon dioxide in the vessel for a duration of time sufficient for at least a portion of the liquid carbon dioxide to infuse into at least a portion of the first region, or wherein the duration of time is sufficient for at least a portion of the liquid carbon dioxide to infuse into at least a portion of the second region, or wherein the duration of time is sufficient for at least a portion of the liquid carbon dioxide to infuse into at least a portion of the first region and into at least a portion of the second region;

optionally wherein the duration of time is sufficient for the at least a portion of the liquid carbon dioxide to infuse into substantially all of the first region, or substantially all of the second region, or into substantially all of the first region and the second region.

In accordance with Aspect 212, the present disclosure is directed to the method of Aspect 211, wherein the first region comprises or consists essentially of the first regional foamable fibrous element, the steps of maintaining and holding include holding the article and the liquid carbon dioxide in the vessel for a duration of time sufficient for at least a portion of the liquid carbon dioxide to infuse into at least a portion of the first regional foamable fibrous element, and the steps of subjecting and expanding include expanding the at least a portion of the first regional foamable fibrous element into the foamed material, wherein the foamed material of the first region comprises a first regional foamed fibrous element, optionally wherein the expanding includes expanding substantially all of the foamable fibrous element of the first region into the first regional foamed fibrous element.

In accordance with Aspect 213, the present disclosure is directed to the method of Aspect 211, wherein the steps of maintaining and holding include holding the article and the liquid carbon dioxide in the vessel for a duration of time sufficient for the at least a portion of the liquid carbon dioxide to infuse into at least a portion of the first region, wherein the duration of time is not sufficient for at least a portion of the liquid carbon dioxide to infuse into at least a portion of the second region;

and the steps of subjecting and expanding include expanding the at least a portion of the first regional foamable fibrous element into the first regional foamed fibrous element without expanding the second regional material;

optionally wherein, following the steps of maintaining and holding, the second region is substantially free of infused carbon dioxide, and optionally wherein the second region comprises or consists essentially of a barrier material.

In accordance with Aspect 214, the present disclosure is directed to the method of Aspect 211, wherein the steps of maintaining and holding include holding the article and the liquid carbon dioxide in the vessel for a duration of time sufficient for the at least a portion of the liquid carbon dioxide to infuse into at least a portion of the first region and into the at least a portion of the second region, and the method further comprises the step of exposing the infused article to the second pressure and second temperature for a duration of time such that the at least a portion of carbon dioxide infused into the at least a portion of the second region diffuses out of the at least a portion of the second region, while at least a portion of the infused carbon dioxide infused in the first region remains infused in the at least a portion of the first region following the exposing;

and the steps of subjecting and expanding include expanding the at least a portion of the foamable fibrous element of the first region into the first regional foamed fibrous element without expanding the second regional material of the second region, thereby forming a foamed first region while maintaining the second region in a solid unfoamed state;

optionally wherein, following the step of exposing, the second region is substantially free of infused carbon dioxide, and optionally wherein the second region comprises or consists essentially of a barrier material.

In accordance with Aspect 215, the present disclosure is directed to the method of any of Aspects 203-211, wherein the step of placing comprises placing the article in the liquid carbon dioxide in the vessel such that the article is not fully immersed in the liquid carbon dioxide.

In accordance with Aspect 216, the present disclosure is directed to the method of Aspect 215, wherein the first region is immersed in the liquid carbon dioxide and the second region is not immersed in the liquid carbon dioxide, and wherein, following the step of exposing, the second region is substantially free of infused carbon dioxide.

In accordance with Aspect 217, the present disclosure is directed to the method of any one of Aspects 203-210, wherein the steps of maintaining and holding include holding the article and the liquid carbon dioxide in the vessel for a duration of time sufficient for at least a portion of the liquid carbon dioxide to infuse into at least a portion of the second region, or wherein the duration of time is sufficient for at least a portion of the liquid carbon dioxide to infuse into at least a portion of the first region and into at least a portion of the second region;

optionally wherein the duration of time is sufficient for the at least a portion of the liquid carbon dioxide to infuse into substantially all of the second region, or substantially all of the second region, or into substantially all of the first region and the second region.

In accordance with Aspect 218, the present disclosure is directed to the method of Aspect 217, wherein the second region comprises or consists essentially of the foamable fibrous element, the steps of maintaining and holding include holding the article and the liquid carbon dioxide in the vessel for a duration of time sufficient for at least a portion of the liquid carbon dioxide to infuse into at least a portion of the second regional foamable fibrous element, and the steps of subjecting and expanding include expanding the at least a portion of the second regional foamable fibrous element into the foamed material, wherein the foamed material of the second region comprises a second regional foamed fibrous element, optionally wherein the expanding includes expanding substantially all of the second regional foamable fibrous element into the second regional foamed fibrous element.

In accordance with Aspect 219, the present disclosure is directed to the method of Aspect 217, wherein the steps of maintaining and holding include holding the article and the liquid carbon dioxide in the vessel for a duration of time sufficient for the at least a portion of the liquid carbon dioxide to infuse into at least a portion of the second region, wherein the duration of time is not sufficient for at least a portion of the liquid carbon dioxide to infuse into at least a portion of the first region;

and the steps of subjecting and expanding include expanding the at least a portion of the second regional foamable fibrous element into the second regional foamed fibrous element without expanding the first regional material, thereby forming a foamed second region while maintaining the first region in a solid unfoamed state;

optionally wherein, following the steps of maintaining and holding, the first region is substantially free of infused carbon dioxide, and optionally wherein the first region comprises or consists essentially of a barrier material.

In accordance with Aspect 220, the present disclosure is directed to the method of Aspect 217, wherein the steps of maintaining and holding include holding the article and the liquid carbon dioxide in the vessel for a duration of time sufficient for the at least a portion of the liquid carbon dioxide to infuse into at least a portion of the first region and into the at least a portion of the second region, and the method further comprises the step of exposing the infused article to the second pressure and second temperature for a duration of time such that the at least a portion of carbon dioxide infused into the at least a portion of the first region diffuses out of the at least a portion of the first region, while at least a portion of the infused carbon dioxide infused in the second region remains infused in the at least a portion of the second region following the exposing;

and the steps of subjecting and expanding include expanding the at least a portion of the second regional foamable fibrous element into the second regional foamed fibrous element without expanding the first regional material;

optionally wherein, following the step of exposing, the first region is substantially free of infused carbon dioxide, and optionally wherein the first region comprises or consists essentially of a barrier material.

In accordance with Aspect 221, the present disclosure is directed to the method of any one of Aspects 203-210, wherein the first region comprises or consists of the foamable fibrous element, the foamable fibrous element of the first region being a first regional foamable fibrous element;

the second region comprises or consists essentially of the foamable fibrous element, the foamable fibrous element of the second region being a second regional foamable fibrous element;

the step of maintaining and holding includes holding the article and the liquid carbon dioxide in the vessel for a duration of time sufficient for at least a portion of the liquid carbon dioxide to infuse into at least a portion of the first region and into at least a portion of the second region; and the steps of subjecting and expanding expand at least a portion of the first regional foamable fibrous element into a first regional foamed fibrous element, and expand at least a portion of the second regional foamable fibrous element into a second regional foamed fibrous element, optionally wherein the expanding includes expanding substantially all of the first regional foamable fibrous element or substantially all of the second regional foamable fibrous element, or expanding substantially all of the first regional foamable fibrous element and substantially all of the second regional foamable fibrous element.

In accordance with Aspect 222, the present disclosure is directed to the method of Aspect 221, wherein, in the foamed article, the first regional foamed fibrous element and the second regional foamed fibrous element are in contact with each other.

In accordance with Aspect 223, the present disclosure is directed to the method of Aspect 221, wherein, in the foamed article, the first regional foamed fibrous element and the second regional foamed fibrous element are not in contact with each other.

In accordance with Aspect 224, the present disclosure is directed to the method of any one of Aspects 203-223, wherein the first region comprises or consists essentially of the first regional foamable fibrous element and the second region comprises or consists essentially of a barrier material, or wherein the first region comprises or consists essentially of the barrier material and the second region comprises or consists essentially of the second regional foamable fibrous element;

the steps of maintaining and holding include holding the article and the liquid carbon dioxide in the vessel for a duration of time sufficient for the at least a portion of the liquid carbon dioxide to infuse into at least a portion of the first regional or second regional foamable fibrous element, wherein the duration of time is not sufficient for at least a portion of the liquid carbon dioxide to infuse into at least a portion of the barrier material;

and the steps of subjecting and expanding include expanding the first regional or second regional foamable material into the first regional or second regional foamed material without expanding the barrier material;

optionally wherein, in the foamed article, the first regional or second regional foamed material and the barrier material are in contact with each other, or the first regional or second regional foamed material and the barrier material are not in contact with each other.

In accordance with Aspect 225, the present disclosure is directed to the method of any one of the preceding Aspects, wherein the article is a layered article comprising one or more layers, at least one of the one or more layers individually comprising or consisting essentially of a textile according to any one of Aspects 25-55, optionally wherein the layered article further comprises one or more film layers, optionally wherein at least one of the one or more film layers individually comprises a solid foamable material.

In accordance with Aspect 226, the present disclosure is directed to the method of Aspect 225, wherein the at least one of the one or more layers individually comprising or consisting of a textile, or at least one of the one or more film layers, or both, comprise one or more protective layers, each of the one or more protective layers individually comprising or consisting essentially of a protective material, optionally wherein the protective material is an additional material, and/or optionally wherein the protective material is a solid foamable material according to any one of Aspects 1-8 or 76-103, optionally wherein the solid foamable material is a recycled material.

In accordance with Aspect 227, the present disclosure is directed to the method of any one of Aspects 1-202, wherein the foamed article includes a textile, optionally wherein the article is a layered article, optionally wherein the layered article comprises at least one unfoamed layer, optionally wherein the unfoamed layer is an unfoamed face layer, optionally wherein the layered article comprises at least one foamed inner layer, optionally wherein the layered article comprises one or more foamed inner layers and two unfoamed face layers.

In accordance with Aspect 228, the present disclosure is directed to the method of Aspect 227, wherein the layered article comprises one or more foamed inner layers and two unfoamed face layers, optionally wherein at least one of the unfoamed layers comprise a knit textile.

In accordance with Aspect 229, the present disclosure is directed to the method of any one of Aspects 1-202, wherein the article is a layered article having a layered structure including a series of three or more layers, including a first face layer comprising or consisting essentially of a first face layer material, the first face layer including a first face layer outer surface defining a first outer surface of the layered article, a first face layer inner surface opposing the first face layer outer surface, wherein the first face layer outer surface defines a first exterior surface of the layered article;

a second face layer comprising or consisting essentially of a second face layer material, the second face layer including a second face layer outer surface defining a second outer surface of the layered article, a second face layer inner surface opposing the second face layer outer surface, optionally wherein the second face layer outer surface defines a second exterior surface of the layered article; and one or more inner layers, wherein each of the one or more inner layers comprise or consist essentially of an inner layer material, each of the one or more inner layers including an inner layer first surface, an inner layer second surface, wherein each of the one or more inner layers is positioned between the first face layer inner surface and the second face layer inner surface;

wherein at least one of the three or more layers of the layered article comprises or consists essentially of a foamable fibrous element, and the steps of subjecting and expanding expands at least a portion of the foamable fibrous element of the at least one of the three or more layers into the foamed fibrous element, forming the foamed article.

In accordance with Aspect 230, the present disclosure is directed to the method of Aspect 229, wherein the step of maintaining and holding infuses the carbon dioxide into the first face layer, or infuses the carbon dioxide into the first face layer and at least one of the one or more inner layers, or infuses the carbon dioxide into the first face layer and into each of the one or more inner layers, or infuses the carbon dioxide into the first face layer, each of the one or more inner layers, and the second face layer.

In accordance with Aspect 231, the present disclosure is directed to the method of Aspect 229 or 230, wherein the method includes the step of exposing, and the exposing releases substantially all of the infused carbon dioxide from the first face layer while retaining infused carbon dioxide in at least one of the one or more inner layers, or releases substantially all of the infused carbon dioxide from the first face layer while retaining infused carbon dioxide in each of the one or more inner layers, or releases substantially all of the infused carbon dioxide from the first face layer while retaining infused carbon dioxide in each of the one or more inner layers and in the second face layer, or releases substantially all of the infused carbon dioxide from the first face layer while retaining infused carbon dioxide in the second face layer, optionally retaining infused carbon dioxide in at least one of the one or more inner layers, or releases substantially all of the infused carbon dioxide from the first face layer and each of the one or more inner layers while retaining infused carbon dioxide in the second face layer.

In accordance with Aspect 232, the present disclosure is directed to the method of any one of Aspects 229-231, wherein the article is configured as a series of four of more layers including one or more structural layers, each of the one or more structural layers comprising a structural layer material and including a structural layer first surface, a structural layer second surface opposing the structural layer first surface;

optionally wherein at least one of the one or more structural layers is positioned between the first face layer and the inner layer, or between the second face layer and the inner layer; or optionally wherein the one or more structural layers comprise two or more structural layers, and at least a first one of the two or more structural layers is positioned between an inner surface of a first face layer and the first surface of an inner layer, and at least a second one of the two or more structural layers is positioned between a second surface of an inner layer and the inner surface of the second face layer; and optionally wherein at least one of the one or more structural layers comprises a foamable fibrous element according to any one of Aspects 1-202.

In accordance with Aspect 233, the present disclosure is directed to the method of 232, wherein a first surface of a first one of the structural layers is in contact with the inner surface of the first face layer, and the second surface of the first one of the structural layers is in contact with a first surface of one of the one or more inner layers, or wherein the first surface of a second one of the one or more structural layers is in contact with the second surface of one of the one or more inner layers, and the second surface of the second one of the structural layers is in contact with an inner surface of the second face layer, or both.

In accordance with Aspect 234, the present disclosure is directed to the method of 232 or 233, wherein, in the article, the structural layer material of at least one of the one or more structural layers comprises or consists essentially of the solid foamable material, and the steps of subjecting and expanding expands at least a portion of the solid foamable material of the one or more structural layers into the foamed material, forming the foamed article.

In accordance with Aspect 235, the present disclosure is directed to the method of any one of Aspects 232-234, wherein the step of maintaining and holding infuses the carbon dioxide into the first face layer, or infuses the carbon dioxide into the first face layer and at least one of the one or more structural layers; or into the first face layer, at least one of the one or more structural layers; or into the first face layer, at least one of the one or more structural layers, and at least one of the one or more inner layers; or infuses the carbon dioxide into the first face layer, at least one of the one or more structural layers, and each of the one or more inner layers; or infuses the carbon dioxide into the first face layer, each of the one or more structural layers, each of the one or more inner layers, and the second face layer.

In accordance with Aspect 236, the present disclosure is directed to the method of any one of Aspects 232-235, wherein the method includes the step of exposing, and the exposing releases substantially all of the infused carbon dioxide from the first face layer while retaining infused carbon dioxide in at least one of the one or more structural layers; or releases substantially all of the infused carbon dioxide from the first face layer and from a first of the one or more structural layers while retaining infused carbon dioxide in a second of the one or more structural layers; or releases substantially all of the infused carbon dioxide from the first face layer, from one or more of the at least one structural layers, and a first one of the one or more inner layers while retaining infused carbon dioxide in a second one of the one or more inner layers, in a second one of the one or more structural layers, and in the second face layer; or releases substantially all of the infused carbon dioxide from the first face layer, from at least a first one of the one or of the one or more structural layers, and from at least one of the one or more inner layers while retaining infused carbon dioxide in at least one of the one or more inner layers, in the second face layer, and optionally in a second one of the one or more structural layers; or releases substantially all of the infused carbon dioxide from the first face layer, each of the one or more structural layers, and each of the one or more inner layers while retaining infused carbon dioxide in the second face layer.

In accordance with Aspect 237, the present disclosure is directed to the method of any one of Aspects 232-236, wherein the article comprises a first structural layer and a second structural layer, the structural layer material of at least one the first structural layer and the second structural layer comprises or consists essentially of the solid foamable material, and the steps of subjecting and expanding expands at least a portion of the solid foamable material of the first structural layer, or of the second structural layer, or of both into the foamed material, forming the foamed article.

In accordance with Aspect 238, the present disclosure is directed to a method of manufacturing an article, the method comprising:

affixing a first component to a second component, wherein the first component is a foamed article made by the method of any one of the preceding Aspects.

In accordance with Aspect 239, the present disclosure is directed to the method of Aspect 238, wherein the first component is a first component of an article of apparel, the second component is a second component of an article of apparel, and the article is an article of apparel.

In accordance with Aspect 240, the present disclosure is directed to the method of Aspect 238, wherein the first component is a first component of an article of footwear, the second component is a second component of an article of footwear, and the article is an article of footwear.

In accordance with Aspect 241, the present disclosure is directed to the method of Aspect 240, wherein the first component is a cushioning element, and the second element is a sole component or an upper component.

In accordance with Aspect 242, the present disclosure is directed to the method of Aspect 238, wherein the first component is a first component of an article of sporting equipment, the second component is a second component of an article of sporting equipment, and the article is an article of sporting equipment.

In accordance with Aspect 243, the present disclosure is directed to a foamed article made by the method of any one of Aspects 1-237.

In accordance with Aspect 244, the present disclosure is directed to a foamed article comprising:

a foamed fibrous element comprising or consisting essentially of a first plurality of filaments, fibers, yarns, or any combination thereof, wherein each of the first plurality of filaments, fibers, yarns, or any combination thereof, is an individual foamed filament, fiber, yarn, or any combination thereof, comprising a first foamed material which is a physically-expanded foam formed of a thermoplastic elastomeric material comprising one or more first thermoplastic elastomers.

In accordance with Aspect 245, the present disclosure is directed to the foamed article of Aspect 244, wherein the foamed material is a product of placing an unfoamed article comprising a solid foamable material in liquid carbon dioxide, infusing the solid foamable material with the liquid carbon dioxide, and expanding the infused solid foamable material by phase transitioning the infused carbon dioxide into a gas under conditions which do not soften the solid foamable material, thereby forming the foamed material of the foamed article.

In accordance with Aspect 246, the present disclosure is directed to the foamed article of Aspect 244 or 245, wherein the foamed article is a stabilized foamed article comprising the stabilized foamed material, wherein the stabilized foamed material is free of or substantially free of infused carbon dioxide.

In accordance with Aspect 247, the present disclosure is directed to the foamed article of any one of Aspects 244-246, wherein, at a first pressure of from about 0.05 pounds per square inch (0.345 kilopascals) to about 6000 pounds per square inch (41,300 kilopascals), and a first temperature of from about −57 degrees Celsius to about 31 degrees Celsius, the liquid carbon dioxide is soluble in the foamed material, or in the solid foamable material, or in both, at a concentration of from about 1 weight percent to about 30 weight percent, optionally from about 5 weight percent to about 20 weight percent.

In accordance with Aspect 248, the present disclosure is directed to the foamed article of any one of Aspects 244-247, wherein the foamed material of the foamed article is substantially opaque.

In accordance with Aspect 249, the present disclosure is directed to the foamed article of any one of Aspects 244-248, wherein the foamed material has a split-tear value of from about 2.5 kilograms per centimeter to about 3.0 kilograms per centimeter.

In accordance with Aspect 250, the present disclosure is directed to the foamed article of any one of Aspects 244-249, wherein the foamed material has an Asker C hardness of from about 10 to about 50.

In accordance with Aspect 251, the present disclosure is directed to the foamed article of any one of Aspects 243-250, wherein the foamed fibrous element comprises:

a first yarn comprising a core and a solid foamed material surrounding the core, optionally wherein the core comprises or consists essentially of a second solid foamed material.

In accordance with Aspect 252, the present disclosure is directed to the foamed article of Aspect 251, wherein the solid foamed material is attached to the core.

In accordance with Aspect 253, the present disclosure is directed to the foamed article of Aspect 252, wherein the solid foamed material substantially surrounds the core.

In accordance with Aspect 254, the present disclosure is directed to the foamed article of Aspect 252, wherein the solid foamed material partially surrounds the core.

In accordance with Aspect 255, the present disclosure is directed to the foamed article of any one of Aspects 251-254, wherein the core has a percent elongation of less than 30 percent, or of less than 25 percent, or from about 5 percent to about 25 percent.

In accordance with Aspect 256, the present disclosure is directed to the foamed article of any one of Aspects 251-254, wherein the core has a breaking strength of at least 1.5 kilograms force per centimeter squared, or from about 1.5 to about 10 kilograms force per centimeter squared.

In accordance with Aspect 257, the present disclosure is directed to the foamed article of any one of Aspects 251-254, wherein the core has a linear mass density from about 60 to about 70,000 denier, from about 100 to about 1,000 denier, or from about 150 to about 500 denier.

In accordance with Aspect 258, the present disclosure is directed to the foamed article of any one of Aspects 251-254, wherein the core has a tenacity from about 1.5 to about 10.0 grams per denier, or from about 1.5 to about 4.0 grams per denier, or from about 2.5 to about 4.0 grams per denier.

In accordance with Aspect 259, the present disclosure is directed to the foamed article of any one of Aspects 251-258, wherein the core includes a core yarn.

In accordance with Aspect 260, the present disclosure is directed to the foamed article of Aspect 259, wherein the core yarn comprises a plurality of fibers or filaments, optionally wherein the core yarn is at least one of a spun yarn, a twisted yarn, and an entangled yarn.

In accordance with Aspect 261, the present disclosure is directed to the foamed article of Aspect 260, wherein the core yarn is a monofilament yarn.

In accordance with Aspect 262, the present disclosure is directed to the foamed article of Aspect 261, wherein the core material comprises a polyester.

In accordance with Aspect 263, the present disclosure is directed to the foamed article of Aspect 262, wherein the core comprises an entangled multi-filament yarn.

In accordance with Aspect 264, the present disclosure is directed to the foamed article of any one of Aspects 251-263, wherein the core has a cross-sectional diameter and the solid foamed material has an average thickness such that the cross-sectional diameter of the core is at least 3 times smaller than the average thickness of the solid foamed material.

In accordance with Aspect 265, the present disclosure is directed to the foamed article of any one of Aspects 251-263, wherein the solid foamed material has an average thickness from about 0.4 millimeters to about 3.0 millimeters.

In accordance with Aspect 266, the present disclosure is directed to the foamed article of any one of Aspects 251-265, wherein the yarn has an average cross-sectional diameter of less than about 4.0 millimeters.

In accordance with Aspect 267, the present disclosure is directed to the foamed article of any one Aspects 251-266, wherein the foamed fibrous element is a textile element or a portion of a textile element.

In accordance with Aspect 268, the present disclosure is directed to the foamed article of Aspect 267, wherein the textile element comprises or consists essentially of a knit textile, a woven textile, a crocheted textile, a braided textile, a tatted textile, a non-woven textile, or any combination thereof.

In accordance with Aspect 269, the present disclosure is directed to the foamed article of Aspect 268, wherein the textile element comprises a knit textile comprising a first area, wherein the first area comprises a plurality of knit loops comprising a first yarn; and a second yarn at least partially inlaid within the first area of the knit textile such that the second yarn extends between at least a first loop and a second loop of the plurality of knit loops, wherein the first yarn, the second yarn, or both the first yarn and the second yarn comprise or consist essentially of a foamed material according to any one of Aspects 1-8 or 152-159.

In accordance with Aspect 270, the present disclosure is directed to the foamed article of Aspect 269, wherein the second yarn includes a first portion that is exposed on a first surface in the first area.

In accordance with Aspect 271, the present disclosure is directed to the foamed article of Aspect 270, wherein the first portion has a length that is greater than or equal to the length of a portion of a first course that includes at least three consecutive knit loops, the first course being in the first area.

In accordance with Aspect 272, the present disclosure is directed to the foamed article of Aspect 270, where the second yarn additionally includes a second portion that is exposed on the first surface in the first area, and where the second yarn includes a covered portion extending from the first portion to the second portion.

In accordance with Aspect 273, the present disclosure is directed to the foamed article of Aspect 272, where a length of the second portion is larger than a length of the first portion.

In accordance with Aspect 274, the present disclosure is directed to the foamed article of Aspect 270, where a second course extends through a second area with a second surface, where the second yarn is at least partially inlaid within the second course, and where the second yarn includes a second portion that is exposed on the second surface in the second area.

In accordance with Aspect 275, the present disclosure is directed to the foamed article of Aspect 274, where the second portion of the second yarn includes a length that is larger than a length of the first portion of the second yarn.

In accordance with Aspect 276, the present disclosure is directed to the foamed article of Aspect 275, wherein the textile element is a knit textile, and the first yarn is inlaid in the knit textile.

In accordance with Aspect 277, the present disclosure is directed to the foamed article of any one of Aspects 269-276, further comprising a third yarn inlaid between at least a first loop and a second loop of the knit textile, optionally wherein the third yarn comprises or consists essentially of a foamable material according to any one of Aspects 1-8 or 76-103.

In accordance with Aspect 278, the present disclosure is directed to the foamed article of Aspect 268, wherein the textile element comprises a non-woven textile.

In accordance with Aspect 279, the present disclosure is directed to the foamed article of Aspect 278, wherein the non-woven textile comprises a sheet or web structure comprising the first fibrous element, wherein the plurality of fibers, filaments, or yarns are bonded together.

In accordance with Aspect 280, the present disclosure is directed to the foamed article of Aspect 279, wherein the first plurality of fibers, filaments, or yarns are bonded by chemical bonds, mechanical bonds, or any combination thereof.

In accordance with Aspect 281, the present disclosure is directed to the foamed article of 280, wherein the chemical bonds, mechanical bonds, or combination thereof are formed using thermal bonding, hydro-entanglement, ultrasonic bonding, needlepunching, chemical bonding, meltblown bonding, or any combination thereof, optionally wherein the thermal bonding is achieved with calendering or without calendering, or optionally wherein the chemical bonding is achieved using a binder, optionally wherein the binder is a latex emulsion, a binder fiber, or a binder powder, or wherein the chemical bonding is achieved using a solution polymer.

In accordance with Aspect 282, the present disclosure is directed to the foamed article of any one of Aspects 278-281, wherein the non-woven textile is produced from extruded fibers, optionally wherein the extruded fibers are produced using a meltblown process, a spunbond process, or any combination thereof.

In accordance with Aspect 283, the present disclosure is directed to the foamed article of Aspect 268, wherein the textile element comprises a crocheted textile comprising a first area, wherein the first area comprises a plurality of crocheted loops comprising a first yarn; and a second yarn at least partially inlaid within the first area of the crocheted textile such that the second yarn extends between at least a first loop and a second loop of the plurality of crocheted loops, wherein the first yarn, the second yarn, or the first yarn and the second yarn comprise or consist essentially of a foamable material according to any one of Aspects 1-8 or 76-103.

In accordance with Aspect 284, the present disclosure is directed to the foamed article of Aspect 283, wherein the first portion has a length that is greater than or equal to the length of a portion of a first course that includes at least three consecutive crocheted loops, the first course being in the first area In accordance with Aspect 285, the present disclosure is directed to the foamed article of Aspect 283 or 284, wherein the second yarn is interconnected to the first yarn, forming a second crocheted course.

In accordance with Aspect 286, the present disclosure is directed to the foamed article of Aspect 285, further comprising a third yarn inlaid between the first and second courses, optionally wherein the third yarn comprises or consists essentially of a foamable material according to any one of Aspects 1-8 or 76-103.

In accordance with Aspect 287, the present disclosure is directed to the foamed article of Aspect 268, wherein the textile element comprises a woven textile.

In accordance with Aspect 288, the present disclosure is directed to the foamed article of Aspect 287, further comprising a first plurality of warp yarns oriented along a first direction, forming a warp, wherein the first plurality of warp yarns comprises or consists essentially of a foamable material according to any one of Aspects 1-8 or 76-103.

In accordance with Aspect 289, the present disclosure is directed to the foamed article of Aspect 288, further comprising a second plurality of yarns oriented along a second direction unique from the first direction, forming a weft comprising a plurality of weft yarns, optionally wherein the second plurality of yarns comprises or consists essentially of a foamable material according to any one of Aspects 1-8 or 76-103.

In accordance with Aspect 290, the present disclosure is directed to the foamed article of Aspect 289, wherein the warp and weft are interwoven.

In accordance with Aspect 291, the present disclosure is directed to the foamed article of Aspect 268, wherein the textile element comprises a braided textile, wherein the braided textile comprises a first yarn, a second yarn, and a third yarn, and wherein the first, second, and third yarns are braided, wherein the first yarn, the second yarn, the third yarn, or any combination thereof, comprises or consists essentially of a foamable material according to any one of Aspects 1-8 or 76-103.

In accordance with Aspect 292, the present disclosure is directed to the foamed article of any one of Aspects 268-291, wherein the textile element comprises an embroidered region.

In accordance with Aspect 293, the present disclosure is directed to the foamed article of any one of Aspects 269-277, wherein the textile element comprises a knit textile comprising a first fiber, a first filament, or a first yarn, and a second fiber, second filament, or second yarn, optionally wherein the first fiber, first filament, or first yarn comprises or consists essentially of a foamed material according to any one of Aspects 1-8 or 152-159, or wherein the second fiber, second filament, or second yarn comprises or consists essentially of a foamed material according to any one of Aspects 1-8 or 152-159, or wherein both the first fiber, first filament, or first yarn and second fiber, second filament, or second yarn comprise or consist essentially of a foamed material according to any one of Aspects 1-8 or 152-159.

In accordance with Aspect 294, the present disclosure is directed to the foamed article of Aspect 293, wherein, in the knit textile, the first and second yarns at least partly form a plurality of interconnected courses on an outer surface of the knit textile, the outer surface having at least a first zone, a second zone, and a third zone, the second zone positioned between the first and third zones, wherein the first zone comprises an increased concentration of the second yarn compared to the second zone, and wherein the third zone comprises an increased concentration of the first yarn compared to the second zone.

In accordance with Aspect 295, the present disclosure is directed to the foamed article according to Aspect 294, wherein each course of the plurality of interconnected courses includes the first yarn and the second yarn.

In accordance with Aspect 296, the present disclosure is directed to the foamed article according to Aspect 294 or 295, wherein the plurality of interconnected courses comprises a first course interconnected to a second course.

In accordance with Aspect 297, the present disclosure is directed to the foamed article according to Aspect 296, wherein, in the first course, the first yarn extends from the third zone into the second zone and the second yarn extends from the second zone into the first zone, and wherein, in the second course, the first yarn extends from the third zone into the second zone and is interlooped with at least a portion of the first yarn of the first course in a first portion of the second zone.

In accordance with Aspect 298, the present disclosure is directed to the foamed article according to Aspect 296 or 297, wherein, in the second course, the second yarn extends from the second zone into the first zone, and wherein the second yarn of the second course is interlooped with at least a portion of the first yarn of the first course in a second portion of the second zone.

In accordance with Aspect 299, the present disclosure is directed to the foamed article according to any one of Aspects 296-298, wherein, in the second course, the second yarn of the second course is interlooped with at least a portion of the second yarn of the first course in a third portion of the second zone.

In accordance with Aspect 300, the present disclosure is directed to the foamed article according to any one of Aspects 296-298, wherein, in the second zone, adjacent courses of the plurality of interconnected courses have a different number of loops of the first yarn.

In accordance with Aspect 301, the present disclosure is directed to the foamed article according to any one of Aspects 296-300, wherein, in the second zone, at least some of the adjacent courses of the plurality of interconnected courses have different numbers of loops of the second yarn.

In accordance with Aspect 302, the present disclosure is directed to the foamed article according to any one of Aspects 296-301, wherein, in the second zone, at least some of the adjacent courses of the plurality of interconnected courses have different numbers of loops of the first yarn and the second yarn.

In accordance with Aspect 303, the present disclosure is directed to the foamed article according to any one of Aspects 296-302, wherein, in the second zone, a first wale having loops of the first yarn is adjacent to a second wale having loops of the second yarn.

In accordance with Aspect 304, the present disclosure is directed to the foamed article according to any one of Aspects 296-303, wherein the knit textile is an upper for an article of footwear.

In accordance with Aspect 305, the present disclosure is directed to the foamed article according to Aspect 304, wherein the first zone forms at least a portion of a forefoot opening area and/or an ankle collar area.

In accordance with Aspect 306, the present disclosure is directed to the foamed article according to Aspect 304 or 305, wherein, when the upper is present on a last, the upper wraps around at least a portion of the last and covers a bottom portion of the last.

In accordance with Aspect 307, the present disclosure is directed to the foamed article according to any one of Aspects 293-306, wherein the first yarn exhibits a tenacity of at least about 0.9 grams/denier, optionally of from about 1 gram/denier to about 5 grams/denier, from about 1.5 grams/denier to about 4.5 grams/denier, or of from about 2.0 grams/denier to about 4.5 grams/denier.

In accordance with Aspect 308, the present disclosure is directed to the foamed article according to any one of Aspects 293-307, wherein the first yarn exhibits an elongation of less than about 130 percent, optionally of about 10 percent to about 130 percent, about 20 percent to about 130 percent, or about 40 percent to about 130 percent.

In accordance with Aspect 309, the present disclosure is directed to the foamed article according to any one of Aspects 293-308, wherein the first yarn exhibits a shrinkage of less than about 60 percent, optionally about 0 percent to about 60 percent, about 0 percent to about 30 percent, or about 0 percent to about 20 percent.

In accordance with Aspect 310, the present disclosure is directed to the foamed article according to any one of Aspects 293-309, wherein the first yarn is essentially free of dye.

In accordance with Aspect 311, the present disclosure is directed to the foamed article according to any one of Aspects 293-310, wherein the second yarn is a package dyed yarn or is a solution dyed yarn.

In accordance with Aspect 312, the present disclosure is directed to the foamed article of any one of Aspects 243-311, wherein the thermoplastic elastomeric material comprises a polymeric component including all of the polymers present in the thermoplastic elastomeric material, and the polymeric component consists of the one or more first thermoplastic elastomers.

In accordance with Aspect 313, the present disclosure is directed to the foamed article of any one of Aspects 243-312, wherein the one or more first thermoplastic elastomers comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In accordance with Aspect 314, the present disclosure is directed to the foamed article of any one of Aspects 243-313, wherein the one or more first thermoplastic elastomers comprise or consist essentially of one or more thermoplastic elastomeric polyamide homopolymers or copolymers.

In accordance with Aspect 315, the present disclosure is directed to the foamed article of any one of Aspects 243-314, wherein the one or more first thermoplastic elastomers comprise or consist essentially of polyether block polyamide (PEBA) copolymer elastomers.

In accordance with Aspect 316, the present disclosure is directed to the foamed article of any one of Aspects 243-315, wherein the one or more first thermoplastic elastomers comprise or consist essentially of one or more thermoplastic elastomeric styrenic homopolymers or copolymers.

In accordance with Aspect 317, the present disclosure is directed to the foamed article of any one of Aspects 243-316, wherein the one or more first thermoplastic elastomers comprise or consist essentially of styrene butadiene styrene (SBS) block copolymer elastomers, styrene ethylene butylene styrene (SEBS) copolymer elastomers, styrene acrylonitrile (SAN) copolymer elastomers, or any combination thereof.

In accordance with Aspect 318, the present disclosure is directed to the foamed article of any one of Aspects 243-317, wherein the one or more first thermoplastic elastomers comprise or consist essentially of one or more thermoplastic polyurethane elastomeric homopolymers or copolymers.

In accordance with Aspect 319, the present disclosure is directed to the foamed article of any one of Aspects 243-318, wherein the one or more first thermoplastic elastomers comprise or consist essentially of thermoplastic polyester-polyurethane elastomers, polyether-polyurethane elastomers, polycarbonate-polyurethane elastomers, or any combination thereof.

In accordance with Aspect 320, the present disclosure is directed to the foamed article of any one of Aspects 243-319, wherein the one or more first thermoplastic elastomers comprises or consists essentially of one or more thermoplastic polyester-polyurethane elastomers, optionally wherein the polymeric component of the thermoplastic elastomeric material consists of one or more thermoplastic polyester-polyurethane elastomers.

In accordance with Aspect 321, the present disclosure is directed to the foamed article of any one of Aspects 243-320, wherein the one or more first thermoplastic elastomers comprises or consists essentially of one or more thermoplastic polyolefin elastomeric homopolymers or copolymers.

In accordance with Aspect 322, the present disclosure is directed to the foamed article of any one of Aspects 243-321, wherein the one or more first thermoplastic elastomers comprises or consists essentially of thermoplastic elastomeric polypropylene homopolymers or copolymers, thermoplastic elastomeric polyethylene homopolymers or copolymers, thermoplastic elastomeric polybutylene homopolymers or copolymers, or any combination thereof.

In accordance with Aspect 323, the present disclosure is directed to the foamed article of any one of Aspects 243-322, wherein the one or more first thermoplastic elastomers comprises or consists essentially of thermoplastic elastomeric ethylene-vinyl acetate copolymers.

In accordance with Aspect 324, the present disclosure is directed to the foamed article of Aspect 323, wherein the thermoplastic elastomeric ethylene-vinyl acetate copolymers include from about 25 to about 50 weight percent vinyl acetate content.

In accordance with Aspect 325, the present disclosure is directed to the foamed article of any one of Aspects 243-324, wherein the thermoplastic elastomeric material comprises a mixture of the polymeric component and a non-polymeric component consisting of one or more non-polymeric additives, optionally wherein the foamable material comprises from about 0.005 to about 20 percent by weight of the non-polymeric component based on a total weight of the foamable material, or about 0.5 to about 10 percent by weight of the non-polymeric additive based on a total weight of the foamable material.

In accordance with Aspect 326, the present disclosure is directed to the foamed article of any one of Aspects 243-325, wherein the one or more first thermoplastic elastomers comprises or consists essentially of one or more recycled first thermoplastic elastomers.

In accordance with Aspect 327, the present disclosure is directed to the foamed article of any one of Aspects 243-326, wherein the foamed material comprises or consists essentially of a blend of the one or more first thermoplastic elastomers and a second material, optionally wherein the second material comprises or consists essentially of one or more second polymers, optionally wherein the one or more second polymers comprise or consist essentially of one or more second thermoplastics.

In accordance with Aspect 328, the present disclosure is directed to the foamed article of Aspect 327, wherein the polymeric component of the foamed material consists of a blend of the one or more first thermoplastic elastomers and the one or more second thermoplastics.

In accordance with Aspect 329, the present disclosure is directed to the foamed article of Aspect 327 or 328, wherein the one or more second thermoplastics comprise one or more thermoplastic polyolefin homopolymers or copolymers, one or more thermoplastic polyamide homopolymers or copolymers, one or more thermoplastic polyester homopolymers or copolymers, one or more thermoplastic polyurethane homopolymers or copolymers, one or more thermoplastic styrenic homopolymers or copolymers, or any combination thereof.

In accordance with Aspect 330, the present disclosure is directed to the foamed article of any one of Aspects 327-329, wherein the one or more second thermoplastics comprise or consist essentially of thermoplastic polypropylene homopolymers or copolymers, thermoplastic polyethylene homopolymers or copolymers, thermoplastic polybutylene homopolymers or copolymers, or any combination thereof.

In accordance with Aspect 331, the present disclosure is directed to the foamed article of any one of Aspects 327-330, wherein the one or more second thermoplastics comprise or consist essentially of one or more thermoplastic polyethylene copolymers.

In accordance with Aspect 332, the present disclosure is directed to the foamed article of any one of Aspects 327-331, wherein the one or more second thermoplastics comprise or consist essentially of one or more thermoplastic ethylene-vinyl alcohol copolymers.

In accordance with Aspect 333, the present disclosure is directed to the foamed article of any one of Aspects 327-332, wherein the polymeric component of the foamed material consists of one or more first thermoplastic elastomeric polyurethane homopolymers or copolymers, and one or more second thermoplastic ethylene-vinyl alcohol copolymers.

In accordance with Aspect 334, the present disclosure is directed to the foamed article of any one of Aspects 327-333, wherein the polymeric component of the foamed material consists of one or more first thermoplastic elastomeric polyester-polyurethane copolymers and one or more second thermoplastic ethylene-vinyl alcohol copolymers.

In accordance with Aspect 335, the present disclosure is directed to the foamed article of any one of Aspects 327-334, wherein the blend comprises one or more recycled first thermoplastic elastomers, or one or more recycled second thermoplastics, or both.

In accordance with Aspect 336, the present disclosure is directed to the foamed article of any one of Aspects 327-335, wherein the blend is a phase-separated blend of the one or more first thermoplastic elastomers and the one or more second thermoplastics.

In accordance with Aspect 337, the present disclosure is directed to the foamed article of Aspect 336, wherein the phase-separated blend includes one or more phase-separated regions including interfaces between the one or more first thermoplastic elastomers and the one or more second thermoplastics.

In accordance with Aspect 338, the present disclosure is directed to the foamed article of any one of Aspects 327-337, wherein the blend comprises about 95 percent by weight of the one or more first thermoplastic elastomers and about 5 percent by weight of the one or more second thermoplastics based on a total weight of the blend.

In accordance with Aspect 339, the present disclosure is directed to the foamed article of any one of Aspects 243-338, wherein the foamed article comprises an additional material, wherein the additional material is a separate material from the foamed material, wherein the additional material comprises or consists essentially of one or more polymers, and includes an additional material polymeric component consisting of all the polymers present in the additional material; optionally wherein the additional material comprises or consists essentially of a second material according to any one of Aspects 87-99, optionally wherein the second material is a thermoplastic material; optionally wherein the additional material comprises the additional material polymeric component mixed with an additional material non-polymeric component consisting of all non-polymeric components present in the additional material, optionally wherein the article comprises an additional fibrous element comprising or consisting essentially of the additional material.

In accordance with Aspect 340, the present disclosure is directed to the foamed article of Aspect 339, wherein the additional fibrous element comprises or consists essentially of a second plurality of filaments, fibers, yarns, or any combination thereof, optionally wherein the second plurality of filaments, fibers, yarns, or any combination thereof comprises or consists essentially of the additional material.

In accordance with Aspect 341, the present disclosure is directed to the foamed article of Aspect 340, wherein the additional fibrous element is a second textile element.

In accordance with Aspect 342, the present disclosure is directed to the foamed article of Aspect 341, wherein the second textile element comprises or consists essentially of a knit textile, a woven textile, a crocheted textile, a braided textile, a tatted textile, a non-woven textile, or any combination thereof.

In accordance with Aspect 343, the present disclosure is directed to the foamed article of any one of Aspects 243-342, wherein the foamed article comprises one or more first portions of the foamed fibrous element and one or more second portions of the additional material, and wherein the one or more first portions are distinct from the one or more second portions.

In accordance with Aspect 344, the present disclosure is directed to the foamed article of Aspect 342 or 343, wherein the additional material comprises a plasticizer.

In accordance with Aspect 345, the present disclosure is directed to the foamed article of any one of Aspects 342-344, wherein, in the foamed article, the additional material is substantially unfoamed.

In accordance with Aspect 346, the present disclosure is directed to the foamed article of any one of Aspects 342-345, wherein the additional material is a thermoplastic material, optionally wherein the additional material is an additional foamed material.

In accordance with Aspect 347, the present disclosure is directed to the foamed article of any one of Aspects 342-344 or 346, wherein the foamed article comprises the foamed material, wherein the foamed material is a first foamed material, and the foamed article further comprises a second foamed material, wherein the second foamed material comprises or consists essentially of the additional material.

In accordance with Aspect 348, the present disclosure is directed to the foamed article of Aspect 347, wherein, in the foamed article, a density of the first foamed material differs from a density of the second foamed material by at least 5 percent, at least 10 percent, or at least 20 percent.

In accordance with Aspect 349, the present disclosure is directed to the foamed article of any one of Aspects 347 or 348, wherein the second foamed material is a second physically-expanded foam.

In accordance with Aspect 350, the present disclosure is directed to the foamed article of any one of Aspects 347-349, wherein the second physically-expanded foam is a product of placing the unfoamed article comprising the solid additional material in liquid carbon dioxide, infusing the solid additional material with the liquid carbon dioxide, and expanding the infused solid additional material by phase transitioning the infused carbon dioxide into a gas under conditions which do not soften the solid additional material, thereby forming the foamed additional material of the foamed article.

In accordance with Aspect 351, the present disclosure is directed to the foamed article of any one of Aspects 342-350, wherein the additional material is a recycled material comprising one or more recycled polymers, optionally wherein the one or more recycled polymers comprise one or more recycled thermoplastics, optionally wherein the one or more recycled thermoplastics comprise one or more recycled thermoplastic elastomers; optionally wherein the recycled material comprises a recycled material polymeric component consisting of one or more recycled thermoplastics, optionally wherein the recycled material polymeric component consists of one or more recycled thermoplastic elastomers.

In accordance with Aspect 352, the present disclosure is directed to the foamed article of Aspect 351, wherein the recycled material comprises one or more recycled first thermoplastic elastomers, optionally wherein the one or more recycled first thermoplastic elastomers comprise one or more reground first thermoplastic elastomers, optionally wherein the one or more recycled or reground first thermoplastic elastomers include a thermoplastic elastomer according to any one of Aspects 76-90.

In accordance with Aspect 353, the present disclosure is directed to the foamed article of Aspect 351 or 352, wherein the recycled material further comprises one or more recycled second thermoplastics, optionally wherein the one or more recycled second thermoplastics comprise one or more reground second thermoplastics, optionally wherein the one or more recycled or reground second thermoplastics include a thermoplastic elastomer according to any one of Aspects 76-90.

In accordance with Aspect 354, the present disclosure is directed to the foamed article of Aspect 353, wherein the recycled material comprises one or more recycled or reground thermoplastic polyurethane elastomers, one or more recycled or reground thermoplastic ethylene-vinyl alcohol copolymers, or both.

In accordance with Aspect 355, the present disclosure is directed to the foamed article of Aspect 353 or 354, wherein the recycled material comprises a blend of the one or more recycled or reground thermoplastic elastomers and one or more second thermoplastics, or wherein the recycled material comprises a blend of one or more thermoplastic elastomers and one or more recycled thermoplastics or one or more recycled second thermoplastics, optionally wherein the blend is a phase-separated blend and optionally wherein the phase-separated blend comprises one or more interfaces between the one or more first thermoplastic elastomers and the one or more second thermoplastics.

In accordance with Aspect 356, the present disclosure is directed to the foamed article of any of Aspects 353-355, wherein the recycled material comprises about 99 percent to about 90 percent by weight of the one or more first thermoplastic elastomers and about 1 percent to about 10 percent by weight of the second thermoplastics based on a total weight of the recycled material, optionally wherein the recycled material comprises about 99 percent to about 93 percent by weight of the one or more first thermoplastic elastomers and about 1 percent to about 7 percent by weight of the one or more second thermoplastics, or about 99 percent to about 95 percent by weight of the one or more first thermoplastic elastomers and about 1 percent to about 5 percent by weight of the one or more second thermoplastic elastomers.

In accordance with Aspect 357, the present disclosure is directed to the foamed article of any one of Aspects 351-356, wherein the recycled material comprises about 99 percent to about 50 percent by weight of recycled or reground polymers based on a total weight of recycled material, optionally from about 99 percent to about 75 percent by weight of recycled or reground polymers.

In accordance with Aspect 358, the present disclosure is directed to the foamed article of any one of Aspects 351-357, wherein, at a first pressure of from about 0.05 pounds per square inch (0.345 kilopascals) to about 6000 pounds per square inch (41,300 kilopascals), and a first temperature of from about −57 degrees Celsius to about 31 degrees Celsius, the liquid carbon dioxide is soluble in the recycled material at a concentration of from about 1 weight percent to about 30 weight percent based on a total weight of the recycled material, optionally from about 5 weight percent to about 20 weight percent.

In accordance with Aspect 359, the present disclosure is directed to the foamed article of any of Aspects 351-358, wherein, at a first pressure of from about 0.05 pounds per square inch (0.345 kilopascals) to about 6000 pounds per square inch (141,300 kilopascals), and a first temperature of from about −57 degrees Celsius to about 31 degrees Celsius, the liquid carbon dioxide is soluble in the one or more recycled or reground thermoplastic elastomers at a concentration of from about 1 weight percent to about 30 weight percent based on a total weight of the one or more recycled or reground thermoplastic elastomers, optionally from about 5 weight percent to about 20 weight percent.

In accordance with Aspect 360, the present disclosure is directed to the foamed article of any of Aspects 351-359, wherein, at a first pressure of from about 0.05 pounds per square inch (0.345 kilopascals) to about 6000 pounds per square inch (41,300 kilopascals), and a first temperature of from about −57 degrees Celsius to about 31 degrees Celsius, the liquid carbon dioxide is soluble in the one or more recycled or reground second thermoplastics at less than 1 weight percent, optionally less than 0.1 weight percent based on a total weight of the one or more recycled or reground second thermoplastics, or optionally wherein the liquid carbon dioxide is substantially insoluble in the one or more recycled or reground second thermoplastics.

In accordance with Aspect 361, the present disclosure is directed to the foamed article of any one of Aspects 351-360, wherein the recycled material comprises a recycled foamed article, optionally wherein the recycled foamed article is a reground foamed article, optionally wherein the recycled foamed article is a foamed article according to any one of Aspects 243-360.

In accordance with Aspect 362, the present disclosure is directed to the foamed article of any one of Aspects 351-360, wherein the recycled material comprises a solid material, wherein the solid material is a thermoplastic elastomeric material.

In accordance with Aspect 363, the present disclosure is directed to the foamed article of any of Aspects 351-362, wherein the recycled material further comprises one or more virgin first thermoplastic elastomers, optionally wherein the one or more virgin first thermoplastic elastomers includes one or more virgin thermoplastic polyurethane elastomers.

In accordance with Aspect 364, the present disclosure is directed to the foamed article of any of Aspects 351-363, wherein the recycled material includes one or more nucleating agents or one or more interfaces between phase-separated polymers.

In accordance with Aspect 365, the present disclosure is directed to the foamed article of any one of Aspects 351-364, wherein the thermoplastic elastomeric material is a recycled material, or comprises a recycled material, or consists essentially of a recycled material.

In accordance with Aspect 366, the present disclosure is directed to the foamed article of any one of Aspects 351-365, wherein the foamed material is a first foamed material, the foamed article comprises a second foamed material, the second foamed material is an additional material, and the thermoplastic elastomeric material of the first foamed material is a recycled material, or the additional material of the second foamed material is a recycled material, or both the thermoplastic elastomeric material and the additional material are recycled materials.

In accordance with Aspect 367, the present disclosure is directed to the foamed article of any one of Aspects 243-366, wherein the foamed article comprises a structural layer or structural region, and the structural layer or structural region comprises or consists essentially of a structural material.

In accordance with Aspect 368, the present disclosure is directed to the foamed article of Aspect 367, wherein the structural material is an additional material according to any one of Aspects 104-132, optionally wherein the structural material comprises a blend of two or more additional materials, optionally wherein at least one of the two or more additional materials is a recycled material.

In accordance with Aspect 369, the present disclosure is directed to the foamed article of any one of Aspects 243-368, wherein the foamed article comprises one or more tie layers or tie regions, each of the one or more tie layers or tie regions individually comprising or consisting essentially of a tie material, wherein each of the one or more tie layers or tie regions increases a bond strength between two adjacent layers or regions, optionally wherein the tie material is a thermoplastic elastomeric material according to any one of the Aspects 76-90, optionally wherein the thermoplastic elastomeric material is a recycled material.

In accordance with Aspect 370, the present disclosure is directed to the foamed article of any one of Aspects 243-369, wherein the foamed article comprises one or more protective layers, each of the one or more protective layers individually comprising or consisting essentially of a protective material, optionally wherein the protective material is an additional material, and/or optionally wherein the protective material is a foamed material according to any one of Aspects 1-8 or 152-159, optionally wherein the foamed material is a recycled material, or wherein the solid foamable material is a foamed fibrous element.

In accordance with Aspect 371, the present disclosure is directed to the foamed article of any one of Aspects 243-370, wherein the foamed material has a density of from about 0.01 gram per cubic centimeter to about 3.0 grams per cubic centimeter, optionally wherein the foamed material is a stabilized foamed material having a density of from about 0.01 gram per cubic centimeter to about 3.0 grams per cubic centimeter.

In accordance with Aspect 372, the present disclosure is directed to the foamed article of any one of Aspects 243-371, wherein, the foamed material has a volume less than 10 percent greater, optionally less than 5 percent greater, than the foamable material prior to foaming, optionally wherein the foamed article is a stabilized foamed article.

In accordance with Aspect 373, the present disclosure is directed to the foamed article of any one of Aspects 243-372, wherein the foamed material has a volume more than 20 percent greater, optionally more than 30 percent greater or more than 40 percent greater, than the foamable material prior to foaming, optionally wherein the foamed article is a stabilized foamed article.

In accordance with Aspect 374, the present disclosure is directed to the foamed article of any one of Aspects 243-373, wherein the foamed material has a Shore A hardness of from about 35 A to about 95 A, optionally from about 55 A to about 90 A.

In accordance with Aspect 375, the present disclosure is directed to the foamed article of any one of Aspects 243-374, wherein the foamed article is configured as a series of two or more regions including a first region including a first regional foamed material and a second region including a second regional material, optionally wherein the second regional material is a second regional foamed fibrous element; optionally wherein the first region or the second region forms an outermost surface of the article, or wherein both the first region and the second region individually or jointly form the outermost surface of the article.

In accordance with Aspect 376, the present disclosure is directed to the foamed article of Aspect 375, wherein the regions include layers, and wherein the first region or the second region forms an inner layer of the foamed article, or both the first region and the second region individually form separate inner layers of the foamed article, optionally wherein the foamed article is a layered sheet including one or more foamed layers.

In accordance with Aspect 377, the present disclosure is directed to the foamed article of Aspect 375 or 376, wherein, in the foamed article, the first region forms the outermost surface of the foamed article and the second region forms an inner layer of the foamed article.

In accordance with Aspect 378, the present disclosure is directed to the foamed article of Aspect 375 or 376, wherein, in the foamed article, the first region forms an inner layer of the foamed article and the second region forms the outermost surface of the foamed article.

In accordance with Aspect 379, the present disclosure is directed to the foamed article of any one of Aspects 375-378, wherein the first region comprises or consists essentially of a first regional material, and the first regional material is a solid material.

In accordance with Aspect 380, the present disclosure is directed to the foamed article of any one of Aspects 375-378, wherein the first region comprises or consists essentially of a first regional material, and the first regional material is the foamed fibrous element.

In accordance with Aspect 381, the present disclosure is directed to the foamed article of any one of Aspects 375-378, wherein the second region comprises or consists essentially of a second regional material, and the second regional material is a solid material.

In accordance with Aspect 382, the present disclosure is directed to the foamed article of any one of Aspects 375-378, wherein the second region comprises or consists essentially of a second regional material, and the second regional material is the foamed fibrous element.

In accordance with Aspect 383, the present disclosure is directed to the foamed article of any one of Aspects 375-378, wherein the first region comprises or consists essentially of the foamed fibrous element, and the second region comprises or consists essentially of a solid material.

In accordance with Aspect 384, the present disclosure is directed to the foamed article of any one of Aspects 375-378, wherein the first region comprises or consists essentially of a solid material, and the second region comprises or consists essentially of the foamed fibrous element.

In accordance with Aspect 385, the present disclosure is directed to the foamed article of any one of Aspects 375-378, wherein both the first region and the second region comprise or consist essentially of the foamed fibrous element.

In accordance with Aspect 386, the present disclosure is directed to the foamed article of any one of Aspects 375-385, wherein the first regional material, the second regional material, or both, are individually a thermoplastic elastomeric material according to any of Aspects 76-90.

In accordance with Aspect 387, the present disclosure is directed to the foamed article of any one of Aspects 375-386, wherein the first regional material, the second regional material, or both, individually are a foamed fibrous element according to any of Aspects 243-286.

In accordance with Aspect 388, the present disclosure is directed to the foamed article of any one of Aspects 375-387, wherein the first regional material or the second regional material is a second material according to any of Aspects 91-103.

In accordance with Aspect 389, the present disclosure is directed to the foamed article of any one of Aspects 375-387, wherein the first region comprises or consists essentially of the foamed fibrous element and the second region comprises or consists essentially of a barrier material.

In accordance with Aspect 390, the present disclosure is directed to the foamed article of any one of Aspects 375-387, wherein the first region comprises or consists essentially of a barrier material and the second region comprises or consists essentially of the foamed fibrous element.

In accordance with Aspect 391, the present disclosure is directed to the foamed article of any one of Aspects 243-374, wherein the foamed article includes a textile, optionally wherein the textile is a layered textile, optionally wherein the layered textile comprises at least one unfoamed layer, optionally wherein the unfoamed layer is an unfoamed face layer, optionally wherein the layered textile comprises at least one foamed inner layer, optionally wherein the layered textile comprises one or more foamed inner layers and two unfoamed face layers.

In accordance with Aspect 392, the present disclosure is directed to the foamed of Aspect 391, wherein the layered textile comprises one or more foamed inner layers and two unfoamed face layers, wherein the unfoamed layers comprise a knit textile.

In accordance with Aspect 393, the present disclosure is directed to the foamed article of any one of Aspects 243-374, wherein the foamed article comprises a layered structure including a series of three or more layers, including a first face layer comprising or consisting essentially of a first face layer material, the first face layer including a first face layer outer surface defining a first outer surface of the layered structure, a first face layer inner surface opposing the first face layer outer surface, wherein the first face layer outer surface defines a first exterior surface of the article;

a second face layer comprising or consisting essentially of a second face layer material, the second face layer including a second face layer outer surface defining a second outer surface of the layered structure, a second face layer inner surface opposing the second face layer outer surface, optionally wherein the second face layer outer surface defines a second exterior surface of the article; and one or more inner layers, wherein each of the one or more inner layers comprise or consist essentially of an inner layer material, each of the one or more inner layers including an inner layer first surface and an inner layer second surface, wherein each of the one or more inner layers is positioned between the first face layer inner surface and the second face layer inner surface;

wherein at least one of the three or more layers of the article comprises or consists essentially of a solid material, and another of the three or more layers of the article comprises or consists essentially of the foamed fibrous element.

In accordance with Aspect 394, the present disclosure is directed to the foamed article of Aspect 393, wherein the first face layer inner surface is in contact with the face layer first surface, or the second face layer inner surface is in contact with the inner layer second surface, or both.

In accordance with Aspect 395, the present disclosure is directed to the foamed article of Aspect 393 or 394, wherein the foamed article is configured as a series of four of more layers including one or more structural layers, each of the one or more structural layers comprising a structural layer material and including a structural layer first surface, a structural layer second surface opposing the structural layer first surface;

optionally wherein at least one of the one or more structural layers is positioned between the first face layer and the inner layer, or between the second face layer and the inner layer; or optionally wherein the one or more structural layers comprise two or more structural layers, and at least a first one of the two or more structural layers is positioned between an inner surface of a first face layer and the first surface of an inner layer, and at least a second one of the two or more structural layers is positioned between a second surface of an inner layer and the inner surface of the second face layer; and optionally wherein at least one of the one or more structural layers comprises a foamable fibrous element according to any one of Aspects 1-202.

In accordance with Aspect 396, the present disclosure is directed to the foamed article of Aspect 395, wherein a first surface of a first one of the structural layers is in contact with the inner surface of the first face layer, and the second surface of the first one of the structural layers is in contact with a first surface of one of the one or more inner layers, or wherein the first surface of a second one of the one or more structural layers is in contact with the second surface of one of the one or more inner layers, and the second surface of the second one of the structural layers is in contact with an inner surface of the second face layer, or both.

In accordance with Aspect 397, the present disclosure is directed to the foamed article of 395 or 396, wherein the structural layer material of at least one of the one or more structural layers comprises or consists essentially of a solid material.

In accordance with Aspect 398, the present disclosure is directed to the foamed article of 395 or 396, wherein the structural layer material of at least one of the one or more structural layers comprises or consists essentially of a foamed fibrous element.

In accordance with Aspect 399, the present disclosure is directed to the foamed article of any one of Aspects 395-398, wherein the foamed article comprises a first structural layer and a second structural layer, and the structural layer material of at least one of the first structural layer and the second structural layer comprises or consists essentially of a solid material.

In accordance with Aspect 400, the present disclosure is directed to the foamed article of any one of Aspects 395-399, wherein the foamed article comprises a first structural layer and a second structural layer, and the structural layer material of at least one of the first structural layer and the second structural layer comprises or consists essentially of a foamed fibrous element.

In accordance with Aspect 401, the present disclosure is directed to the foamed article of any one of Aspects 391-400, wherein the article comprises a sheet, optionally wherein the textile forms a layer of the article.

In accordance with Aspect 402, the present disclosure is directed to the foamed article of Aspect 401, wherein the textile forms an outer layer of the article, or wherein the textile forms an inner layer of the article.

In accordance with Aspect 403, the present disclosure is directed to the foamed article of Aspect 401 or 402, wherein the sheet is from about 300 micrometers thick to about 1 centimeter thick, optionally from about 500 micrometers thick to about 1 centimeter thick, or from about 500 micrometers to about 750 micrometers thick.

In accordance with Aspect 404, the present disclosure is directed to the foamed article of any one of Aspects 391-400, wherein the textile is a spacer textile having a first textile face, a second textile face, and a textile thickness extending from the first textile face to the second textile face, wherein the textile thickness is from about 0.3 centimeters to about 3 centimeters, or from about 0.5 centimeters to about 1 centimeter, optionally wherein a fiber density of the first textile face and the second textile face is at least 25 percent greater, or at least 50 percent greater, or at least 75 percent greater than a fiber density between the first textile face and the second textile face.

In accordance with Aspect 405, the present disclosure is directed to the foamed article of any one of Aspects 243-404, wherein the foamed article includes at least one property according to any one of Aspects 1-242, or wherein the foamed article includes at least one structure according to any one of Aspects 1-242, or wherein the foamed article includes at least one property and at least one structure according to any one of Aspects 1-242.

In accordance with Aspect 406, the present disclosure is directed to a method of manufacturing an article, the method comprising:

affixing a first component to a second component, wherein the first component is a foamed article according to any one of Aspects 243-405.

In accordance with Aspect 407, the present disclosure is directed to a foamed article made by the method of any one of Aspects 1-242, optionally wherein the foamed article is a foamed article according to any one of Aspects 243-405.

In accordance with Aspect 408, the present disclosure is directed to a method for making a consumer product, the method comprising affixing the foamed article of any one of Aspects 243-306 to a second component.

In accordance with Aspect 409, the present disclosure is directed to a consumer product produced by the method of Aspect 408.

In accordance with Aspect 410, the present disclosure is directed to the consumer product of Aspect 408 or 409, wherein the consumer product comprises or is an article of footwear, an article of sporting equipment, or an article of apparel.

Method for Making a Foamed Article

In one aspect, provided herein is a method for making a foamed article. The method comprises placing an article and carbon dioxide in a vessel, wherein the article comprises a solid foamable material, and wherein the foamable material is a thermoplastic elastomeric material comprising one or more thermoplastic elastomers. After the placing, the method further comprises maintaining the vessel at a first pressure and first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the solid foamable material of the article. As used herein "infuse" and "infused" carbon dioxide are understood to mean carbon dioxide, which is solubilized in, contained in, or otherwise absorbed and/or taken up in the solid foamable material. In some aspects, following the maintaining and holding, the method optionally comprises exposing the article to a second pressure and second temperature at which the carbon dioxide remains infused within at least a portion of the solid foamable material. In any of these aspects, following the maintaining and holding and the optional exposing of the article, the method comprises subjecting the article to a third pressure and a third temperature at which the carbon dioxide infused in the solid foamable material phase transitions to a gas, thereby expanding the solid foamable material into a foamed material and forming the foamed article. The foamed material has a multi-cellular foam structure. In one aspect, the foamed material has a multi-cellular closed-cell structure. In another aspect, the foamed material has a multi-cellular open-cell structure. In some aspects, subjecting the article to a third temperature and a third pressure and causing the carbon dioxide to phase transition to a gas also serves to cool the foamable material and/or the foamed material.

Placing in the vessel. In one aspect, the step of placing the carbon dioxide in the vessel comprises introducing carbon dioxide in the form of a solid, liquid, gas, or supercritical fluid into the vessel prior to the steps of maintaining and holding the carbon dioxide in the form of a liquid. In another aspect, introducing the carbon dioxide comprises charging the vessel with the carbon dioxide gas at a pressure and temperature condition that is a liquid/vapor equilibrium for carbon dioxide.

In one aspect, when the article is a sheet, the article can be configured as a roll optionally comprising a spacer or protective layer between adjacent portions of the foamed article. In some aspects, the article can be a layered sheet including one or more foamed layers. Further in this aspect, the step of placing comprises disposing the roll into the vessel and wherein the steps of subjecting and expanding comprise unrolling the article prior to or during the subjecting, or prior to or during the expanding. In some aspects, the step of placing further comprises disposing a porous spacer can be disposed between adjacent portions of the article prior to or during the placing, and wherein the steps of maintaining and holding comprise flowing the carbon dioxide through the porous spacer to the adjacent portions of the article. In other aspects, the article or sheet is not configured as a roll, but can be a sheet, a yarn or fibril, a fabric, a bladder, or any other foamable structure such as, for example, those disclosed herein.

In some aspects, the foamable article can be a foamable bladder, or a foamable component of a bladder. In other words, the foamable articles disclosed herein can be used to form bladders, or components of bladders, and these bladders or components of bladders can be foamed using the foaming process disclosed herein. In other aspects, the foamed article can be a foamed bladder or a foamed component of a bladder, where, either before, during or following formation of the bladder or the component of a bladder, the bladder or the component of the bladder is foamed using the foaming process disclosed herein.

Maintaining and holding at the first temperature and first pressure. After the step of placing the article and the carbon dioxide in the vessel, the article and carbon dioxide in the vessel are maintained at a first pressure and a first temperature. The first pressure and the first temperature are a pressure and a temperature at which the carbon dioxide is a liquid, and the liquid carbon dioxide is soluble in the solid foamable material. This step includes holding the article and the liquid carbon dioxide in the vessel for a duration of time sufficient for at least a portion of the liquid carbon dioxide to infuse into the solid foamable material. During this step, the liquid carbon dioxide contacts the article and infuses into one or more materials present in the article, including the solid foamable material. In order for the carbon dioxide to infuse into the solid foamable material of the article, the carbon dioxide in contact with the article must be present in a form that is soluble in and that will infuse into the solid foamable material. Once infused into the solid foamable material, the infused carbon dioxide also needs to be present in a phase that is capable of phase transitioning into a gas during the foaming process, and must also be present in a sufficient concentration in the solid foamable material to expend at least a portion of the solid foamable material in to a foam having a multi-cellular structure. Although solid carbon dioxide will expand directly from a solid to a gas under certain conditions, when solid carbon dioxide is placed in contact with the solid foamable materials disclosed herein, under most conditions, the solid carbon dioxide does not infuse into the solid foamable material at a rate or in sufficient concentrations to make it useful as a physical foaming agent for mass manufacturing. Although supercritical carbon dioxide can also phase transition and expand to a gas, and supercritical carbon dioxide typically is highly soluble in many polymeric materials, extreme temperatures and pressures are required to maintain carbon dioxide in a supercritical state, greatly increasing equipment and energy requirements for the process. However, liquid carbon dioxide has been found to be soluble in the solid foamable materials disclosed herein in sufficient concentrations to act as a physical foaming agent.

In one aspect, the method further comprises discharging any remaining carbon dioxide from the vessel after the steps of maintaining and holding, prior to the optional step of exposing, or prior to the steps of subjecting and expanding.

Further in this aspect, discharging the carbon dioxide from the vessel comprises converting the liquid carbon dioxide to carbon dioxide gas prior to or during the discharging.

In one aspect, at the first pressure and first temperature, the carbon dioxide is soluble in the solid foamable material at a concentration of from about 1 weight percent to about 30 weight percent, optionally from about 5 weight percent to about 20 weight percent, from about 5 weight percent to about 10 weight percent, or from about 10 weight percent to about 20 weight percent. In one aspect, the foamed material of the foamed article is substantially opaque.

In another aspect, the steps of maintaining and holding comprise maintaining the first pressure at from about 0.05 pounds per square inch (about 0.345 kilopascals) to about 6000 pounds per square inch (about 41,300 kilopascals). In another aspect, the first pressure is from about 15 pounds per square inch (103.4 kilopascals) to about 5500 pounds per square inch (37,900 kilopascals), optionally about 100 pounds per square inch (689.5 kilopascals) to about 5000 pounds per square inch (34,500 kilopascals), from about 500 pounds per square inch (3,450 kilopascals) to about 2000 pounds per square inch (about 13,790 kilopascals), or from about 1000 pounds per square inch (6895 kilopascals) to about 1500 pounds per square inch (10,300 kilopascals).

In yet another aspect, the steps of maintaining and holding can comprise maintaining the first temperature at from about −57 degrees Celsius to about 31 degrees Celsius, optionally from about −40 degrees Celsius to about 25 degrees Celsius, or from about −40 degrees Celsius to about 0 degrees Celsius. In one aspect, the steps of maintaining and holding comprise holding the article at the first pressure and the first temperature for a duration of from about 20 seconds to about 72 hours, optionally from about 20 seconds to about 24 hours, from about 1 minute to about 24 hours, or from about 1 minute to about 1 hour.

Optionally, in any of these aspects, during the performance of the maintaining and holding step and the subjecting and expanding step of the methods disclosed herein, the temperature of the foamable material is maintained at a temperature below a softening temperature of the foamable material. For example, the thermoplastic elastomeric material can be maintained at a temperature at least 10 degrees Celsius, or at least 20 degrees Celsius below the Vicat softening temperature of the foamable material. While it is possible to conduct additional processing steps on the foamed article which may thermally soften a portion or a region of the solid foamable material or the foamed material, in these aspects, these steps involving thermally softening the solid foamable material or melting the foamed material are conducted either before the maintaining an holding step, or after the subjecting and expanding step. The avoidance of thermally softening the foamable material can reduce or prevent thermal degradation of the foamable material.

In an aspect, the article comprises a solid first foamable material and a second material, wherein the second material is a second foamable material. Further in this aspect, the steps of maintaining and holding comprise holding the article and the liquid carbon dioxide in the vessel for a duration of time sufficient for at least a portion of the liquid carbon dioxide to infuse into the solid first foamable material but not into the solid second foamable material. Further in this aspect, the steps of subjecting and expanding comprise expanding the first foamable material into a first foamed material while maintaining the solid second foamable material as a substantially unfoamed second foamable material.

In an aspect, the foamable article can comprise a foamable region or foamable layer including the first foamable material. In some aspects, the foamable article further comprises a second region or layer comprising a second material (wherein the foamable region or foamable layer including the foamable material is a first foamable region or first foamable layer). The second material can be a second foamable material as disclosed herein, or can be a second unfoamable material. In another aspect, as disclosed herein, the foamed article can comprise a foamed region or foamed layer including the foamed material, and in some aspects, the foamed article can comprise a second foamed region or second foamed layer comprising a second foamable material, or can comprise a second unfoamed region or second unfoamed layer comprising a second unfoamed material.

In another aspect, the article comprises a solid first foamable material and further comprises an additional material, wherein the additional material is an additional foamable material. Further in this aspect, the steps of maintaining and holding include holding the article and the liquid carbon dioxide in the vessel for a duration of time sufficient for at least a portion of the liquid carbon dioxide to infuse into the solid first foamable material and into the solid additional foamable material. In another aspect, the method includes the optional step of exposing, and the exposing comprises exposing the article to a second pressure and second temperature at which the carbon dioxide remains infused within the solid additional foamable material but at which the carbon dioxide diffuses out of the solid first foamable material. Further in this aspect, the steps of subjecting and expanding comprise expanding the solid foamable material into a second foamed material while maintaining the solid first foamable material as a substantially unfoamed first foamable material.

Optional exposing to the second pressure and temperature. In some aspects, following the maintaining and holding, the method optionally comprises exposing the article to a second pressure and second temperature at which the carbon dioxide remains infused within at least a portion of the solid foamable material. In some aspects, this optional step can involve increasing or decreasing the temperature of the foamed article, for example, in order to bring the foamed article to a higher temperature or to a lower temperature. In other aspects, this optional step can involve increasing or decreasing the pressure under which the foamed article is held, for example, in order to expose the foamed article to a higher pressure or to a lower pressure. In yet other aspects, this optional step of exposing can comprise exposing the infused article to an increased or decreased pressure as compared to the first pressure, and/or to an increased or decreased temperature as compared to the first temperature. The optional step of exposing can comprise exposing the infused article to a second pressure and temperature under which the infused carbon dioxide substantially remains infused in the infused article. For example, the second pressure and temperature can be a pressure and a temperature under which little if any carbon dioxide diffuses out of the infused article, over the duration at which the infused article is exposed to the second pressure and/or temperature. In one aspect, the exposing can comprise storing the infused article in a conventional freezer under atmospheric pressure at a temperature at which the infused carbon dioxide has a low rate of diffusion out of the infused article. Alternatively, the optional step of exposing can comprise exposing the infused article to a second pressure and temperature under which an amount of infused carbon dioxide diffuses out of the infused article. For example, when the rate at which the carbon dioxide diffuses out of a thermoplastic material is known for a particular second pressure and temperature, the duration of time required for an amount of carbon dioxide to diffuse out of a particular portion of the infused article can be determined, and the infused article can be held at the second pressure and temperature for the determine duration of time, in order to reduce the concentration of carbon dioxide in a portion or region of the infused article. For example, the exposing step can be used to first create regions or portions of the infused article which will expand into a relatively more dense foam as compared to other regions or portions of the infused article, or which will remain substantially unfoamed during the foaming step, based on allowing some or all of the carbon dioxide to diffuse out of the first regions or portions. In this way, it has been found to be possible to achieve well-controlled variability in the extent to which an article is foamed, without the need for expensive, complicated equipment or tooling.

In one aspect, the optional step of exposing comprises exposing the article to the second pressure of from about 1 atmosphere (101 kilopascals) to about 85 atmospheres (8613 kilopascals), optionally from about 1 atmosphere (101 kilopascals) to about 40 atmospheres (4053 kilopascals), or from about 1 atmosphere (101 kilopascals) to about 20 atmospheres (2026.5 kilopascals).

In some aspects, the optional step of exposing comprises exposing the article to the second temperature of more than about 30 degrees Celsius below the softening point of the solid foamable material, optionally more than about 50 degrees Celsius below the softening point of the solid foamable material, or more than about 100 degrees below the softening point of the solid foamable material.

In any of these aspects, the optional step of exposing comprises exposing the article to the second pressure and second temperature for a duration of from about 30 minutes to about 4 weeks, optionally from about 1 hour to about 1 week, or from about 1 hour to about 24 hours.

In some aspects, the optional step of exposing can occur in the vessel. In other aspects, the optional step of exposing further comprises removing the carbon dioxide-infused article from the vessel prior to exposing the article to the optional second pressure and second temperature.

Subjecting to a third pressure and third temperature, expanding the solid foamable material. As stated above, the method comprises subjecting the article to a third pressure and a third temperature at which the carbon dioxide infused in the solid foamable material phase transitions to a gas, thereby expanding the solid foamable material into a foamed material and forming the foamed article. The third pressure can be a higher or lower pressure as compared to the first pressure or the optional second pressure, and the third temperature can be a higher or lower temperature as compared to the first temperature or the optional second pressure, so long as the third pressure and temperature are a condition under which the infused carbon dioxide present in the infused article phase transitions to a gas, and does so at a rate sufficient to expand at least a portion of the solid foamable material of the article. In many aspects, the third pressure can be a pressure at or near atmospheric pressure, and the third pressure can be at or near room temperature, or an elevated temperature which is below the softening temperature of the solid foamable material, i.e., conditions which can be achieved using inexpensive equipment and low energy consumption.

In one aspect, the steps of subjecting and expanding comprise subjecting the article to third pressure of from about 13 pounds per square inch (89.6 kilopascals) to about 16 pounds per square inch (110.3 kilopascals), optionally from about 13 pounds per square inch (kilopascals) to about 15 pounds per square inch (103.4 kilopascals), or from about 14 pounds per square inch (96.5 kilopascals) to about 15 pounds per square inch (103.4 kilopascals).

In some aspects, the steps of subjecting and expanding comprise subjecting the article to third temperature of from about 20 degrees Celsius to about 150 degrees Celsius, optionally from about 20 degrees Celsius to about 100 degrees Celsius, from about 25 degrees Celsius to about 70 degrees Celsius, from about 50 degrees Celsius to about 70 degrees Celsius, or is about 60 degrees Celsius.

In any of these aspects, the steps of subjecting and expanding comprise subjecting the article to the third pressure and third temperature for a duration of from about 2 seconds to about 5 minutes, optionally from about 5 seconds to about 2 minutes, or from about 30 seconds to about 1 minute.

In some aspects, the steps of subjecting and expanding can occur in the vessel. In other aspects, the step of subjecting further comprises removing the carbon dioxide-infused article from the vessel prior to subjecting the article to the third pressure and third temperature.

In one aspect, the step of subjecting the article to the third temperature and third pressure comprises introducing the article to a fluid bath, optionally wherein the fluid bath is a water bath. In some aspects, the fluid bath has a temperature of from about 20 degrees Celsius to about 90 degrees Celsius, optionally from about 40 degrees Celsius to about 80 degrees Celsius, or from about 50 degrees Celsius to about 70 degrees Celsius. In another aspect, during the subjecting, the article is held in the fluid bath for a duration of time of from about 15 seconds to about 5 minutes, optionally from about 30 seconds to about 3 minutes, or from about 1 minute to about 2 minutes.

In an alternative aspect, the step of subjecting comprises subjecting the article to a source of energy or heat, optionally wherein the source of energy or heat comprises steam, microwave energy, infrared (IR) energy, or radio frequency (RF) energy. Further in this aspect, the step of subjecting the article to the source of energy or heat increases the temperature of at least a portion of the foamable material of the article to a temperature of from about 60 degrees Celsius to about 150 degrees Celsius, optionally from about 70 degrees Celsius to about 100 degrees Celsius, or from about 75 degrees Celsius to about 90 degrees Celsius. In one aspect, the subjecting is for a duration of from about 2 seconds to about 5 minutes, optionally from about 15 seconds to about 3 minutes, or from about 1 minute to about 2 minutes.

In another aspect, the step of subjecting and expanding comprises expanding the foamable material into the foamed material until the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter.

In still another aspect, following the steps of subjecting and expanding, the foamed material has an expansion ratio of from about 3:1 to about 120:1 relative to the solid foamable material prior to the subjecting and expanding, optionally from about 3:1 to about 100:1, or from 3:1 to about 50:1, or from about 5:1 to about 10:1 relative to the thermoplastic elastomeric material in a non-foamed condition. In one aspect, during the expanding, at least a portion of the article comprising the solid foamable material expands in length, width, and height due to the expansion of the solid foamable material into the foamed material.

In one aspect, following the expanding, a size of the foamed article is greater in at least one dimension as compared to a size of the article before the placing, optionally wherein the foamed article is at least 5 percent larger, optionally at least 10 percent larger, at least 15 percent larger, or at least 20 percent larger in one or more of length, width, and height.

In some aspects, the article is a layered sheet and the steps of subjecting and expanding foam at least one layer of the sheet. Further in this aspect, following the subjecting and expanding, a thickness of the foamed layered sheet is at least 5 percent greater, optionally at least 10 percent greater, at least 15 percent greater, or at least 20 percent greater than a thickness of the layered sheet in its unfoamed state.

Optional exposing to fourth temperature and fourth pressure. In some aspects, the method further comprises the optional step of, following the subjecting and expanding, bringing the foamed article to a fourth temperature and fourth pressure, and holding the foamed article at or below the fourth temperature, the fourth pressure, or both, for a duration of time. This optional step can involve increasing or decreasing the temperature of the foamed article, for example, in order to bring the foamed article to room temperature. Similarly, in some aspects, this optional step can involve increasing or decreasing the pressure under which the foamed article is being held, for example, bringing the foamed article to atmospheric pressure and/or room temperature.

In one aspect, the optional step of bringing comprises bringing the foamed article to the fourth pressure of from about 0.03 atmospheres (3.04 kilopascals) to about 2 atmospheres (202.65 atmospheres), optionally from about 0.5 atmospheres (50.7 kilopascals) to about 1.5 atmospheres (152 kilopascals), or is about 1 atmosphere (101.3 kilopascals).

In another aspect, the optional step of bringing comprises bringing the foamed article to the fourth temperature of from about 30 degrees Celsius to about 70 degrees Celsius, optionally from about 40 degrees Celsius to about 60 degrees Celsius, or from about 45 degrees Celsius to about 55 degrees Celsius. In some aspects, in the optional step of bringing, the fourth temperature is at or below a glass transition temperature of the solid foamable material, or is from about 10 degrees Celsius less than to about 10 degrees Celsius greater than the glass transition temperature of the solid foamable material as measured by the Melting Temperature, Glass Transition Temperature, and Enthalpy of Melting Test Protocol. In one aspect, the glass transition temperature of the solid foamable material is less than 0 degrees Celsius, optionally less than −10 degrees Celsius, less than −20 degrees Celsius, less than −30 degrees Celsius, or less than −40 degrees Celsius.

In any of these aspects, optional step of bringing comprises bringing the foamed article to the fourth pressure and the fourth temperature for a duration of from about 15 minutes to about 1 hour, optionally from about 20 minutes to about 45 minutes, or from about 20 minutes to about 30 minutes.

Optional stabilizing at a fifth temperature and fifth pressure. In still other aspects, the method further comprises, following the subjecting and expanding or following the optional bringing, stabilizing the foamed article at a fifth pressure and fifth temperature. The fifth pressure and temperature can be a pressure and temperature at which the carbon dioxide diffuses out of the foamed material of the foamed article while maintaining the foamed material in a foam structure, thereby forming a stabilized foamed article. In some aspects, stabilizing comprises holding the foamed article at the fifth pressure and fifth temperature for a duration of time sufficient to remove substantially all of the carbon dioxide from the foamed material. The fifth pressure can be at or near atmospheric pressure, or can be at a pressure at which the rate at which air diffuses into the foam and/or the rate at which carbon dioxide diffuses out of the foam is greater than the rate(s) at atmospheric pressure. The fifth temperature can be at or near room temperature, or can be at a temperature at which the rate at which air diffuses into the foam and/or the rate at which carbon dioxide diffuses out of the foam is greater than the rate(s) at room temperature. Stabilizing the foamed article can also comprise releasing stresses in the foamed article, such as stresses in the foamed thermoplastic elastomeric material, or stresses in a solid material present in the foamed article. In such aspects, the fifth pressure and/or fifth temperature can be atmospheric pressure and/or room temperature, or can be a pressure and/or temperature at which stresses in the foamed article are released at faster rate(s) than at atmospheric pressure or room temperature. In one example, the stabilization can be conducted at atmospheric pressure and at a temperature above room temperature and at least 5 degrees Celsius below the softening temperature of the foamed material. The stabilization can be conducted using conventional heating equipment, such as a convection, microwave or infrared oven, or a heating tunnel. Stabilization can be particularly useful when the foamed material is present in the form of a sheet, and/or when the foamed article includes a layered structure including layers of foamed materials adjacent to layers of solid (unfoamed) materials, as it can release stresses in the solid materials which developed during the foaming process.

In one aspect, the optional step of stabilizing comprises stabilizing at the fifth pressure of about atmospheric pressure. In another aspect, the optional step of stabilizing comprises stabilizing at the fifth temperature of greater than the glass transition temperature of the foamed material as measured by the Melting Temperature, Glass Transition Temperature, and Enthalpy of Melting Test Protocol. Further in this aspect, the optional step of stabilizing comprises stabilizing at the fifth temperature of from about 30 degrees Celsius to about 70 degrees Celsius, optionally from about 40 degrees Celsius to about 60 degrees Celsius, or about 50 degrees Celsius. In one aspect, the optional step of stabilizing comprises stabilizing the foamed article at the fifth temperature for from about 15 minutes to about 60 minutes, optionally from about 30 minutes to about 45 minutes.

In one aspect, the optional step of stabilizing at the fifth pressure and the fifth temperature comprises placing the foamed article in an oven. In some aspects, stabilizing the foamed article at the fifth pressure and the fifth temperature releases stresses in the foamed article. In another aspect, stabilizing the foamed article at the fifth pressure and the fifth temperature removes substantially all of the residual carbon dioxide in the foamed article. In another aspect, if carbon dioxide gas remains in individual foam cells, stabilizing can remove the carbon dioxide gas. In a further aspect, if carbon dioxide remains infused in foamed or unfoamed materials, stabilizing can remove the infused carbon dioxide. In still another aspect, stresses may be introduced when foamable materials transition to foamed materials while remaining bonded to unfoamed materials; further in this aspect, stabilizing can release these stresses.

In some aspects, shrinkage of the foamed article may be a concern, or may be desirable. The step of stabilizing the foamed article at the fifth pressure and the fifth temperature can be used to reduce or control the level of shrinkage of the foamed article following the foaming. For example, the rate of shrinkage under particular conditions can be used determine the time, temperature, and pressure to obtain the desired level of shrinkage for the foam article. In an aspect, stabilizing can reduce or release stresses that would otherwise lead to an undesired level of shrinkage.

In any of these aspects, the method can include the step of stabilizing, and following the stabilizing, the stabilized foamed article is greater in at least one dimension as compared to a size of the article before the placing, optionally wherein the stabilized foamed article is at least 5 percent larger, at least 10 percent larger, at least 15 percent larger, or at least 20 percent larger in one or more of length, width, and height.

Further Processing of the Foamable Material and Foamed Materials and Articles. In an aspect, the foamable material can optionally be formed using a variety of processes. In one aspect, the solid foamable material can be formed using an extrusion process prior to the step of placing. In one aspect, the solid foamable material can be formed using an injection molding process prior to the step of placing. In another aspect, the solid foamable material can be formed using a thermal and/or vacuum forming process prior to the step of placing. In one aspect, the thermal and/or vacuum forming process can use pressure and/or thermal energy to conform the foamable material to the shape of a mold. In one aspect, the mold can include one or more curved surfaces. In another aspect, the mold can be an open mold or a closed mold. In some aspects, the mold can be configured to form a single surface of the foamable material or multiple surfaces of the foamable material. Alternatively or additionally, an additive manufacturing process such as extrusion, deposition printing, and/or selective sintering can be used to form and/or shape the foamable material prior to the step of placing.

Thermoforming. In one aspect, the method further comprises thermoforming the foamed article, optionally wherein the foamed article is a stabilized foamed article. In some aspects, the article can be a thermoformed article. In any of these aspects, the foamed article can be a component of an article of apparel, an article of footwear, or an article of sporting equipment.

In one aspect, in the disclosed method, the method further comprises a step of thermoforming the article prior to the step of placing. In one aspect, the method comprises the step of molding the foamable fibrous element. In another aspect, molding the foamable fibrous element comprises applying a mold to the foamable fibrous element. In one aspect, the mold can be a slump mold. In another aspect, the mold can be a compression mold. In any of these aspects, the method can further include a step of increasing a temperature of the mold.

In an aspect, the strep of increasing a temperature of the mold can be performed after applying the mold to the foamable fibrous element. In another aspect, the step of increasing a temperature of the mold is performed before applying the mold the foamable fibrous element.

In one aspect, the article includes a thermoformed article, and the method further comprises a step of thermoforming the foamed article. In another aspect, the method further comprises thermoforming the foamed article, optionally wherein the foamed article is a stabilized foamed article.

In an aspect, the foamed article includes a sheet and, optionally, the sheet can be a layered sheet. Optionally, in one aspect, the layered sheet comprises at least one unfoamed cap layer, or comprises one or more foamed inner layers and two unfoamed cap layers.

In another aspect, the method further comprises the step of molding the foamed article, wherein the foamed article comprises a foamed fibrous element, and the step of molding the textile element comprises applying a mold to the foamed fibrous element. In one aspect, the mold is a slump mold. In another aspect, the mold is a compression mold. In an aspect, the method further comprises the step of increasing a temperature of the mold. In an aspect, the step of increasing the temperature of the mold is performed after applying the mold to the foamed fibrous element, or before applying the mold to the foamed fibrous element.

In any of these aspects, the foamed article can, in an aspect, be a component of an article of apparel, footwear, or sporting equipment.

Yarns and Textiles

Core/Sheath Yarns. In one aspect, the foamable fibrous element comprises: a first yarn comprising a core and a solid foamable material surrounding the core, optionally wherein the core comprises or consists essentially of a second solid foamable material. In another aspect, the solid foamable material is attached to the core. In still another aspect, the solid foamable material substantially or partially surrounds the core.

In another aspect, the core has a percent elongation of less than 30 percent, or of less than 25 percent, or of from about 5 percent to about 25 percent. In another aspect, the core can have a breaking strength of at least 1.5 kilograms force per centimeter squared, or of from about 1.5 to about 10 kilograms force per centimeter squared. In still another aspect, the core can have a linear mass density of from about 60 to about 70,000 denier, or of from about 100 to about 1,000 denier, or of from about 150 to about 500 denier. In another aspect, the core can have a tenacity of from about 1.5 to about 10.0 grams per denier, or from about 1.5 to about 4.0 grams per denier, or from about 2.5 to about 4.0 grams per denier.

In any of these aspects the core can include a core yarn. In one aspect, the core yarn comprises a plurality of fibers or filaments, and optionally the core can be at least one of a spun yarn, a twisted yarn, and/or an entangled yarn. In an aspect, the core yarn can be a monofilament yarn or an entangled multi-filament yarn. In another aspect, the core material can comprise a polyester, optionally wherein the polyester is polyester terephthalate.

In another aspect, the core has a cross-sectional diameter and the solid foamable material has an average thickness such that the cross-sectional diameter of the core is at least 3 times smaller than the average thickness of the solid foamable material. In one aspect, the solid foamable material has an average thickness of from about 0.4 millimeters to about 3.0 millimeters.

In one aspect, in the foamed articles produced by the disclosed method, the foamed fibrous element comprises a first yarn comprising a core and a solid foamed material surrounding the core, optionally wherein the core comprises or consists essentially of a second solid foamed material. In one aspect, the foamed fibrous element is attached to the core. In another aspect, the foamed fibrous element substantially or partially surrounds the core.

In one aspect, the core has a cross-sectional diameter and the foamed fibrous element has an average thickness such that the cross-sectional diameter of the core is at least 3 times smaller than the average thickness of the foamed fibrous element. In one aspect, the foamed fibrous element has an average thickness of from about 0.4 millimeters to about 3.0 millimeters. In a further aspect, the yarn can have an average cross-sectional diameter of less than about 4.0 millimeters.

Textile Elements. In one aspect, the foamable fibrous element can be a textile element or a portion of a textile element. In another aspect, the foamed fibrous element can be a textile element or a portion of a textile element.

In another aspect, the textile element can comprise or consist essentially of a knit textile, a woven textile, a crocheted textile, a braided textile, a tatted textile, a non-woven textile, or any combination thereof.

In one aspect, the textile element comprises a knit textile comprising a first area, wherein the first area comprises a first plurality of knit loops comprising a first yarn, wherein the first yarn comprises or consists essentially of a foamable material. In another aspect, the textile element comprises a knit textile comprising a first area, wherein the first area comprises a first plurality of knit loops comprising the first yarn and a second plurality of loops comprising a second yarn, wherein the first yarn, the second yarn, or both the first yarn and the second yarn comprise or consist essentially of a foamable material. In one aspect, the first plurality of knit loops and the second plurality of knit loops are interlooped with each other in a knit structure.

In another aspect, the textile element comprises a knit textile comprising a first area, wherein the first area comprises a plurality of knit loops comprising a first yarn and a second yarn at least partially inlaid within the first area of the knit textile such that the second yarn extends between at least a first loop and a second loop of the plurality of knit loops, wherein the first yarn, the second yarn, or both comprise or consist essentially of a foamable material as disclosed herein. In some aspects, the second yarn includes a first portion that is exposed on a first surface in the first area. In another aspect, the first portion can have a length that is greater than or equal to the length of a portion of a first course that includes at least three consecutive knit loops, the first course being in the first area.

In one aspect, the second yarn additionally can include a second portion that is exposed on the first surface in the first area, wherein the second yarn includes a covered portion extending from the first portion to the second portion. In an aspect, a length of the second portion can be longer than a length of the first portion.

In another aspect, a second course can extend through a second area with a second surface, where the second yarn is at least partially interlooped or inlaid within the second course, and where the second yarn can include a second portion that is exposed on the second surface in the second area. In one aspect, the second portion of the second yarn can include a length that is longer than a length of the first portion of the second yarn.

In one aspect, the textile element is a knit textile and the first yarn is present in the knit structure of the knit textile, and optionally the first yarn can be inlaid in the knit textile.

In another aspect, in the disclosed methods, the textile element can further include a third yarn, optionally wherein the third yarn is inlaid between at least a first loop and a second loop of the knit textile, and optionally wherein the third yarn comprises or consists essentially of a foamable material as described herein.

In another aspect, the textile element can comprise a non-woven textile. Further in this aspect, the non-woven textile comprises a felt or web structure comprising the first plurality of filaments, fibers, or yarns, wherein the first plurality of filaments, fibers, or yarns are bonded together. In another aspect, the first plurality of fibers, filaments, or yarns can be bonded by chemical bonds, mechanical bonds, or any combination thereof.

In another aspect, the chemical bonds, mechanical bonds, or combination thereof can be formed using thermal welding, hydro-entanglement, ultrasonic welding, needlepunching, meltblowing, or any combination thereof. When thermal welding is used, in an aspect, this can be achieved with or without calendaring. When chemical bonding is used, in an aspect, chemical bonds can be achieved using a binder, optionally wherein the binder includes a polymeric emulsion, a polymeric dispersion, a polymeric solution, a polymeric fiber, or a polymeric powder. In still another aspect, the non-woven textile can be produced from extruded fibers, optionally wherein production from extruded fibers is accomplished using a meltblowing process, a spunbonding process, or any combination thereof.

In still another aspect, the textile element can include a first yarn and a second yarn, and the first yarn and second yarn can be in contact with each other, and the first yarn, the second yarn, or both comprise or consist essentially of a foamable material. In one aspect, the first yarn can be inlaid in the textile element.

In another aspect, the textile element can comprise a crocheted textile comprising a first area, wherein the first area comprises a plurality of crocheted loops comprising a first yarn forming a first area of the crocheted textile, or comprises a plurality of crocheted loops comprising the first yarn and a second yarn, where the first yarn and the second yarn form the first area of the crocheted textile, or comprises a plurality of crocheted loops comprising the first yarn with the second yarn at least partially inlaid within the first area of the crocheted textile such that the second yarn extends between at least a first loop and a second loop of the plurality of crocheted loops, wherein the first yarn, the second yarn, or both comprise or consist essentially of a foamable material. In one aspect, the first portion has a length greater than or equal to the length of a portion of a first course that includes at least three consecutive crocheted loops, the first course being in the first area.

In another aspect, the second yarn can be interlooped with the first yarn, forming a second crocheted course. In still another aspect, the textile element further comprises a third yarn, and the third yarn is optionally interlooped with the first yarn, the second yarn, or both, or is inlaid between the first and second courses, and optionally the third yarn comprises or consists essentially of a foamable material.

In one aspect, the textile element can comprise a woven textile. Further in this aspect, the textile element can comprise a plurality of warp yarns oriented along a first direction, forming a warp, wherein the plurality of warp yarns comprises or consists essentially of a foamable material. In another aspect, the textile element can comprise a second plurality of yarns oriented along a second direction distinct from the first direction, forming a weft comprising a plurality of weft yarns, optionally wherein the warp and weft are oriented at approximately right angles from each other, optionally wherein the plurality of weft yarns comprises or consists essentially of a foamable material. In still another aspect, the warp and weft can be interwoven.

In one aspect, the textile element can comprise a braided textile, wherein the braided textile comprises a first yarn, optionally a second yarn, or optionally a first yarn, second yarn, and third yarn, and wherein the yarns are braided with each other, wherein the first yarn and optional second and third yarns, or any combination thereof, comprises or consists essentially of a foamable material.

In one aspect, the article comprises a sheet, and optionally the textile element forms a layer of the article. In a further aspect, the textile can form an outer layer of the article or an inner layer of the article. Further in this aspect, the sheet can be from about 300 micrometers to about 1 centimeter thick, optionally from about 500 micrometers thick to about 1 centimeter thick, or from about 500 micrometers to about 750 micrometers thick.

In another aspect, the textile can be a spacer textile having a first textile face, a second textile face, and a textile thickness extending from the first textile face to the second textile face, wherein the textile thickness is from about 0.3 centimeters to about 3 centimeters, or from about 0.5 centimeters to about 1 centimeter, optionally wherein a fiber density of the first textile face and the second textile face is at least 25 percent greater, or at least 50 percent greater, or at least 75 percent greater than a fiber density between the first textile face and the second textile face.

In any of these aspects, the textile element comprises an embroidered region further comprising a yarn, wherein the yarn comprises or consists essentially of a foamable material as disclosed herein.

Zones. In one aspect, when the textile element in the method or in the foamed article comprises a knit textile comprising a first fiber, first filament, or first yarn, and optionally a second fiber, second filament, or second yarn, optionally wherein the first fiber, filament, or yarn, the second fiber, filament, or yarn, or both comprise or consist essentially of a foamable material.

In another aspect, in the knit textile, the first and second yarns at least partly form a plurality of interconnected courses on a surface of the knit textile, the surface having at least a first zone and a second zone, wherein the first zone comprises an increased concentration of the second yarn compared to the second zone. In an optional aspect, the surface can be an outer surface of the knit textile. In another optional aspect, both the first zone and the second zone comprise portions of both the first yarn and the second yarn.

In one aspect, in the knit textile, the surface includes at least the first zone, the second zone, and a third zone, wherein the second zone is positioned between the first and third zones, the first zone comprises the increased concentration of the second yarn compared to the second zone, and wherein the third zone comprises an increased concentration of the first yarn compared to the second zone.

In one aspect, each course of the plurality of interconnected courses includes the first yarn and the second yarn. In another aspect, the plurality of interconnected courses comprises a first course interconnected to a second course.

In still another aspect, in the first course, the first yarn extends from the third zone into the second zone and the second yarn extends from the second zone into the first zone, and in the second course, the first yarn extends from the third zone into the second zone and is interlooped with at least a portion of the first yarn of the first course in a first portion of the second zone.

In another aspect, in the second course, the second yarn extends from the second zone into the first zone and the second yarn of the second course is interlooped with at least a portion of the first yarn of the first course in a second portion of the second zone. In still another aspect, in the second course, the second yarn of the second course is interlooped with at least a portion of the second yarn of the first course in a third portion of the second zone. In one aspect, in the second zone, adjacent courses of the plurality of interconnected courses have a different number of loops of the first yarn. In another aspect, in the second zone, at least some of the adjacent courses of the plurality of interconnected courses have different numbers of loops of the second yarn. In still another aspect, in the second zone, at least some of the adjacent courses of the plurality of interconnected courses have different numbers of loops of the first yarn and the second yarn. In another aspect, in the second zone, a first wale having loops of the first yarn is adjacent to a second wale having loops of the second yarn.

In a further aspect, the knit textile can be an upper for an article of footwear. In one aspect, the first zone forms at least a portion of a forefoot opening area and/or an ankle collar area.

In any of these aspects, the first yarn can exhibit a tenacity of at least about 0.9 grams/denier, optionally of from about 1 gram/denier to about 5 grams/denier, from about 1.5 grams/denier to about 4.5 grams/denier, or of from about 2.0 grams/denier to about 4.5 grams/denier. In one aspect, the first yarn exhibits an elongation of less than about 130 percent, optionally of about 10 percent to about 130 percent, about 20 percent to about 130 percent, or of about 40 percent to about 130 percent. In another aspect, the first yarn exhibits a shrinkage of less than about 60 percent, optionally of from about 0 percent to about 60 percent, from about 0 percent to about 30 percent, or from about 0 percent to about 20 percent.

In any of these aspects, the first yarn, the second yarn, the third yarn, or any combination thereof, is essentially free of dye. In another aspect, the first yarn, second yarn, third yarn, or any combination thereof is a package dyed yarn. In still another aspect, the first yarn, second yarn, third yarn, or any combination thereof is a solution dyed yarn.

Foamed Articles

In one aspect, disclosed herein is a foamed article comprising a foamed material that is a physically-expanded foam formed of a thermoplastic elastomeric material comprising one or more first thermoplastic elastomers. In another aspect, the foamed material is a product of placing an unfoamed article comprising a solid foamable material in liquid carbon dioxide, infusing the solid foamable material with the carbon dioxide, and expanding the infused solid foamable material by expanding the infused carbon dioxide without thermally softening the solid foamable material, for example by phase transitioning the infused carbon dioxide into a gas under conditions that do not soften the solid foamable material, thereby expanding the solid foamable material into the foamed material of the foamed article. In some aspects, the foamed article is a stabilized foamed article comprising the stabilized foamed material, wherein the stabilized foamed material is free or substantially free of infused carbon dioxide.

In another aspect, in the foamed articles described herein, the foamed material is a first foamed material, the foamed article comprises a second foamed material, the second foamed material is an additional material as disclosed herein, and the thermoplastic elastomeric material of the first foamed material is a recycled material, or the additional material of the second foamed material is a recycled material, or both the thermoplastic elastomeric material and the additional material are recycled materials.

In another aspect, when first pressure is from about 0.05 pounds per square inch (0.345 kilopascals) to about 6000 pounds per square inch (about 41,300 kilopascals), optionally about 15 pounds per square inch (103.4 kilopascals) to about 5500 pounds per square inch (37,900 kilopascals), about 100 pounds per square inch (689.5 kilopascals) to about 5000 pounds per square inch (34,500 kilopascals), from about 500 pounds per square inch (3,450 kilopascals) to about 2000 pounds per square inch (about 13,790 kilopascals), or from about 1000 pounds per square inch (6895 kilopascals) to about 1500 pounds per square inch (10,300 kilopascals) and the first temperature can be from about −57 degrees Celsius to about 31 degrees Celsius, optionally from about −40 degrees Celsius to about 25 degrees Celsius, or from about −40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In one aspect, the foamed material of the foamed article is substantially opaque. In another aspect, the foamed material has a split-tear value of from about 2.5 kilograms per centimeter to about 3.0 kilograms per centimeter, optionally of from about 2.5 kilograms per centimeter to about 2.8 kilograms per centimeter, from about 2.5 kilograms per centimeter to about 2.75 kilograms per centimeter, or from about 2.75 kilograms per centimeter to about 3.0 kilograms per centimeter, as measured using the Split-Tear Test Protocol. In another example, the foamed article is formed having an Asker C hardness of from about 10 to about 50, or of from about 15 to about 50, from about 15 to about 45, from about 20 to 45, or from about 20 to about 40, as measured using the Asker C Hardness Test Protocol.

Layers of the Foamable Materials and Foamed Articles and Arrangement Thereof

Figure 8A:
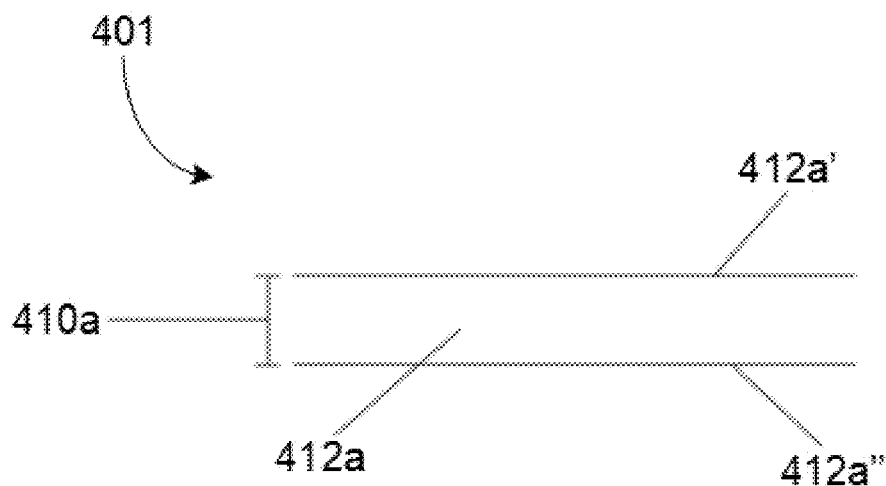
FIGS. 8A-8B illustrate various configurations of single-sided, foamable articles in accordance with an exemplary embodiment.

In one aspect, the articles disclosed herein, before undergoing a foaming process as disclosed herein, can comprise or consist essentially of a single layer of textile comprising a foamable fibrous element as illustrated, for example, in FIG. 8A. In this exemplary embodiment, article 401, before undergoing the foaming process, includes foamable fibrous element 412a having a first side 412a' and a second side 412a" and a thickness 410a. During the foaming process, at least a portion of the foamable fibrous element 412a of the single layer expands to have a foam structure, thereby increasing its volume. The increase in volume of the foamed material increases at least one dimension (length, width, or thickness) of the foamed article. In examples where the length and width of the article are significantly larger than its thickness, the change in volume following foaming will have a larger impact on its thickness. After undergoing the foaming process, in the foamed article, the thickness 410a of the single layer is increased as compared to its thickness before foaming.

In another aspect, the foamed article includes a textile, and the article can be a layered article, optionally wherein the layered article comprises at least one unfoamed layer, optionally wherein the unfoamed layer is an unfoamed face layer, optionally wherein the layered article comprises at least one foamed inner layer, or wherein the layered article comprises one or more foamed inner layers and two unfoamed face layers.

Figure 8B:
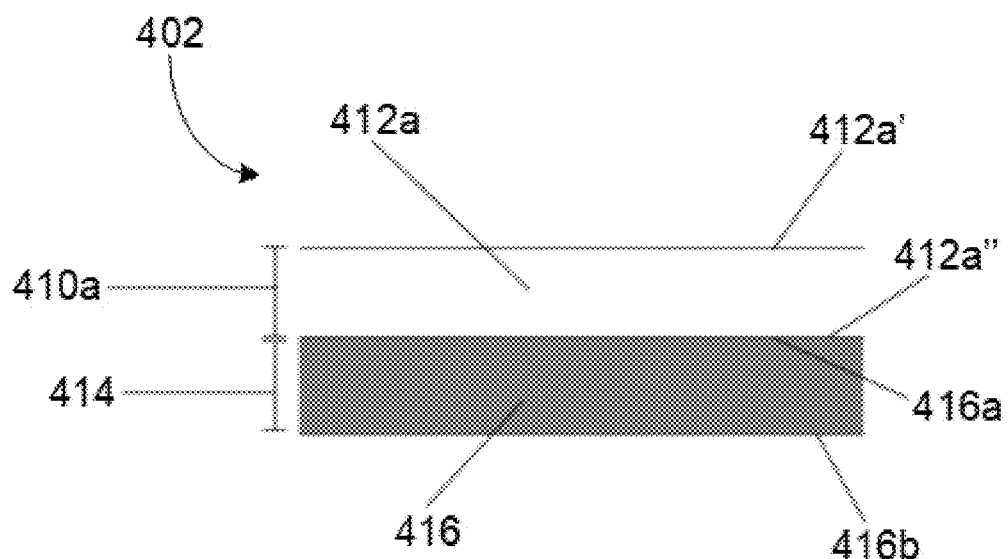

In another aspect, the articles disclosed herein, before undergoing a foaming process as disclosed herein, can comprise one or more layers, at least one of which comprises a textile according to the present disclosure, as illustrated, for example, in FIG. 8B. In this exemplary embodiment, the article 402 includes a face layer 412a having thickness 410a, and an inner layer 416 having a thickness 414. In another aspect, the layered article can further comprise one or more film layers, optionally wherein at least one of the one or more film layers individually comprises a foamable fibrous element. In one aspect, one or more of the film layers can comprise a protective material, optionally wherein the protective material is an additional material or a recycled material.

In one such aspect in accordance with the example of FIG. 8B, the face layer 412a can comprise or consist essentially of a first foamable fibrous element. In such an aspect, the inner layer 416 can also comprise or consist essentially of a second foamable fibrous element, or can comprise or consist essentially of a barrier material. In some aspects, the face layer material can be a virgin material. In either of these aspects, the face layer 412a can have a first surface 412a' and a second surface 412a", and the inner layer can have a first surface 416a and a second surface 416b. In some aspects, the second surface 412a" of the face layer 412a and the first surface 416a of the inner layer 416 can be adjacent to one another or otherwise in contact with one another. In some aspects, first surface 412a' of the face layer 412a can optionally be an outer surface of article 402.

During the foaming process, at least a portion of the first foamable fibrous element of the face layer 412a and, in instances wherein the inner layer 416 comprises or consists essentially of a second foamable fibrous element, optionally at least a portion of the second foamable fibrous element of the inner layer 416, expands to have a foam structure, thereby increasing its volume. The increase in volume of the foamed fibrous material increases at least one dimension (length, width, or thickness) of the foamed article. In examples where the length and width of the article are significantly larger than its thickness, and/or wherein the first and/or second foamable fibrous element is constrained in the length-wise and/or width-wise dimension, such as by being bonded to another material, the change in volume following foaming will have a larger impact on its thickness.

After undergoing the foaming process, in the foamed article, the thickness 410a of the face layer 412a is increased as compared to before foaming. In aspects where the inner layer 416 comprises a second foamable fibrous element, the second foamable fibrous element can also expand and foam, increasing the thickness 414 of the inner layer 416 as compared to its thickness before foaming. Alternatively, the inner layer 416 may not foam during the foaming process, and thus its thickness 414 will stay substantially the same before and after undergoing the foaming process. In one such aspect where the inner layer 416 remains unfoamed, the inner layer 416 comprises or consists essentially of a barrier material, and thus does not expand and foam during the foaming process. In an alternative such aspect where the inner layer 416 remains unfoamed, the inner layer 416 may comprise a second foamable fibrous element, but the second foamable fibrous element either is not infused with carbon dioxide during the maintaining and holding step, or infused carbon dioxide is diffused out of the inner layer 416 prior to the subjecting and expanding step.

Two-Sided Articles. In some aspects, the articles disclosed herein can comprise multiple layers, at least one of which comprises a foamable fibrous element according to the present disclosure as illustrated, for example, in FIG. 9. In this exemplary embodiment, the article 405 includes a two face layers, 412a having a thickness 410a and 412b having a thickness 410 and an inner layer 416 having a thickness 414. In one aspect, the article can be two-sided. Further in this aspect, a two-sided article can include a symmetrical arrangement of layers on both sides of inner layer 416.

Figure 9:
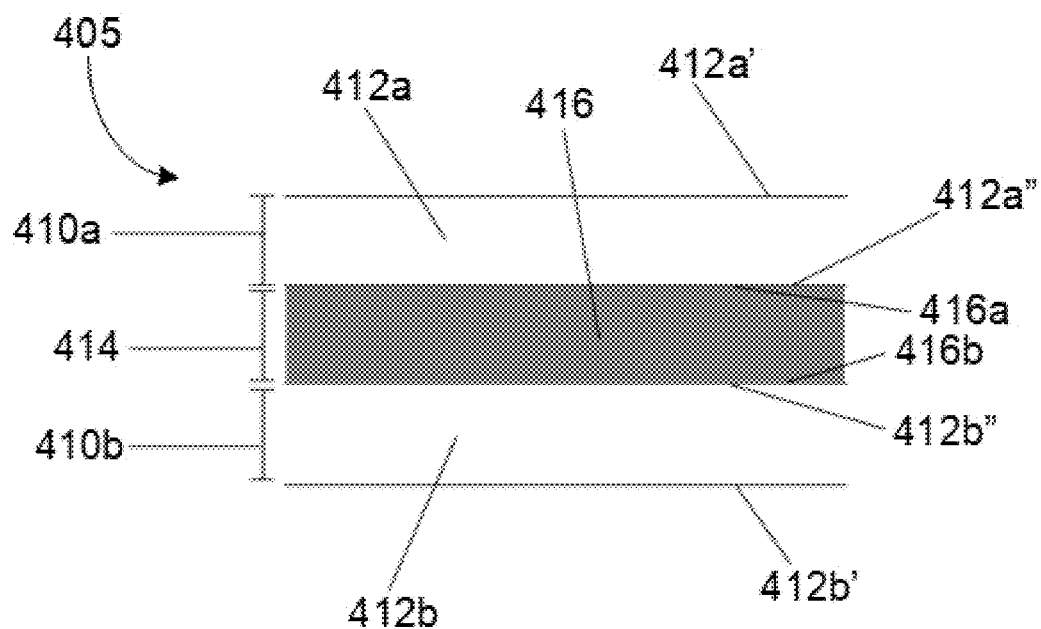
FIG. 9 illustrates a configuration of a dual-sided, foamable article in accordance with another exemplary embodiment.

In one such aspect in accordance with the example of FIG. 9, face layers 412a and 412b can comprise or consist essentially of a first foamable fibrous element. In such an aspect, the inner layer 416 can comprise or consist essentially of a second foamable fibrous element, or can comprise or consist essentially of a barrier material.

In any of these aspects, the face layer 412a can have a first surface 412a' and a second surface 412a", while the face layer 412b can have a first surface 412b' and a second surface 412b". In another aspect, the inner layer 416 can have a first surface 416a and a second surface 416b. In some aspects, the second surface 412a" of the face layer 412a and the first surface 416a of the inner layer 416 can be adjacent to one another or otherwise in contact with one another. In one aspect, the second surface 416b of the inner layer 416 and the second surface and the second surface 412b" of the face layer 412b can be adjacent to one another or otherwise in contact with one another. In some aspects, first surface 412a' of face layer 412a and/or first surface 412b' of face layer 412b can independently optionally be an outer surface of article 405.

In an aspect, during the foaming process, at least a portion of the first foamable fibrous element of the face layer 412a and/or 412b and, in instances where the inner layer 416 comprises or consists essentially of a second foamable fibrous element, optionally at least a portion of the second foamable fibrous element of inner layer 416, expands to have a foam structure, thereby increasing its volume. The increase in volume of the foamed fibrous material increases at least one dimension (length, width, or thickness) of the foamed article. In examples where the length and width of the article are significantly larger than its thickness, and/or wherein the first and/or second foamable fibrous element is constrained in the length-wise and/or width-wise dimension, such as by being bonded to another material, the change in volume following foaming will have a larger impact on its thickness.

After undergoing the foaming process, in the foamed article, thickness 410a of the face layer 412a and/or thickness 410b of the face layer 412b is increased as compared to before foaming. In aspects where the inner layer 416 comprises a second foamable fibrous element, the second foamable fibrous element can also expand and foam, increasing the thickness 414 of the inner layer 416 of the inner layer 416 as compared to its thickness before foaming. Alternatively, the inner layer 416 may not foam during the foaming process, and thus its thickness 414 will stay substantially the same before and after undergoing the foaming process.

In another aspect, the article can be a layered article having a layered structure including a series of three or more layers, including a first face layer comprising or consisting essentially of a first face layer material, the first face layer including a first face layer outer surface defining a first outer surface of the layered article, a first face layer inner surface opposing the first face layer outer surface, wherein the first face layer outer surface defines a first exterior surface of the layered article; a second face layer comprising or consisting essentially of a second face layer material, the second face layer including a second face layer outer surface defining a second outer surface of the layered article, a second face layer inner surface opposing the second face layer outer surface, optionally wherein the second face layer outer surface defines a second exterior surface of the layered article; and one or more inner layers, wherein each of the one or more inner layers comprise or consist essentially of an inner layer material, each of the one or more inner layers including an inner layer first surface, an inner layer second surface, wherein each of the one or more inner layers is positioned between the first face layer inner surface and the second face layer inner surface; wherein at least one of the three or more layers of the layered article comprises or consists essentially of a foamable fibrous element, and the steps of subjecting and expanding expand at least a portion of the foamable fibrous element of the at least one of the three or more layers into the foamed fibrous element, forming the foamed article.

In a further aspect, the step of maintaining and holding infuses the carbon dioxide into the first face layer, or infuses the carbon dioxide into the first face layer and at least one of the one or more inner layers, or infuses the carbon dioxide into the first face layer and into each of the one or more inner layers, or infuses the carbon dioxide into the first face layer, each of the one or more inner layers, and the second face layer.

In one aspect, the article is a layered article and comprises one or more foamed inner layers and two unfoamed face layers, and optionally at least one of the unfoamed layers comprises a knit textile.

Layers and Composition Thereof. In any of the disclosed aspects, the article can comprise a barrier layer comprising or consisting essentially of a barrier material as disclosed herein. In another aspect, the barrier material can be an additional material as described herein.

Protective Layers. In one aspect, the article can comprise one or more protective layers, each of the one or more protective layers individually comprising or consisting essentially of a protective material, wherein each of the one or more protective layers is adjacent to a core layer and has a protective layer thickness, wherein a combination of the one or more protective layers and the adjacent core layer has a minimum curve radius which is greater than a minimum curve radius that causes cracking of the core layer, or of one or more individual layers within the core layer, optionally wherein the protective material is a solid foamable material as disclosed herein, optionally wherein the solid foamable material is a recycled material.

Barrier Layers and/or Regions. In one aspect, the foamed article comprises a barrier layer or a barrier region, and the barrier layer or the barrier region comprises or consists essentially of a barrier material. Further in this aspect, the barrier material can be an additional material as disclosed herein.

Foamable Articles Comprising Microlayers

In one aspect, the article comprises a plurality of microlayers. In one aspect, the plurality of microlayers comprises from about 5 to about 1000 microlayers, optionally about 10 to about 1000 microlayers, from about 30 to about 500 microlayers, from about 50 to about 200 microlayers, or from about 20 to about 100 microlayers. In one aspect, the average thickness of each independent microlayer of the plurality is from about 0.01 micron to about 2.5 microns, optionally from about 0.01 micron to about 1 micron, or from about 0.05 microns to about 1 micron. In another aspect, the average thickness of each of the one or more layers comprising the plurality of alternating layers is from about 100 microns to about 0.5 centimeters, or from about 100 microns to about 0.1 centimeters.

In one aspect, at least one of the three or more layers of the series comprises the plurality of alternating layers, wherein each of the series of alternating layers individually comprises a first alternating layer material or a second alternating layer material, optionally wherein the plurality of alternating layers comprise from about 3 to about 50 individual layers, or from about 3 to about 25 individual layers, or from about 3 to about 7 individual layers, and optionally wherein the plurality of alternating layers form at least one of the one or more core layers of the layered structure. In an aspect, the plurality of alternating layers can be microlayers as described herein.

In an aspect, the first alternating layer material can be a thermoplastic material, optionally a thermoplastic elastomeric material as disclosed herein. In another aspect, the first alternating layer material can be a solid material, optionally a solid thermoplastic material, optionally a solid thermoplastic elastomeric material as disclosed herein. In an alternative aspect, the thermoplastic material can optionally be a barrier material, and optionally the barrier material is a barrier material as described elsewhere herein.

In another aspect, the second alternating layer can be a thermoplastic material, optionally an additional material, optionally wherein the additional material is a barrier material as disclosed herein.

In some aspects, the article can be configured as a series of layers comprising at least one layer of the foamable material in contact with the second material. In some aspects, the article is a sheet comprising a plurality of layers or a plurality of alternating layers including at least one layer of the foamable material and at least one layer of the second material.

In one aspect, the article comprises a plurality of microlayers. In one aspect, the plurality of microlayers comprises from about 5 to about 1000 microlayers, optionally about 10 to about 1000 microlayers, from about 30 to about 500 microlayers, from about 50 to about 200 microlayers, or from about 20 to about 100 microlayers. In one aspect, the average thickness of each independent microlayer of the plurality is from about 0.01 micron to about 2.5 microns, optionally from about 0.01 micron to about 1 micron, or from about 0.05 microns to about 1 micron. In another aspect, the average thickness of each of the one or more layers comprising the plurality of alternating layers is from about 100 microns to about 0.5 centimeters, or from about 100 microns to about 0.1 centimeters.

In another aspect, the average thickness of the core layer is from about 100 microns to about 0.5 centimeters, optionally from about 100 microns to about 0.1 centimeter.

In one aspect, thermoplastic barrier films and/or sheets can be flexed due to their inherent thinness but may not have sufficient elasticity for some applications. Further in this aspect, an alternating plurality of first microlayers and second microlayers having different compositions (e.g., thermoplastic elastomeric layers and thermoplastic barrier films and/or sheets) can provide the mix of properties (e.g., elasticity, flexibility, low gas transmission rate, and recovery of original shape after removal of a deforming force) required for applications in fields such as footwear, athletic apparel, and sporting goods.

Regions of the Foamed Materials and Foamed Articles and Arrangement Thereof

Two Regions. In one aspect, the article can be configured as a series of two or more regions including a first region including a first regional material and a second region including a second regional material, wherein the first regional material, the second regional material, or both the first regional material and the second regional material include a foamable fibrous element, optionally wherein the first region or the second region or both form an outermost surface of the article, or wherein both the first region and the second region individually or jointly form the outermost surface of the article. In another aspect, following the foaming process disclosed herein, the first regional material becomes a first regional foamed material and, when the second region is a solid foamable material, the second regional material becomes a second regional foamed material.

In another aspect, the regions can include layers, and the first region or the second region can form an inner layer of the article, or both the first region and the second region individually form separate inner layers of the article. In any of these aspects, the article can optionally be a layered sheet. In still another aspect, the first region can form the outermost surface of the article and the second region can form an inner layer of the article.

In still another aspect, in the article, the first region comprises or consists essentially of the foamable fibrous element, the foamable fibrous element of the first region is a first regional foamable fibrous element, and in the steps of subjecting and expanding, the first regional foamable fibrous element either remains as the first regional foamable fibrous element or expands into the foamed material, wherein the foamed material of the first region is a first regional foamed fibrous element.

In another aspect, in the article, the second region comprises or consists essentially of the foamable fibrous element, the foamable fibrous element of the second region is a second regional foamable fibrous element, and, in the steps of subjecting and expanding, the second regional foamable fibrous element either remains as the second regional foamable fibrous element or expands into the foamed material, wherein the foamed material of the second region is a second regional foamed fibrous element.

In any of these aspects, the first solid regional foamable material, the second solid regional foamable material, or both can individually be a foamable fibrous element as described herein. In another aspect, the first regional foamed material, the second regional foamed material, or both can individually be a foamed fibrous element as described herein. In some aspects, the first regional material or the second regional material can be a barrier material as described herein.

Barrier Region. In one aspect, in the methods disclosed herein, the first region comprises or consists essentially of the solid foamable material and the second region comprises or consists essentially of a barrier material, or wherein the first region comprises or consists essentially of the barrier material and the second region comprises or consists essentially of the solid, and the steps of maintaining and holding include holding the article and the liquid carbon dioxide in the vessel for a duration of time sufficient for the at least a portion of the liquid carbon dioxide to infuse into at least a portion of the solid foamable material, wherein the duration of time is not sufficient for at least a portion of the liquid carbon dioxide to infuse into at least a portion of the barrier material; the steps of subjecting and expanding include expanding the solid foamable material into the foamed material without expanding the barrier material; and optionally wherein, in the foamed article, the foamed material and the barrier material are in contact with each other, or the foamed material and the barrier material are not in contact with each other.

Three Regions. In one aspect, in the disclosed methods, the article can be configured as a series of three or more regions, further comprising a third region comprising or consisting essentially of a third regional material, optionally wherein the third regional material comprises or consists essentially of a barrier material, or comprises or consists essentially of a third regional solid foamable material, or optionally wherein the third region is positioned between the first region and the second region.

In another aspect, in the foamed article, the third regional material can be a third regional foamed material. Optionally, the third regional foamed material can be an additional foamed material as defined herein, or can be the foamed material as disclosed herein. In an alternative aspect, the third regional material is a third regional solid material, optionally an additional solid material. In some aspects, the additional solid material can be a barrier material.

Figure 10A:
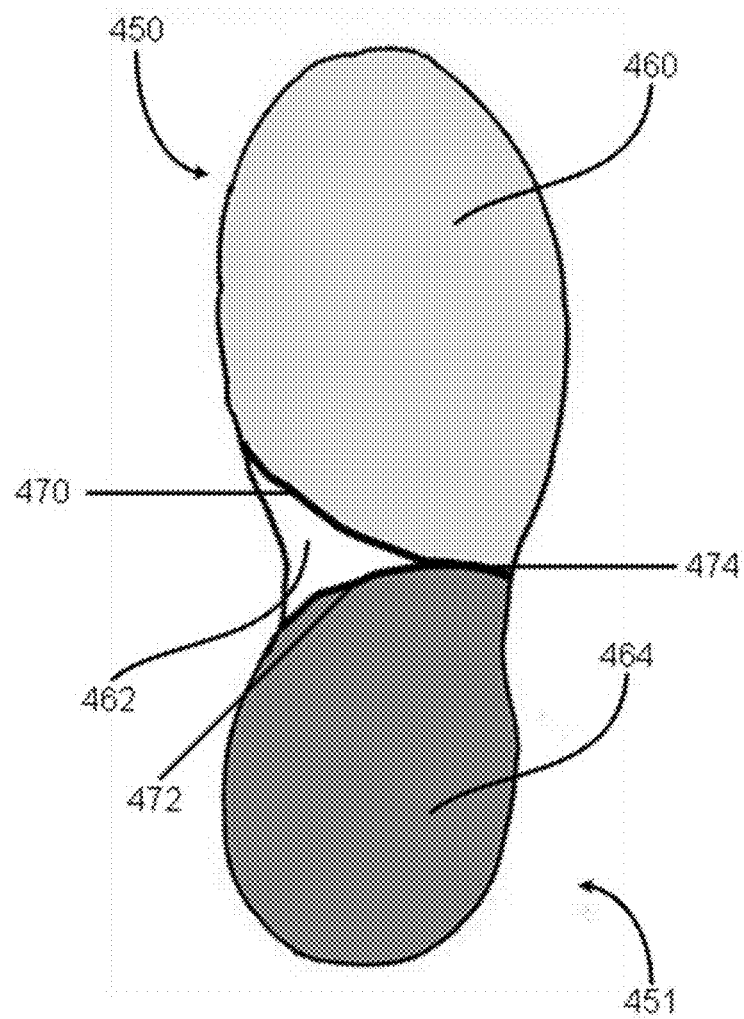
FIG. 10A illustrates a configuration of a foamable article comprising various regions in accordance with an exemplary embodiment.
Figure 10B:
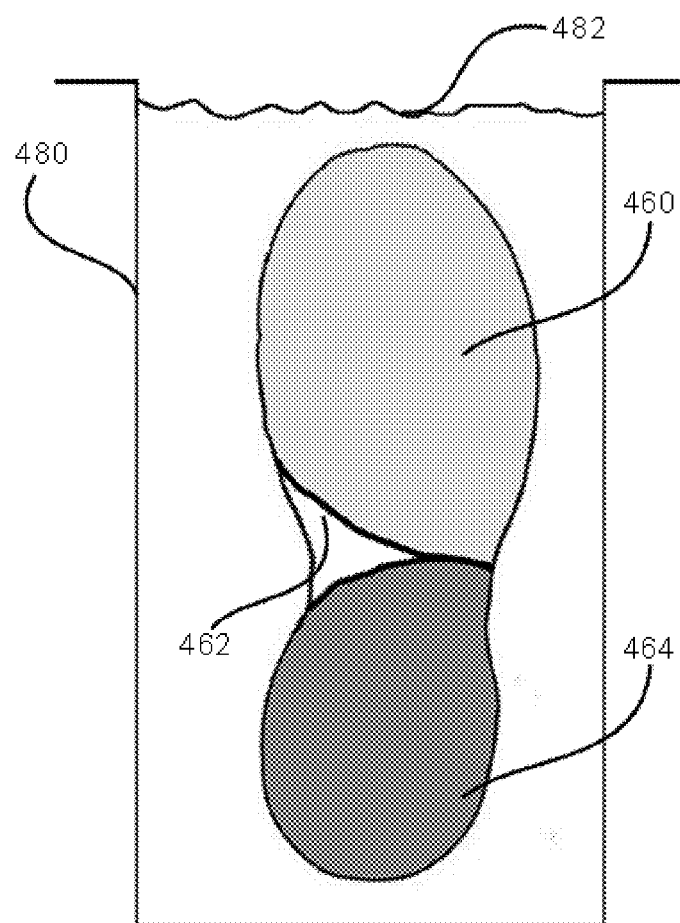
Figure 10C:
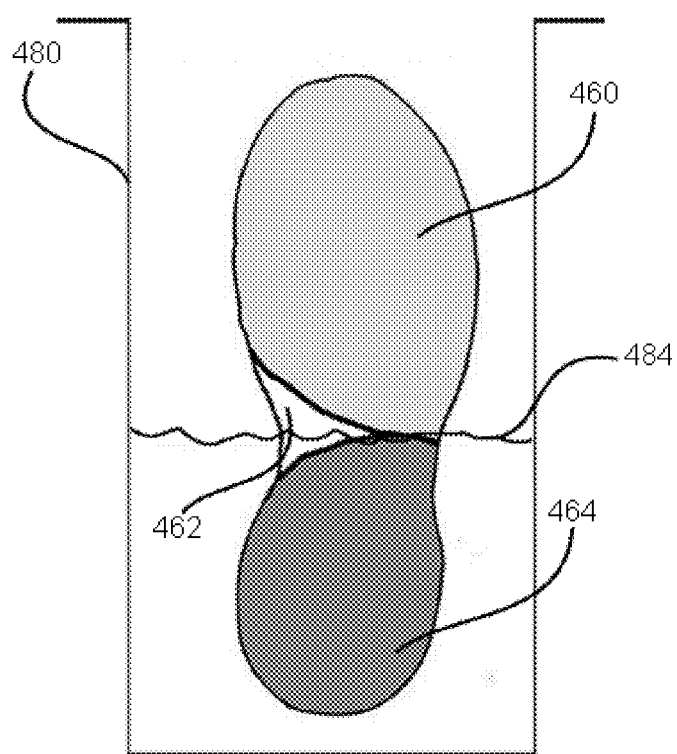

Turning now to FIG. 10A, in an exemplary embodiment, the foamable article can comprise three regions. In one aspect, when the foamable article is an outsole of an article of footwear, heel area 451 can include region 464, which can comprise or consist essentially of a first regional material, wherein the first regional material can be a first regional foamable material. Further in this aspect, toe area 450 can include region 460, which can comprise or consist essentially of a second regional material, wherein the second regional material can be a second regional foamable material, or, in some aspects, can be a barrier material. Still further in this aspect, the foamable article can contain a third region 462, which can comprise or consist essentially of a third regional material, wherein the third regional material can be a third regional foamable material, or, in some aspects, can be a barrier material. In any of these aspects, at least one of the first, second, and/or third regions comprises or consists essentially of a solid foamable material. In some aspects, In an aspect, when a foamable article comprises two or more regions, interfaces between and among the regions will also be present. Thus, in one exemplary aspect as depicted in FIG. 8A, the foamable article can include an interface 474 between the first region 464 and the second region 460, and/or can include an interface 470 between the second region 460 and the third region 462, and/or can include an interface 472 between the first region 464 and the third region 462.

Properties of the Foamed Materials and Foamed Articles

In one aspect, in the foamed article, the foamed material has a density of from about 0.01 gram per cubic centimeter to about 3.0 grams per cubic centimeter, optionally of from about 0.01 gram per cubic centimeter to about 0.1 gram per cubic centimeter, from about 0.01 gram per cubic centimeter to about 0.05 grams per cubic centimeter, from about 0.01 gram per cubic centimeter to about 0.025 grams per cubic centimeter, from about 0.05 grams per cubic centimeter to about 0.1 gram per cubic centimeter, from about 0.1 gram per cubic centimeter to about 3.0 grams per cubic centimeter, from about 0.2 grams per cubic centimeter to about 2.0 grams per cubic centimeter, from about 0.3 grams per cubic centimeter to about 1.5 grams per cubic centimeter, from about 0.3 grams per cubic centimeter to about 1.2 grams per cubic centimeter, or from about 0.4 grams per cubic centimeter to about 1.0 grams per cubic centimeter.

In one aspect, following foaming, the foamed article is substantially opaque. In a further aspect, opacity of the foamed article eliminates the need for adding pigments to the thermoplastic elastomeric material in order to make it white.

In one aspect, the foamed material, the foamed article, or both, have a split-tear value of from about 2.5 kilograms per centimeter to about 3.0 kilograms per centimeter, optionally of about 2.5 kilograms per centimeter to about 2.7 kilograms per centimeter, about 2.5 kilograms per centimeter to about 2.6 kilograms per centimeter, about 2.7 kilograms per centimeter to about 3.0 kilograms per centimeter, or about 2.8 kilograms per centimeter to about 3.0 kilograms per centimeter, as measured using the Split-Tear Test Protocol.

Method of Manufacturing an Article Comprising a Foamed Article

In one aspect, disclosed herein is a method for manufacturing an article, the method comprising affixing a first component to a second component, wherein the first component is a foamed article made by the method disclosed herein. In some aspects, the first component can be a first component of an article of apparel, the second component can be a component of an article of apparel, and the article to be manufactured is an article of apparel.

In other aspects, the first component can be a first component of an article of footwear, the second component can be a second component of an article of footwear, and the article to be manufactured is an article of footwear. Further in these aspects, the first component can be a cushioning element and the second component can be a sole component or an upper component.

In still other aspects, the first component can be a first component of an article of sporting equipment, the second component can be a component of an article of sporting equipment, and the article to be manufactured is an article of sporting equipment.

Foamable Material

The solid foamable material of the articles as described herein is a thermoplastic elastomeric material, meaning that the material is a polymeric material having thermoplastic properties as well as elastomeric properties. The solid foamable material is a polymeric material comprising or consisting essentially of one or more first thermoplastic elastomers. In some aspects, the solid foamable material comprises one or more additional thermoplastic polymers, where the one or more additional thermoplastic polymers may be thermoplastic elastomers, or may be thermoplastic but not elastomeric. In some aspects, the solid foamable material comprises additional non-polymeric ingredients. In many of the disclosed foamed articles described herein, the foamed material is a thermoplastic elastomeric material, meaning that, following the expanding, the foamed material retains thermoplastic and elastomeric properties.

In any of the disclosed aspects, the foamable material can be described as comprises a polymeric component, wherein the polymeric component includes all of the polymers present in the foamable material. In this regard, the polymeric component can consist essentially of one or more first thermoplastic elastomers, meaning that, in such an aspect, essentially all the polymers present in the foamable material are thermoplastic elastomers. In one aspect, the one or more first thermoplastic elastomers of the foamable material comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyether homopolymers or copolymers, one or more thermoplastic elastomeric polycarbonate homopolymers or copolymers, one or more thermoplastic elastomeric polyacrylate homopolymers or copolymers, one or more thermoplastic elastomeric polyurethane homopolymers or copolymers, one or more thermoplastic elastomeric styrenic homopolymers or copolymers, or any combination thereof. Similarly, the polymeric component of the foamable material can consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyether homopolymers or copolymers, one or more thermoplastic elastomeric polycarbonate homopolymers or copolymers, one or more thermoplastic elastomeric polyacrylate homopolymers or copolymers, one or more thermoplastic elastomeric polyurethane homopolymers or copolymers, one or more thermoplastic elastomeric styrenic homopolymers or copolymers, or any combination thereof.

In one aspect, the one or more first thermoplastic elastomers of the foamable material comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof. Similarly, the polymeric component of the foamable material can consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In one aspect, thermoplastic materials, including thermoplastic elastomeric materials, are advantageous for use in articles described herein, since thermoplastic materials can be reclaimed and reformed into new articles, thus reducing waste and promoting recycling. In another aspect, both foamed and unfoamed thermoplastic materials can be recycled for use in the articles and methods described herein.

In one aspect, when the one or more first thermoplastic elastomers comprises or consists essentially of one or more thermoplastic elastomeric polyolefin homopolymers or copolymers, the one or more first thermoplastic elastomers comprise or consist essentially of thermoplastic elastomeric polypropylene homopolymers or copolymers; thermoplastic polyethylene homopolymers or copolymers, including thermoplastic elastomeric ethylene-vinyl acetate copolymers; thermoplastic elastomeric polybutylene homopolymers or copolymers; or any combination thereof. The polymeric component of the foamable material can consist essentially of one or more thermoplastic elastomeric polyolefin homopolymers or copolymers.

In one aspect, the one or more thermoplastic elastomeric polyolefin homopolymers or copolymers can comprise or consist essentially of one or more thermoplastic elastomeric ethylene-vinyl acetate copolymers. The polymeric component of the foamable material can consist essentially of one or more thermoplastic elastomeric ethylene-vinyl acetate copolymers. Further in this aspect, the thermoplastic ethylene-vinyl acetate copolymer can include from about 25 weight percent to about 50 weight percent vinyl acetate content, optionally from about 25 weight percent to about 40 weight percent vinyl acetate content, from about 25 weight percent to about 30 weight percent vinyl acetate content, or from about 35 weight percent to about 50 weight percent vinyl acetate content.

In another aspect, the foamable material can comprise one or more thermoplastic ethylene-vinyl alcohol copolymer. The polymeric component of the foamable material can comprise one or more thermoplastic ethylene-vinyl alcohol copolymers. Further in this aspect, the thermoplastic ethylene-vinyl alcohol copolymer can include from about 25 weight percent to about 50 weight percent vinyl alcohol content, optionally from about 25 weight percent to about 40 weight percent vinyl alcohol content, from about 25 weight percent to about 30 weight percent vinyl alcohol content, or from about 35 weight percent to about 50 weight percent vinyl alcohol content.

In another aspect, the one or more first thermoplastic elastomers of the foamable material comprises or consists essentially of one or more thermoplastic elastomeric polyamide homopolymers or copolymers. The polymeric component of the foamable material can consist essentially of the one or more thermoplastic elastomeric polyamide homopolymers or copolymers. The one or more thermoplastic elastomeric polyamide homopolymers or copolymers can comprise or consist essentially of thermoplastic elastomeric polyether block polyamide (PEBA) copolymer elastomers.

The one or more first thermoplastic elastomers can comprise or consist essentially of one or more thermoplastic elastomeric polyester homopolymers or copolymers. The polymeric component of the foamable material can consist essentially of the one or more thermoplastic elastomeric polyester homopolymers or copolymers. The thermoplastic elastomeric polyester homopolymer can include or consist essentially of one or more polyester terephthalate. The thermoplastic elastomeric polyester homopolymer or copolymer can include or consist essentially of one or more thermoplastic elastomeric copolyesters.

The one or more first thermoplastic elastomers can comprise or consist essentially of one or more thermoplastic elastomeric polyether homopolymers or copolymers. The polymeric component of the foamable material can consist essentially of the one or more thermoplastic elastomeric polyether homopolymers or copolymers.

The one or more first thermoplastic elastomers can comprise or consist essentially of one or more thermoplastic elastomeric polyether homopolymers or copolymers. The polymeric component of the foamable material can consist essentially of the one or more thermoplastic elastomeric polyether homopolymers or copolymers.

The one or more first thermoplastic elastomers can comprise or consist essentially of one or more thermoplastic elastomeric polycarbonate homopolymers or copolymers. The polymeric component of the foamable material can consist essentially of the one or more thermoplastic elastomeric polycarbonate homopolymers or copolymers.

The one or more first thermoplastic elastomers can comprise or consist essentially of one or more thermoplastic elastomeric polyacrylate homopolymers or copolymers, including polyacrylic acids, polymethacrylates, and the like. The polymeric component of the foamable material can consist essentially of the one or more thermoplastic elastomeric polyacrylate homopolymers or copolymers.

Thermoplastic elastomeric polyurethane homopolymers and copolymers have been found to be particularly useful in the methods and articles described herein. In an aspect, the one or more first thermoplastic elastomers comprise or consist of one or more thermoplastic elastomeric polyurethane homopolymers or copolymers, where a thermoplastic polyurethane homopolymer is understood to mean a polymer chain including only urethane segments, and a polyurethane copolymer is understood to mean a polymer chain including urethane segments as well as other types of segments, such as ester segments or ether segments or the like and combinations thereof. When the one or more first thermoplastic elastomers comprise one or more thermoplastic elastomeric polyurethane homopolymers or copolymers, the one or more thermoplastic elastomers can comprise or consist essentially of thermoplastic elastomeric polyester-polyurethane copolymers, thermoplastic elastomeric polyether-polyurethane copolymers, thermoplastic elastomeric polycarbonate-polyurethane copolymers, or combinations thereof. In some aspects, the one or more first thermoplastic elastomers of the foamable material comprises or consists essentially of one or more thermoplastic elastomeric polyester-polyurethane copolymers, optionally wherein the polymeric component of the foamable material consists of the one or more thermoplastic elastomeric polyester-polyurethane copolymers.

Thermoplastic polyurethanes can be produced via reaction of diisocyanates with difunctional compounds that are reactive toward isocyanates. In general, the difunctional compounds have two hydroxyl groups (diols) and can have a molar mass of from 62 Daltons (the molar mass of ethylene glycol) to about 10,000 Daltons, or from about 100 Daltons to about 5000 Daltons, or from about 500 Daltons to about 5000 Daltons, or from about 500 Daltons to about 2500 Daltons, or from about 2500 Daltons to about 10,000 Daltons, or from about 5000 Daltons to about 10,000 Daltons, or from about 5000 Daltons to about 7500 Daltons, or from about 7500 Daltons to about 10,000 Daltons although difunctional compounds having other isocyanate-reactive groups (e.g., secondary amines) can be used, generally in minor amounts, and a limited molar fraction of tri-functional and mono-functional isocyanate-reactive compounds can be used. In one example, the polyurethane is linear. Including difunctional compounds with molar masses of about 400 Daltons or greater introduces soft segments into the polyurethane. An increased ratio of soft segments to hard segments in the polyurethane can cause the polyurethane to become increasingly more flexible and eventually elastomeric. In one example, the one or more thermoplastic elastomeric materials include a thermoplastic polyurethane elastomer or a combination of thermoplastic polyurethane elastomers.

Suitable thermoplastic polyurethane elastomers include thermoplastic polyester-polyurethanes, polyether-polyurethanes, and polycarbonate-polyurethanes. Nonlimiting examples of these include polyurethanes polymerized using as diol reactants, polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from alkylene oxides or combinations of alkylene oxides, and polycarbonate diols such as polyhexamethylene carbonate diol and poly(hexamethylene-co-pentamethylene) carbonate diols. The thermoplastic polyurethane elastomers can be prepared by reaction of one of these polymeric diols (polyester diol, polyether diol, polylactone diol, polytetrahydrofuran diol, or polycarbonate diol), one or more polyisocyanates, and optionally, one or more monomeric chain extension compounds. Chain extension compounds are compounds having two or more functional groups, for example two functional groups, reactive with isocyanate groups. In one example, the thermoplastic polyurethane elastomer(s) is substantially linear (i.e., all or substantially all of the reactants are di-functional).

In still another aspect, the one or more first thermoplastic elastomers comprise or consist essentially of one or more thermoplastic elastomeric styrene homopolymers or copolymers. The polymeric component of the foamable material can consist essentially of one or more thermoplastic elastomeric styrene homopolymers or copolymers. The one or more thermoplastic elastomeric styrenic homopolymers or copolymers can comprise or consist essentially of one or more styrene butadiene styrene (SBS) block copolymer elastomers, one or more styrene ethylene butylene styrene (SEBS) copolymer elastomers, one or more styrene acrylonitrile (SAN) copolymer elastomers, or any combination thereof.

In any of these aspects, the one or more first thermoplastic elastomers comprises or consists essentially of one or more recycled first thermoplastic elastomers. Similarly, the polymeric component of the foamable material can comprise or consist essentially of recycled thermoplastic polymers. In one aspect, the polymeric component of the foamable material comprises or consists essentially of one or more recycled thermoplastic elastomeric polymers. In another aspect, the polymeric component of the foamable material comprises one or more recycled thermoplastic polymers. In yet another aspect, the polymeric component of the foamable material comprises or consists essentially of one or more recycled thermoplastic elastomeric polymers, and one or more thermoplastic non-elastomeric polymers. In yet another aspect, the polymeric component of the foam consists essentially of one or more thermoplastic elastomeric polyurethanes, and one or more thermoplastic polyolefins.

In one aspect, the foamable material comprises a mixture of the polymeric component and a non-polymeric component consisting of one or more non-polymeric additives, optionally wherein the foamable material comprises from about 0.005 percent by weight to about 20 percent by weight of the non-polymeric component based on a total weight of the foamable material, optionally about 0.5 percent by weight to about 10 percent by weight, about 1 percent by weight to about 5 percent by weight, or about 1 percent by weight to about 2 percent by weight of the non-polymeric additive based on a total weight of the foamable material.

Other materials that can be used to form part of the composition of the foamable material include, without limitation, colorants including pigments and dyes; fillers such as clays, including nanoclays and halloysite clays; nanotubes, nucleating agents, emulsifiers, release agents including surfactant-based release agents, antioxidants, stabilizers, crosslinkers, and/or the like.

The foamable material can be a relatively soft material. In some examples, the foamable material has a Shore A hardness of from about 35 A to about 95 A. In other examples, the foamable material has a Shore A hardness of from about 70 A to about 95 A, optionally about 35 A to about 70 A, about 50 A to about 70 A, or about 55 A to about 90 A, as measured using the Shore A Hardness Test Protocol.

In any of these aspects, the foamable material does not melt and/or is not molten during the performance of the maintaining and holding step or the subjecting and expanding step of the methods disclosed herein. In accordance with the present disclosure, carbon dioxide is used to infuse at least a portion of the solid foamable material of the article, and the solid foamable material remains as a solid during the infusing. The infused solid foamable material of the article remains in the solid state up until the point that it is expanded by the infused carbon dioxide phase transitioning to a gas, imparting a multi-cellular structure to the foamed material without the foamable material being melted or in a molten state during the expanding. While it is possible to conduct additional processing steps on the foamed article which may melt a portion or a region of the solid foamable material or the foamed material, it is to be understood that any steps involving melting the solid foamable material or melting the foamed material are conducted either before the maintaining an holding step, or after the subjecting and expanding step. In some aspects, the foamed material of the foamed articles is a physically expanded solid material formed without melting the solid material. The avoidance of melting the thermoplastic elastomeric material during the foaming process reduces the "thermal history" of the thermoplastic elastomeric material, i.e., the number of heating and cooling cycles to which the thermoplastic elastomeric material is exposed, which reduces or prevents thermal degradation of the thermoplastic elastomeric material.

Blends. In one aspect, the foamable material can comprise or consist essentially of a blend of the one or more first thermoplastic elastomers and a second material. In some aspects, the second material comprises or consists essentially of one or more second polymers, optionally wherein the one or more second polymers comprise or consist essentially of one or more second thermoplastics. In such aspects, the polymeric component of the foamable material comprises or consists essentially of the one or more first thermoplastic elastomers, and the one or more second thermoplastics.

In another aspect, the one or more second thermoplastics can comprise or consist essentially of one or more thermoplastic polyolefin homopolymers or copolymers, one or more thermoplastic polyamide homopolymers or copolymers, one or more thermoplastic polyester homopolymers or copolymers, one or more thermoplastic polyether homopolymers or copolymers, one or more thermoplastic polycarbonate homopolymers or copolymers, one or more thermoplastic polyacrylate homopolymers or copolymers, one or more thermoplastic polyurethane homopolymers or copolymers, one or more thermoplastic styrenic homopolymers or copolymers, or any combination thereof. In some aspects, the one or more second thermoplastic polyolefin homopolymers or copolymers comprise or consist essentially of thermoplastic polypropylene homopolymers or copolymers, thermoplastic polyethylene homopolymers or copolymers, thermoplastic polybutylene homopolymers or copolymers, or any combination thereof. In one aspect, the one or more second thermoplastics comprise or consist essentially of one or more thermoplastic polyethylene copolymers, including one or more thermoplastic ethylene-vinyl alcohol copolymers or one or more thermoplastic ethylene-vinyl acetate copolymers. In one aspect, the polymeric component of the foamable material consists essentially of a blend of the one or more first thermoplastic elastomers and the one or more second thermoplastics, optionally wherein the blend foams during the steps of subjecting and expanding. In such an aspect, the one or more second thermoplastics can include one or more thermoplastic polyolefin homopolymers or copolymers. In another aspect, the polymeric component of the foamable material consists essentially of a blend of the one or more first thermoplastic elastomeric polyurethane homopolymers or copolymers and one or more second thermoplastic ethylene-vinyl alcohol copolymers. Further in this aspect, the polymeric component can consist essentially of one or more first thermoplastic elastomeric polyester-polyurethane homopolymers or copolymers and one or more second thermoplastic ethylene-vinyl alcohol copolymers.

In one aspect, the blend can comprise one or more recycled first thermoplastic elastomers, one or more recycled second thermoplastics, or both. The one or more recycled first thermoplastic elastomers can include one or more recycled thermoplastic elastomeric polyurethane copolymers, such as one or more recycled thermoplastic elastomeric polyurethane-polyester copolymer, or one or recycled thermoplastic elastomeric polyurethane-polyether copolymer. The one or more recycled second thermoplastics can include one or more recycled thermoplastic polyolefin, such as one or more recycled polyethylene copolymer.

Recycled materials. In one aspect, the recycled materials useful in the methods disclosed herein can comprise foamable material that is an unfoamed material (i.e., the foamable material has not previously been foamed). For example, the recycled material can be obtained by recycling (e.g., by regrinding or another method) foamable material that has not been foamed, such as scrap or waste material. In another aspect, the recycled foamable material can be obtained by recycling articles comprising the foamable material before the articles have been foamed (e.g., by recycling defective articles that have been rejected prior to foaming).

In one aspect, the blend comprises a phase-separated blend of the one or more first thermoplastic elastomers and the one or more second thermoplastics. In some aspects, the phase-separated blend includes one or more phase-separated regions including interfaces between the one or more first thermoplastic elastomers and the one or more second thermoplastics. Without wishing to be bound by theory, the one or more first thermoplastic elastomers and the one or more second thermoplastics can phase separate, or when the one or more first thermoplastic elastomers comprise at least one copolymer having hard and soft segments, the hard and/or soft segments may have affinity for the second thermoplastic; thus, in some aspects, the phase-separated blend can include some polymeric entanglements in addition to interfaces between portions of the one or more first thermoplastic elastomers and the one or more second thermoplastics. During the step of subjecting and expanding, the presence of one or more interfaces, such as an interface between phase-separated regions, or between different polymeric materials within the article, can act as nucleating site for forming gas bubbles, and so the presence of such nucleating sites in the article can increase the uniformity of the cell structures in the foamed material.

The blend can comprise at least 50 weight percent of the one or more first thermoplastic elastomers, and less than 50 weight percent of the one or more second thermoplastics based on a total weight of the blend. The blend can comprise at least 70 weight percent of the one or more first thermoplastic elastomers, and less than 30 weight percent of the one or more second thermoplastics based on a total weight of the blend. The blend can comprise at least 80 weight percent of the one or more first thermoplastic elastomers and less than 20 weight percent of the one or more second thermoplastics based on a total weight of the blend. In an exemplary aspect, the blend comprises about 95 percent by weight of the one or more first thermoplastic elastomers and about 5 percent by weight of the one or more second thermoplastics based on a total weight of the blend.

In some aspects, the solubility of carbon dioxide can vary in the different polymeric materials making up the foamable material, such as when the foamable material is a blend of a first thermoplastic elastomeric material with a second, non-elastomeric thermoplastic material, or a blend of reground and virgin materials, as the reground and virgin materials have different thermal histories. In some aspects, the solubility of the carbon dioxide is greater in the one or more thermoplastic elastomers than in the one or more non-elastomeric thermoplastics. In one aspect, the carbon dioxide is soluble in the one or more first thermoplastic elastomers at a concentration of from about 1 weight percent to about 30 weight percent, optionally from about 5 weight percent to about 20 weight percent, from about 5 weight percent to about 10 weight percent, or from about 10 weight percent to about 20 weight percent, based on a total weight of the one or more first thermoplastic elastomers present in the foamable material. In another aspect, the carbon dioxide is soluble in the one or more second thermoplastics at a concentration of less than 1 weight percent, optionally less than 0.5 weight percent, less than 0.25 weight percent, or less than 0.1 weight percent, based on a total weight of the one or more second thermoplastic present in the foamable material. In some aspects, the carbon dioxide is substantially insoluble in the one or more second thermoplastics. The solubility of carbon dioxide in the one or more first thermoplastic elastomers and the one or more second thermoplastics can be determined gravimetrically be infusing carbon dioxide into separate samples of the first thermoplastic elastomers and the second thermoplastics at the first temperature Foamed Material In an aspect, disclosed herein is a foamed material. In one aspect, the foamed material can be the product of expanding any of the foamable materials described above. In another aspect, the foamed material can be a thermoplastic material. In still another aspect, the foamed material can be partially or fully crosslinked. In one aspect, when the foamed material is crosslinked, the crosslinking may fully or partially crosslink the foamed material. In some aspects, when the foamed material is partially crosslinked, it may retain some thermoplastic characteristics so that the foam can thermally soften. In an alternative aspect, the foamed material may be crosslinked to the point that it becomes a thermoset foamed material.

In one aspect, the foamed material can be crosslinked during or following the steps of subjecting and expanding. In another aspect, the crosslinking can be actinically initiated. In one exemplary aspect, the crosslinking can be initiated using thermal radiation, light (e.g., UV radiation), an electron beam, or any combination thereof.

In some aspects, the foamable material further comprises a crosslinking agent such as, for example, a thermally-initiated crosslinking agent or a light-initiated crosslinking agent.

In one aspect, the foamed material has a Shore A hardness of from about 35 A to about 95 A. In other examples, the foamed material has a Shore A hardness of from about 70 A to about 95 A, optionally about 35 A to about 70 A, about 50 A to about 70 A, or about 55 A to about 90 A, as measured using the Shore A Hardness Test Protocol.

In another aspect, the foamed material can have an Asker C hardness of from about 10 to about 50, optionally of about 15 to about 5-, about 15 to about 45, about 20 to about 45, or about 20 to about 40, as measured using the Asker C Hardness Test Protocol.

In some aspects, the article, prior to foaming, can be optically clear and colorless). After foaming, the article can be opaque, depending upon the placement and thickness of the foamed material.

Additional Material

In one aspect, the article comprises an additional material i.e., another material in addition to the solid foamable material. Optionally, the additional material can be an additional thermoplastic material, optionally an additional thermoplastic elastomeric material, optionally wherein the additional thermoplastic elastomeric material is an additional (i.e., second) foamable material. In another aspect, the additional material can be an additional foamable material and, during the expanding step, the additional foamable material expands into an additional foamed material. In a further aspect, in the foamed article, a density of the first foamed material differs from a density of the additional foamed material by at least 5 percent, optionally at least 10 percent, or at least 20 percent.

In one aspect, the article comprises an additional material, wherein the additional material is a separate material from the foamable material. In one aspect, the additional material and the foamable material can be bonded to one another or can interface with one another. In another aspect, the additional material and the foamable material may can have some polymer chains that intermingle at the interface (for example, if the foamable material and additional material are heat-bonded). In another aspect, the additional material comprises or consists essentially of one or more polymers and includes an additional material polymeric component consisting of all the polymers present in the additional material. In an optional aspect, the additional material comprises or consists essentially of a second material, optionally wherein the second material is a thermoplastic material. Still further in this aspect, the additional material can optionally comprise the additional material polymeric component mixed with an additional material non-polymeric component consisting of all non-polymeric components present in the additional material.

In one aspect, the article can comprise an additional fibrous element comprising or consisting essentially of the additional material. In a further aspect, the additional fibrous element comprises or consists essentially of a second plurality of filaments, fibers, yarns, or any combination thereof, and optionally the second plurality of filaments, fibers, yarns, or any combination thereof comprises or consists essentially of the additional material. In some aspects, the additional fibrous element can be a second textile element. In one aspect, the second textile element can comprise or consist essentially of a knit textile, a woven textile, a crocheted textile, a braided textile, a tatted textile, a nonwoven textile, or any combination thereof.

In an aspect, the article can comprise one or more first portions of the foamable fibrous element, and one or more second portions of the additional fibrous element, wherein the one or more first portions are distinct from the one or more second portions.

In some aspects, the article comprises one or more first portions of the foamable material, and one or more second portions of the additional material, wherein the one or more first portions are distinct from the one or more second portions.

In another aspect, the additional material is an additional fibrous element. In one aspect, the additional fibrous element can be a second yarn or a third yarn.

In one aspect, the additional material is separate from the foamable material and/or is not a component of the foamable material. Further in this aspect, the additional material can be present in the article as a distinct element that is separate from the foamable material but which may be in contact with at least a portion of the foamable material. In other aspects, the additional material can be a component of the foamable material, e.g., as part of a blend further comprising the first material.

In one aspect, the additional material comprises a barrier material comprising one or more barrier materials, the barrier material comprising a barrier polymeric component consisting of all polymers present in the barrier material. In some aspects, during the expanding step, the additional material remains substantially unfoamed.

In some aspects, the additional material can be a recycled material comprising one or more recycled polymers, optionally wherein the one or more recycled polymers comprise one or more recycled thermoplastics, optionally wherein the one or more recycled thermoplastic comprise one or more recycled thermoplastic elastomers, optionally wherein the recycled material comprises a recycled material polymeric component consisting of one or more recycled thermoplastics, optionally wherein the recycled material polymeric component consists of one or more recycled thermoplastic elastomers. In some aspects, the recycled material comprises one or more recycled first thermoplastic elastomers. Optionally, in another aspect, the one or more recycled first thermoplastic elastomers comprise one or more reground first thermoplastic elastomers. Optionally, further in this aspect, the one or more recycled or reground first thermoplastic elastomers include a thermoplastic elastomer as described herein.

In another aspect, the recycled material further comprises one or more recycled second thermoplastics. Optionally, in an aspect, the one or more recycled second thermoplastics comprise one or more reground second thermoplastics. Optionally, further in this aspect, the one or more recycled or reground second thermoplastics includes a thermoplastic according to any one of the preceding aspects. In some aspects, the recycled material comprises one or more recycled or reground thermoplastic polyurethane elastomers or one or more recycled thermoplastic ethylene-vinyl alcohol copolymers or both.

In one aspect, the recycled material can comprise a blend of the one or more recycled or reground thermoplastic elastomers and one or more second thermoplastics, or can comprise a blend of one or more thermoplastic elastomers and one or more recycled thermoplastics, or one or more recycled second thermoplastics. Optionally, in one aspect, the blend can be a phase-separated blend, optionally wherein the phase separated blend comprises one or more interfaces between the one or more first thermoplastic elastomers and the one or more second thermoplastics.

In another aspect, the recycled material can comprise from about 99 percent to about 90 percent by weight of the one or more first thermoplastic elastomers and from about 1 percent to about 10 percent by weight of the second thermoplastics, based on a total weight of the recycled material, optionally from about 99 percent to about 93 percent by weight of the one or more first thermoplastic elastomers and from about 1 percent to about 7 percent by weight of the one or more second thermoplastics, or about 90 percent to about 95 percent by weight of the one or more first thermoplastic elastomers and from about 1 percent to about 5 percent by weight of the one or more second thermoplastic elastomers.

In some aspects, the recycled material comprises about 99 percent to about 50 percent by weight of recycled or reground polymers based on a total weight of recycled material, optionally from about 99 percent to about 75 percent by weight of recycled or reground polymers.

In any of these aspects, the carbon dioxide is soluble in the recycled material at a concentration of from about 1 weight percent to about 30 weight percent based on a total weight of the recycled material, optionally from about 5 weight percent to about 20 weight percent. In another aspect, the carbon dioxide is soluble in the one or more recycled or reground thermoplastic elastomers at a concentration of from about 1 weight percent to about 30 weight percent based on a total weight of the one or more recycled or reground thermoplastic elastomers, optionally from about 5 weight percent to about 20 weight percent. In still another aspect, the carbon dioxide can be soluble in the one or more recycled or reground second thermoplastics at less than 1 weight percent, optionally less than 0.5 weight percent, less than 0.25 weight percent, or less than 0.1 weight percent, based on a based on a total weight of the one or more recycled or reground second thermoplastics, or optionally wherein the carbon dioxide is substantially insoluble in the one or more recycled or reground second thermoplastics.

In an aspect, the recycled material comprises a recycled foamed article produced by the methods disclosed herein, optionally wherein the recycled foamed article is a reground foamed article. In some aspects, the recycled material comprises foamable material, wherein the foamable material is an unfoamed material. In another aspect, the recycled material further comprises one or more virgin first thermoplastic elastomers, optionally wherein the one or more virgin first thermoplastic elastomers includes one or more virgin thermoplastic polyurethane elastomers. In still another aspect, the recycled material includes one or more nucleating agents or nucleating sites for foaming the recycled material, optionally wherein the one or more nucleating sites include one or more interfaces between phase-separated polymers.

In one aspect, the barrier material has a hardness of at least 10 Shore A units greater than the foamable material, optionally at least 20 Shore A units greater, at least 30 Shore A units greater, or at least 40 Shore A units greater than the foamable material, as measured using the Shore A Hardness Test Protocol.

In any of these aspects, the additional material can be a barrier material having a nitrogen gas transmission rate of less than or equal to 10 cubic centimeters per square meter per 24 hours, or less than or equal to 1 cubic centimeter per square meter per 24 hours. In some aspects, although the second material can stretch or deform slightly during the foaming process, gas transmission rates, gas barrier properties, and durability of this layer remain substantially the same after foaming.

In another aspect, the barrier material has a nitrogen gas transmission rate at least 50 percent lower than a nitrogen gas transmission rate of the foamable material, optionally less than or equal to 10 cubic centimeters per square meter per 24 hours, or less than or equal to 1 cubic centimeter per square meter per 24 hours.

In some aspects, the barrier polymeric component of the barrier material consists of one or more barrier polymers, each individually having a nitrogen gas transmission rate less than or equal to 30 cubic centimeters per square meter per 24 hours, or less than or equal to 10 cubic centimeters per square meter per 24 hours, or less than or equal to 1 cubic centimeter per square meter per 24 hours.

In one aspect, at the first temperature and the first pressure, the carbon dioxide is soluble in the foamable material at a first concentration, the carbon dioxide is soluble in the barrier material at a second concentration, and the first concentration is at least 20 percent greater than the second concentration, optionally at least 50 percent greater than the second concentration, or at least 70 percent greater than the second concentration. In one aspect, the second concentration is less than 1 weight percent, optionally less than 0.5 weight percent, less than 0.25 weight percent, or less than 0.1 weight percent, or optionally the carbon dioxide is substantially insoluble in the barrier material.

In one aspect, the barrier material comprises one or more ethylene-vinyl alcohol copolymers, optionally wherein the one or more ethylene-vinyl alcohol copolymers are thermoplastic, optionally wherein the one or more ethylene-vinyl alcohol thermoplastic copolymers include one or more thermoplastic elastomeric copolymers. In one aspect, the barrier polymeric component consists of one or more ethylene-vinyl alcohol copolymers, optionally wherein the one or more ethylene-vinyl alcohol copolymers are thermoplastic, optionally wherein the one or more ethylene-vinyl alcohol copolymers include one or more thermoplastic elastomeric copolymers. In some aspects, the barrier polymeric component optionally consists of one or more thermoplastic polyolefin homopolymers or copolymers, optionally one or more thermoplastic polyolefin copolymers, or one or more thermoplastic polyethylene copolymers.

In one aspect, the additional material has a higher degree of crystallinity than the foamable material. In another aspect, the one or more barrier polymers of the additional material comprise or consist essentially of one or more vinylidene chloride polymers, one or more acrylonitrile polymers or copolymers, one or more polyamides, one or more epoxy resins, one or more amine polymers or copolymers, or one or more thermoplastic polyolefin homopolymers or copolymers, optionally wherein the one or more thermoplastic polyolefin copolymers comprise one or more thermoplastic polyethylene copolymers or one or more thermoplastic ethylene-vinyl alcohol copolymers, optionally wherein the one or more thermoplastic ethylene-vinyl alcohol copolymers comprise one or more thermoplastic elastomeric ethylene-vinyl alcohol copolymers.

In some aspects, the additional material further comprises a plasticizer.

Third Material

In some aspects, the article further comprises a third material. In a further aspect, the third material can optionally be a recycled material. In one aspect, the recycled material comprises a reground thermoplastic elastomeric material. In some aspects, the recycled material further comprises a reground second thermoplastic material. In one aspect, the reground thermoplastic elastomeric material comprises one or more thermoplastic polyurethanes and the reground second thermoplastic material comprises one or more ethylene-vinyl alcohol copolymers.

In some aspects, the recycled material comprises a phase-separated blend of the one or more reground thermoplastic elastomeric materials and the one or more reground second thermoplastics. Further in this aspect, the phase-separated blend comprises one or more phase-separated regions including interfaces between the one or more first thermoplastic elastomers and the one or more second thermoplastics. In one aspect, the recycled material comprises about 95 percent by weight of the reground thermoplastic elastomeric material and about 5 percent by weight of the second thermoplastics.

In some aspects, the carbon dioxide has different solubilities in the reground thermoplastic elastomeric material and the reground second thermoplastic material. In one aspect, the carbon dioxide is soluble in the reground thermoplastic elastomeric material at a concentration of from about 1 weight percent to about 30 weight percent, optionally from about 5 weight percent to about 20 weight percent, from about 5 weight percent to about 10 weight percent, or from about 10 weight percent to about 20 weight percent. In another aspect, the carbon dioxide is soluble in the reground second thermoplastic material at less than 1 weight percent, optionally less than 0.5 weight percent, less than 0.25 weight percent, or less than 0.1 weight percent. In some aspects, the carbon dioxide is substantially insoluble in the reground second thermoplastic material.

In one aspect, the recycled material comprises a reground foamed article produced by the method disclosed herein. In an alternative aspect, the recycled material comprises an article comprising a foamable material, wherein the foamable material has not previously been foamed. In some aspects, the recycled material further comprises a virgin or pristine thermoplastic polyurethane elastomer.

In any of these aspects, the one or more interfaces serve as nucleation sites for foaming in the thermoplastic elastomeric material.

Barrier Material

In some aspects, the additional material comprises a barrier material comprising one or more barrier polymers, the barrier material comprising a barrier polymeric component consisting of all polymers present in the barrier material. In some aspects, the additional material comprises a plasticizer. In one aspect, in the foamed article, the additional material is substantially unfoamed.

In one aspect, in the foamed article, the barrier material has a hardness of at least 10 Shore A units greater than the thermoplastic elastomeric material in solid form, or optionally at least 20 Shore A units greater, at least 30 Shore A units greater, or at least 40 Shore A units greater than the thermoplastic elastomeric material in solid form as measured using the Shore A Hardness Test Protocol.

In one aspect, the barrier material has a nitrogen gas transmission rate at least 50 percent lower than a nitrogen gas transmission rate of the thermoplastic elastomeric material in solid form, optionally less than or equal to 10 cubic centimeters per square meter per 24 hours, or less than or equal to 1 cubic centimeter per square meter per 24 hours. In another aspect, the barrier polymeric component of the barrier material consists of one or more barrier polymers each individually having a nitrogen gas transmission rate of less than or equal to 30 cubic centimeters per square meter per 24 hours, or less than or equal to 10 cubic centimeters per square meter per 24 hours, or less than or equal to 1 cubic centimeter per square meter per 24 hours.

In any of these aspects, the one or more barrier polymers comprise or consist essentially of one or more vinylidene chloride polymers, one or more acrylonitrile polymers or copolymers, one or more polyamides, one or more epoxy resins, one or more amine polymers or copolymers, or one or more thermoplastic polyolefin homopolymers or copolymers, optionally wherein the one or more thermoplastic polyolefin copolymers comprise one or more thermoplastic polyethylene copolymers or one or more thermoplastic ethylene-vinyl alcohol copolymers, optionally wherein the one or more thermoplastic ethylene-vinyl alcohol copolymers comprise one or more thermoplastic elastomeric ethylene-vinyl alcohol copolymers.

In another aspect, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the thermoplastic elastomeric material at a first concentration and the carbon dioxide is soluble in the barrier material at a second concentration. In one aspect, the first concentration is at least 20 percent greater than the second concentration, optionally at least 50 percent greater than the second concentration or at least 70 percent greater than the second concentration. In another aspect, the second concentration is less than 1 weight percent, optionally less than 0.5 weight percent, less than 0.25 weight percent, or less than 0.1 weight percent, based on a total weight of the one or more second thermoplastic present in the foamable material, or optionally at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is substantially insoluble in the barrier material.

In an aspect, the barrier material comprises one or more ethylene-vinyl alcohol copolymers, optionally wherein the one or more ethylene-vinyl alcohol copolymers are thermoplastic, optionally wherein the one or more ethylene-vinyl alcohol copolymers include one or more thermoplastic elastomeric copolymers, optionally wherein the barrier polymeric component consists of one or more ethylene-vinyl alcohol copolymers, optionally wherein the one or more ethylene-vinyl alcohol copolymers are thermoplastic, optionally wherein the one or more ethylene-vinyl alcohol thermoplastic copolymers include one or more thermoplastic elastomeric copolymers.

Second Foamed Material

In one aspect, the foamed articles disclosed herein comprise the foamed material, wherein the foamed material is a first foamed material, and the foamed articles further comprise a second foamed material, wherein the second foamed material comprises or consists essentially of the additional material. In the foamed article, in one aspect, the density of the first foamed material can differ from the density of the second foamed material by at least 5 percent, at least 10 percent, or at least 20 percent. In an aspect, the second foamed material can be a second physically-expanded foam.

In one aspect, the second physically-expanded foam is a product of placing the unfoamed article comprising the solid additional material in carbon dioxide, infusing the solid additional material with the carbon dioxide, and expanding the infused solid additional material by phase transitioning the infused carbon dioxide into a gas under conditions that do not soften the solid additional material, thereby forming the foamed additional material of the foamed article.

Recycled Material

In another aspect, the foamable materials and foamable articles disclosed herein can comprise or consist essentially of a recycled material. In a further aspect, the additional material as disclosed herein can be a recycled material. In any of these aspects, the recycled material comprises one or more recycled polymers, optionally wherein the one or more recycled polymers comprise one or more recycled thermoplastics, optionally wherein the one or more recycled thermoplastics comprise one or more recycled thermoplastic elastomers, optionally wherein the recycled material comprises a recycled material polymeric component consisting of one or more recycled thermoplastics, optionally wherein the recycled material polymeric component consists of one or more recycled thermoplastic elastomers. In another aspect, the recycled material comprises one or more recycled first thermoplastic elastomers, optionally wherein the one or more recycled first thermoplastic elastomers are one or more reground first thermoplastic elastomers. In another aspect, the one or more recycled or reground first thermoplastic elastomers include a thermoplastic elastomer as disclosed herein.

In a further aspect, the recycled material can further comprise one or more recycled second thermoplastics, optionally wherein the one or more recycle second thermoplastic comprise one or more reground second thermoplastics, optionally wherein the one or more recycled or reground second thermoplastics include a thermoplastic as disclosed herein.

In another aspect, in the foamed articles disclosed herein, the recycled material comprises one or more recycled or reground thermoplastic polyurethane elastomers, one or more recycled or reground thermoplastic ethylene-vinyl alcohol copolymers, or both.

In still another aspect, the recycled material can comprise a blend of the one or more recycled or reground thermoplastic elastomers and one or more second thermoplastics, or can comprise a blend of one or more thermoplastic elastomers and one or more recycled thermoplastics or one or more recycled second thermoplastics. Optionally, in this aspect, the blend can be a phase-separated blend, optionally wherein a phase-separated blend comprises one or more interfaces between the one or more first thermoplastic elastomers and the one or more second thermoplastics.

In any of these aspects, the recycled material can comprise from about 99 percent to about 90 percent by weight of the one or more first thermoplastic elastomers and about 1 percent to about 10 percent by weight of the second thermoplastics based on a total weight of the recycled material, optionally wherein the recycled material comprises about 99 percent to about 93 percent by weight of the one or more first thermoplastic elastomers and about 1 percent to about 7 percent by weight of the one or more second thermoplastics, or from about 99 percent to about 95 percent by weight of the one or more first thermoplastic elastomers and from about 1 percent to about 5 percent by weight of the one or more second thermoplastic elastomers.

In some aspects, the recycled material can comprise from about 99 percent to about 50 percent by weight of recycled or reground polymers based on a total weight of recycled material, optionally from about 99 percent to about 75 percent by weight of recycled or reground polymers.

In any of these aspects, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the recycled material at a concentration of from about 1 weight percent to about 30 weight percent based on a total weight of the recycled material, optionally from about 5 weight percent to about 20 weight percent.

In another aspect, at a first pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals) and a first temperature of from about −57 degrees Celsius to about 31 degrees Celsius, optionally from about −40 degrees Celsius to about 25 degrees Celsius, or from about −40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In another aspect, at a first pressure of from about 0.05 pounds per square inch (0.345 kilopascals) to about 6000 pounds per square inch (41,300 kilopascals) and a first temperature of from about −57 degrees Celsius to about 31 degrees Celsius, the carbon dioxide is soluble in the one or more recycled or reground second thermoplastics at less than 1 weight percent, optionally less than 0.5 weight percent, less than 0.25 weight percent, or less than 0.1 weight percent, based on a total weight of the one or more second thermoplastic present in the foamable material based on a total weight of the one or more recycled or reground second thermoplastics, or optionally wherein the carbon dioxide is substantially insoluble in the one or more recycled or reground second thermoplastics.

In another aspect, at a first pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals) and a first temperature of from about −57 degrees Celsius to about 31 degrees Celsius, optionally from about −40 degrees Celsius to about 25 degrees Celsius, or from about −40 degrees Celsius to about 0 degrees Celsius, the carbon dioxide is soluble in the foamed material or in the solid foamable material, or in both, at a concentration of from about 1 weight percent to about 30 weight percent, optionally from about 5 weight percent to about 20 weight percent, from about 5 weight percent to about 10 weight percent, or from about 10 weight percent to about 20 weight percent.

In any of these aspects, the recycled material can be a recycled foamed article, optionally wherein the recycled foamed article is a reground foamed article as disclosed herein. In some aspects, the recycled material can comprise a solid material, wherein the solid material can be a thermoplastic elastomeric material. In another aspect, the recycled material can further comprise one or more virgin first thermoplastic elastomers, optionally wherein the one or more first virgin thermoplastic elastomers includes one or more virgin thermoplastic polyurethane elastomers.

In an aspect, the recycled material can include one or more nucleating agents and/or one or more interfaces between phase-separated polymers. In another aspect, in the foamed articles disclosed herein, the thermoplastic elastomeric material can be a recycled material, or comprises a recycled material, or consists essentially of a recycled material.

Exemplary Aspects of Articles of Footwear, Articles of Apparel, and Articles of Sporting Equipment FIGS. 1A-1M illustrate footwear, apparel, athletic equipment, containers, electronic equipment, and vision wear that include the structure (e.g., the foamed article) of the present disclosure.

FIGS. 1N(a)-1N(b) illustrate a perspective view and a side view of an article of footwear 100 that include a sole structure 104 and an upper 102. The sole structure 104 is secured to the upper 102 and extends between the foot and the ground when the article of footwear 100 is worn. The primary elements of the sole structure 104 are a midsole 114 and an outsole 112. The midsole 114 is secured to a lower area of the upper 102 and can be formed of a polymer foam or another appropriate material. In other configurations, the midsole 114 can incorporate fluid-filled chambers, plates, moderators, and/or other elements that further attenuate forces, enhance stability, or influence motions of the foot. The outsole 112 is secured to a lower surface of the midsole 114 and can be formed from a wear-resistant rubber material that is textured to impart traction, for example. The upper 102 can be formed from various elements (e.g., lace, tongue, collar) that combine to provide a structure for securely and comfortably receiving a foot. Although the configuration of the upper 102 can vary significantly, the various elements generally define a void within the upper 102 for receiving and securing the foot relative to sole structure 104. Surfaces of the void within upper 102 are shaped to accommodate the foot and can extend over the instep and toe areas of the foot, along the medial and lateral sides of the foot, under the foot, and around the heel area of the foot. The upper 102 can be made of one or more materials such as textiles, a polymer foam, leather, synthetic leather, and the like that are stitched or bonded together. Although this configuration for the sole structure 104 and the upper 102 provides an example of a sole structure that can be used in connection with an upper, a variety of other conventional or nonconventional configurations for the sole structure 104 and/or the upper 102 can also be utilized. Accordingly, the configuration and features of the sole structure 104 and/or the upper 102 can vary considerably.

Figure 1O:
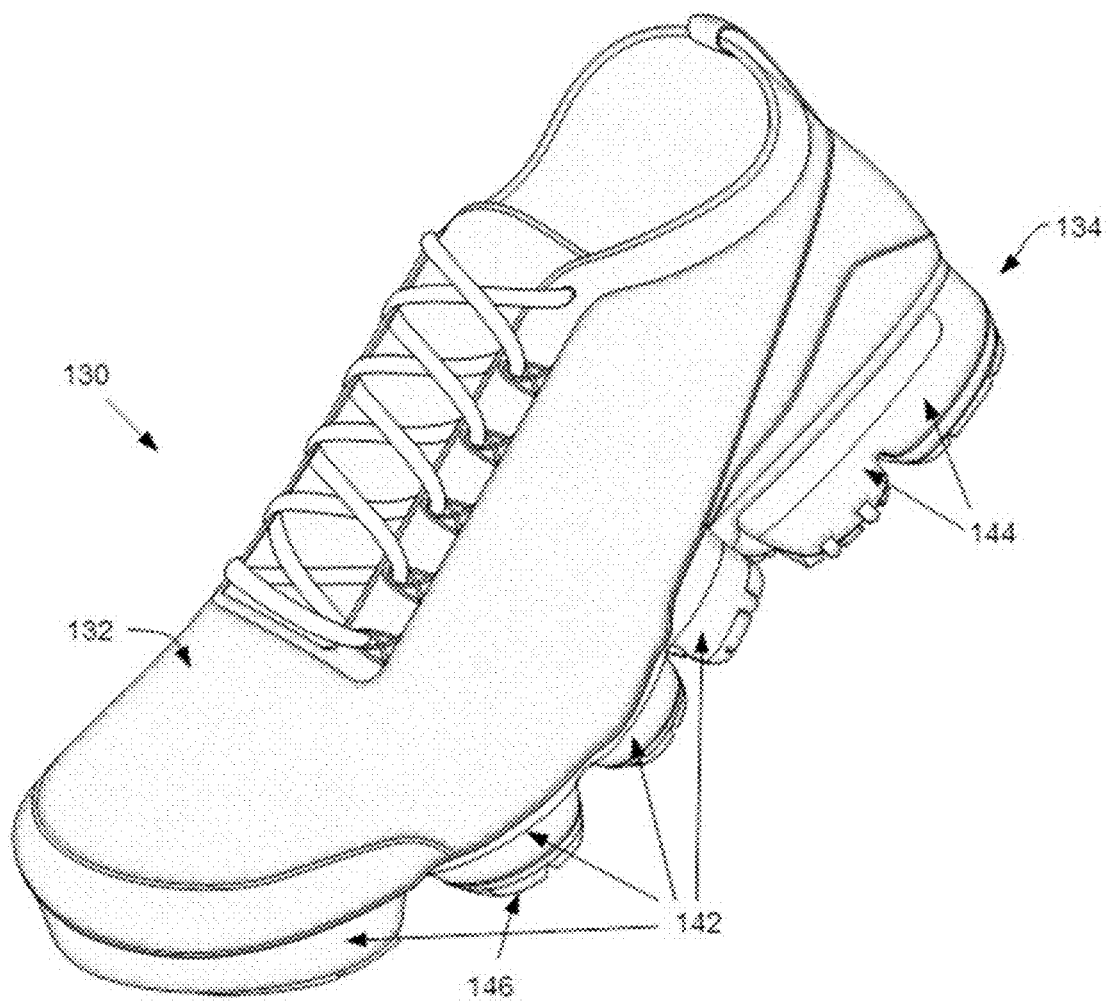
Figure 1O:
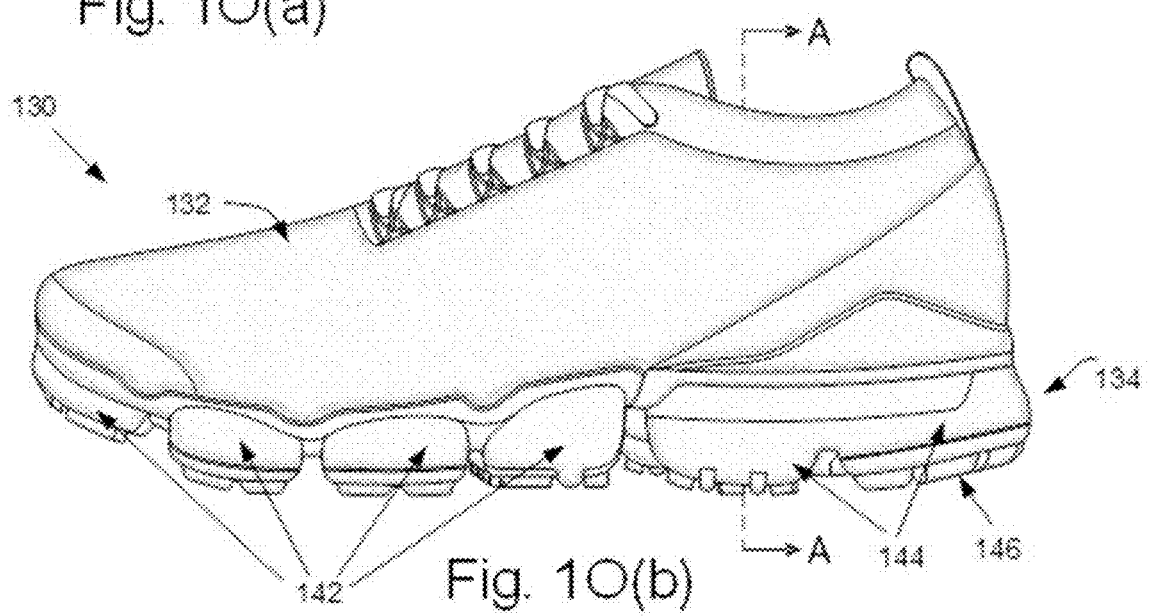
Figure 10C:
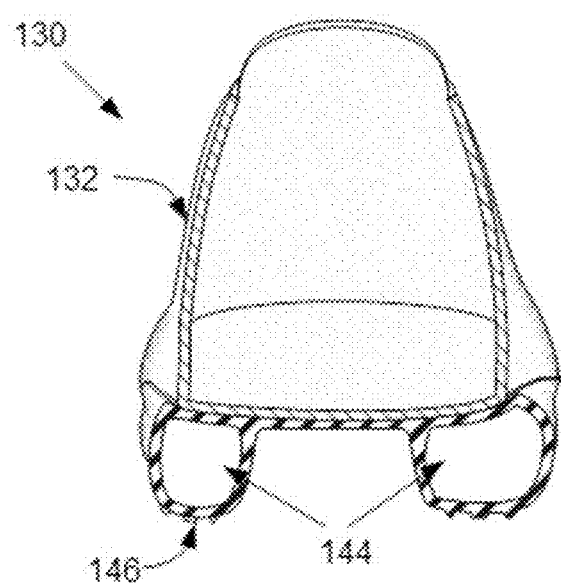
FIGS. 10B-10C illustrate various scenarios for selectively foaming regions of the foamable article according to other exemplary embodiments.

FIGS. 1O(a)-1O(b) illustrate a perspective view and a side view of an article of footwear 130 that include a sole structure 134 and an upper 132. The sole structure 134 is secured to the upper 132 and extends between the foot and the ground when the article of footwear 130 is worn. The upper 132 can be formed from various elements (e.g., lace, tongue, collar) that combine to provide a structure for securely and comfortably receiving a foot. Although the configuration of the upper 132 can vary significantly, the various elements generally define a void within the upper 132 for receiving and securing the foot relative to the sole structure 134. Surfaces of the void within the upper 132 are shaped to accommodate the foot and can extend over the instep and toe areas of the foot, along the medial and lateral sides of the foot, under the foot, and around the heel area of the foot. The upper 132 can be made of one or more materials such as textiles including natural and synthetic leathers, molded polymeric components, polymer foam and the like that are stitched or bonded together.

The primary elements of the sole structure 134 are a forefoot component 142, a heel component 144, and an outsole 146. Each of the forefoot component 142 and the heel component 144 are directly or indirectly secured to a lower area of the upper 132 and formed from a polymer material that encloses a fluid, which can be a gas, liquid, or gel. During walking and running, for example, the forefoot component 142 and the heel component 144 compress between the foot and the ground, thereby attenuating ground reaction forces. That is, the forefoot component 142 and the heel component 144 are inflated and can be pressurized with the fluid to cushion the foot. The outsole 146 is secured to lower areas of the forefoot component 142 and the heel component 144 and can be formed from a wear-resistant rubber material that is textured to impart traction. The forefoot component 142 can be made of one or more polymers (e.g., layers of one or more polymeric films) that form a plurality of chambers that includes a fluid such as a gas. The plurality of chambers can be independent or fluidically interconnected. Similarly, the heel component 144 can be made of one or more polymers (e.g., layers of one or more polymeric films) that form a plurality of chambers that includes a fluid such as a gas and can also be independent or fluidically interconnected. In some configurations, the sole structure 134 can include a foam layer, for example, that extends between the upper 132 and one or both of the forefoot component 142 and the heel component 144, or a foam element can be located within indentations in the lower areas of the forefoot component 142 and the heel component 144. In other configurations, the sole structure 132 can incorporate plates, moderators, lasting elements, or motion control members that further attenuate forces, enhance stability, or influence the motions of the foot, for example. Although the depicted configuration for the sole structure 134 and the upper 132 provides an example of a sole structure that can be used in connection with an upper, a variety of other conventional or nonconventional configurations for the sole structure 134 and/or the upper 132 can also be utilized. Accordingly, the configuration and features of the sole structure 134 and/or the upper 132 can vary considerably.

FIG. 1O(c) is a cross-sectional view of A-A that depicts the upper 132 and the heel component 144.

Figure 1P:
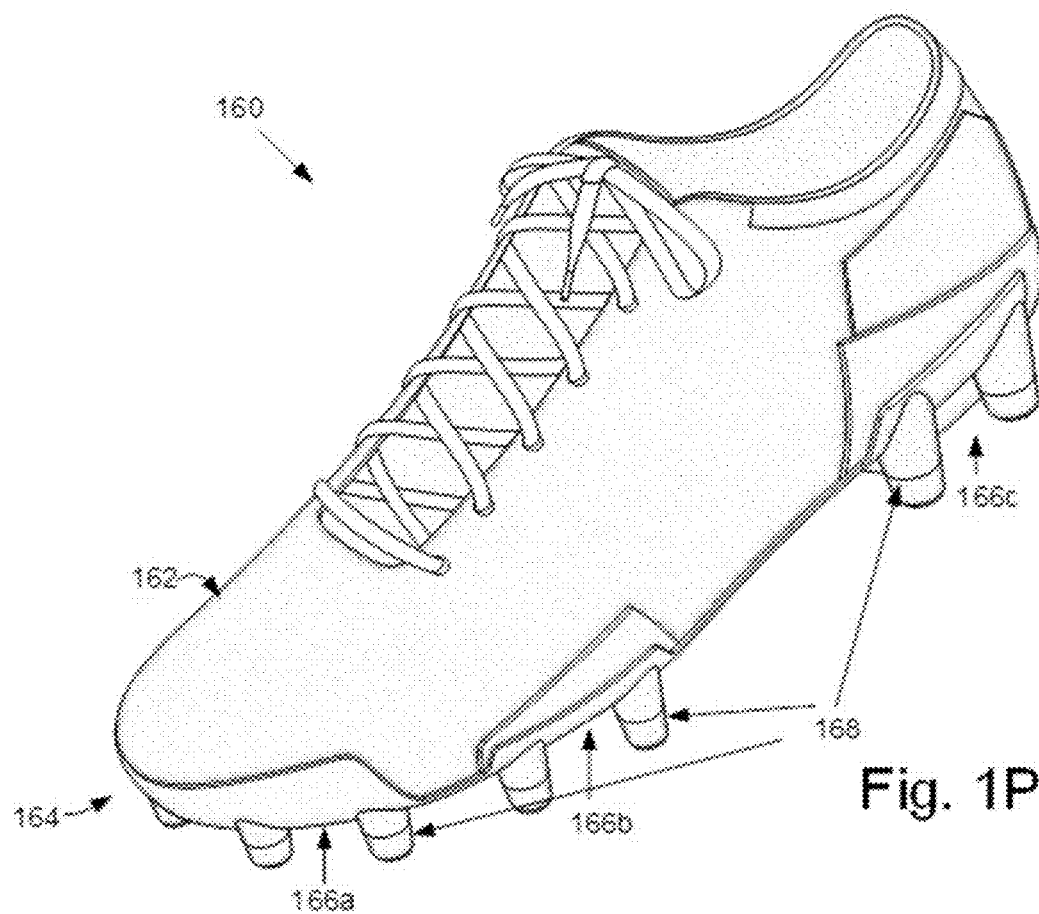
Figure 1P:
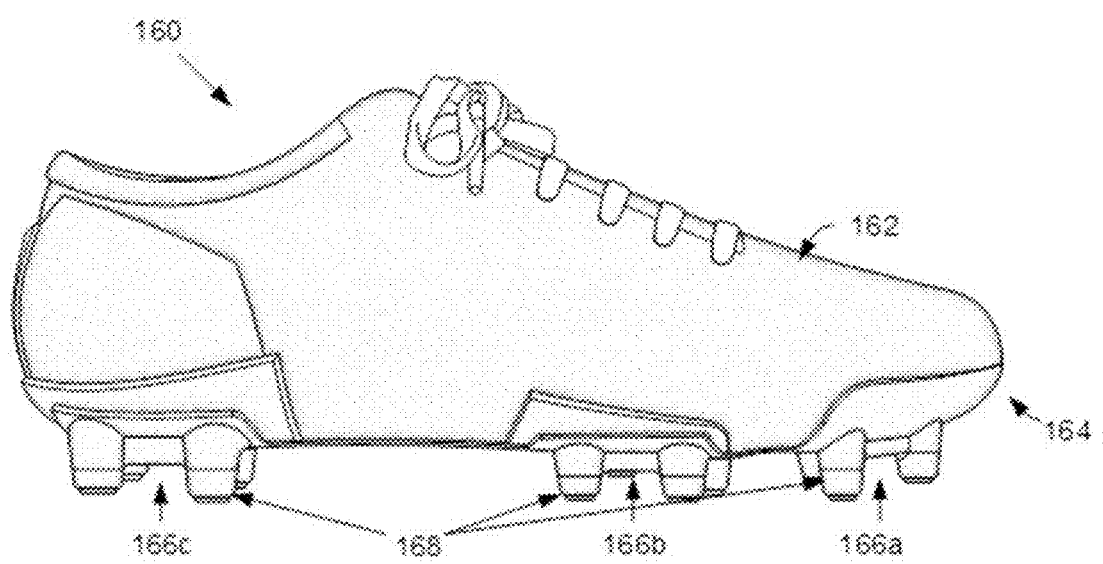

FIGS. 1P(a)-1P(b) illustrate a perspective view and a side view of an article of footwear 160 that includes traction elements 168. The article of footwear 160 includes an upper 162 and a sole structure 164, where the upper 162 is secured to the sole structure 164. The sole structure 164 can include one or more of a toe plate 166a, a mid-plate 166b, and a heel plate 166c. The plate can include one or more traction elements 168, or the traction elements can be applied directly to a ground-facing surface of the article of footwear. As shown in FIGS. 1P(a)-1P(b), the traction elements 168 are cleats, but the traction elements can include lugs, cleats, studs, and spikes as well as tread patterns to provide traction on soft and slippery surfaces. In general, the cleats, studs and spikes are commonly included in footwear designed for use in sports such as global football/soccer, golf, American football, rugby, baseball, and the like, while lugs and/or exaggerated tread patterns are commonly included in footwear (not shown) including boots design for use under rugged outdoor conditions, such as trail running, hiking, and military use. The sole structure 164 is secured to the upper 162 and extends between the foot and the ground when the article of footwear 160 is worn. The upper 162 can be formed from various elements (e.g., lace, tongue, collar) that combine to provide a structure for securely and comfortably receiving a foot. Although the configuration of the upper 162 can vary significantly, the various elements generally define a void within the upper 162 for receiving and securing the foot relative to the sole structure 164. Surfaces of the void within upper 162 are shaped to accommodate the foot and extend over the instep and toe areas of the foot, along the medial and lateral sides of the foot, under the foot, and around the heel area of the foot. The upper 162 can be made of one or more materials such as textiles including natural and synthetic leathers, molded polymeric components, a polymer foam, and the like that are stitched or bonded together. In other aspects not depicted, the sole structure 164 can incorporate foam, one or more fluid-filled chambers, plates, moderators, or other elements that further attenuate forces, enhance stability, or influence the motions of the foot. Although the depicted configuration for the sole structure 164 and the upper 162 provides an example of a sole structure that can be used in connection with an upper, a variety of other conventional or nonconventional configurations for the sole structure 164 and/or the upper 162 can also be utilized. Accordingly, the configuration and features of the sole structure 164 and/or the upper 162 can vary considerably.

Figure 1Q:
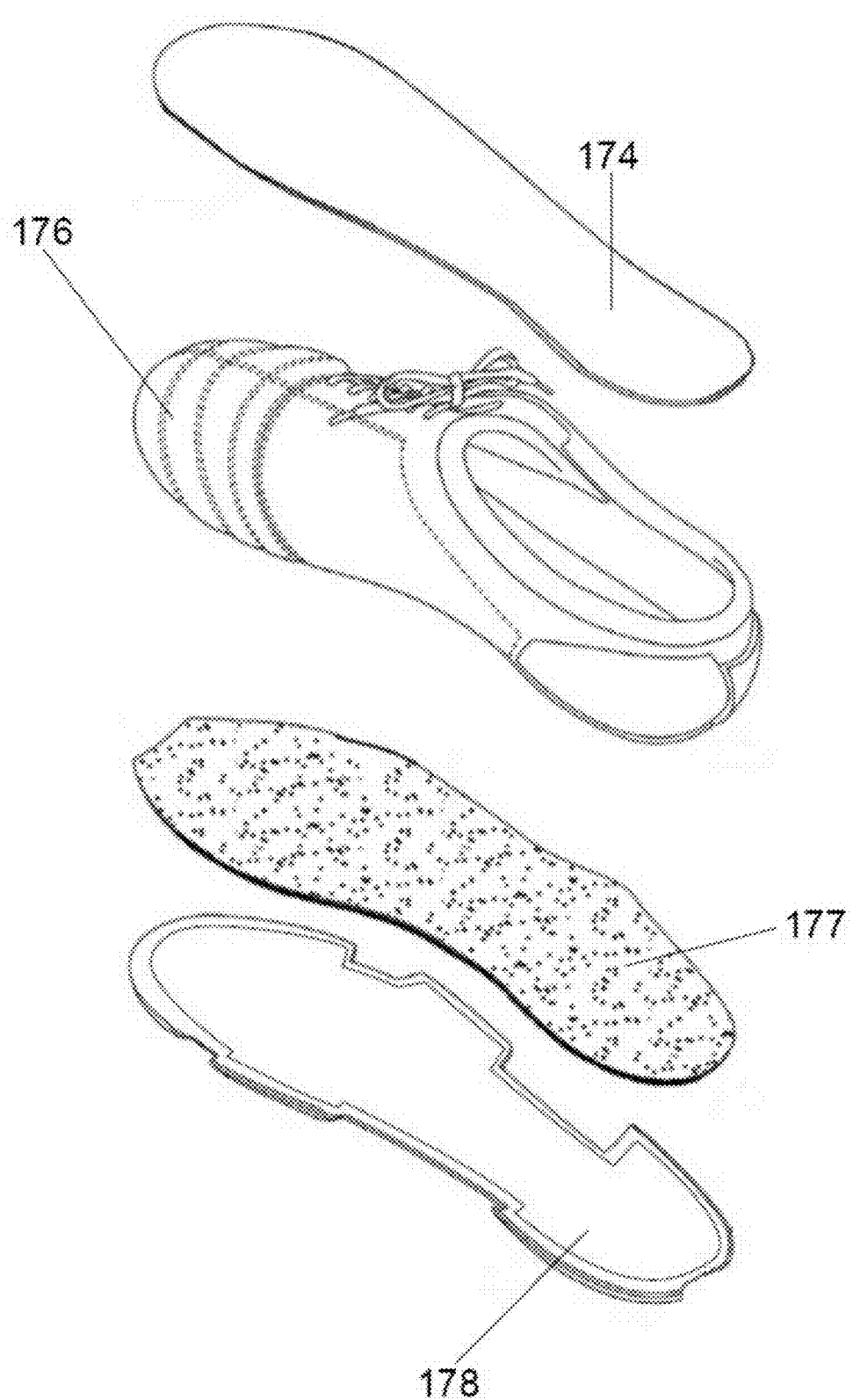
Figure 1Q:
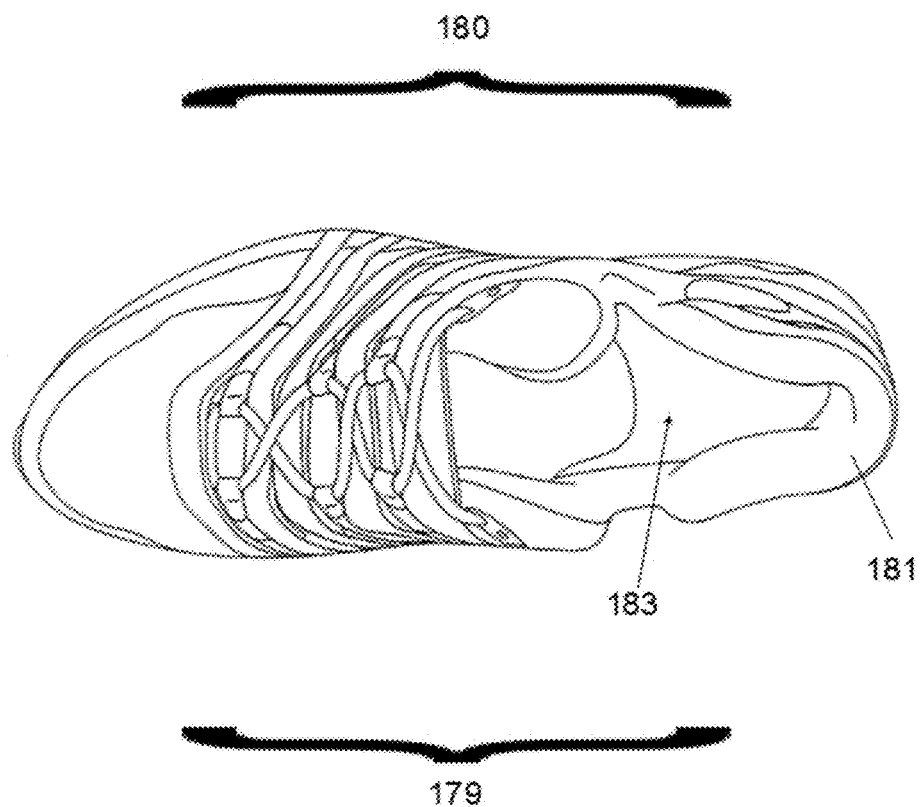
Figure 1Q:
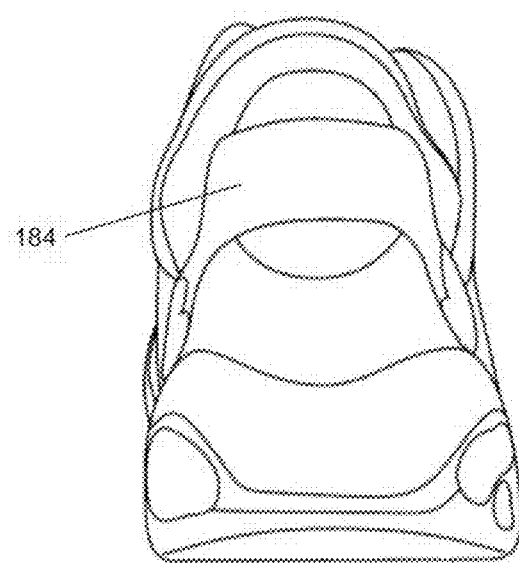
Figure 1Q:
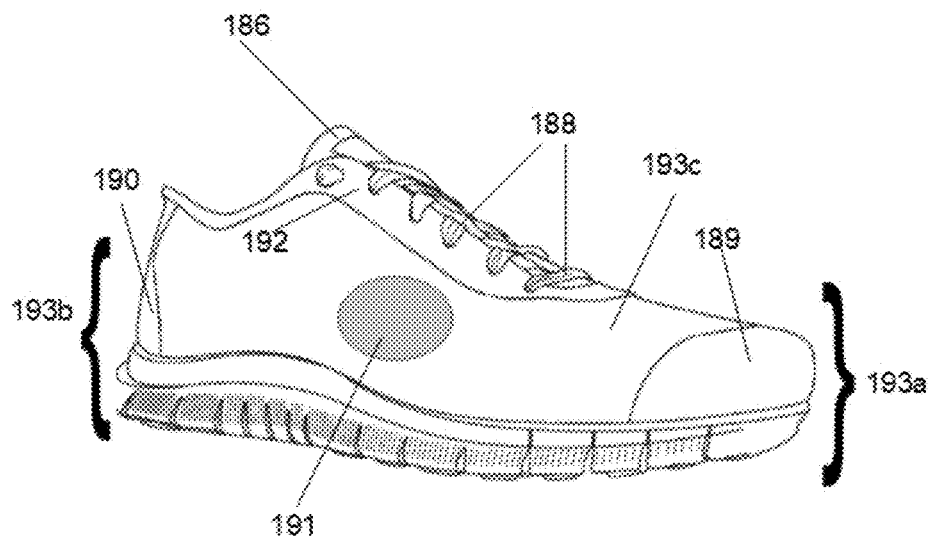
Figure 1Q:
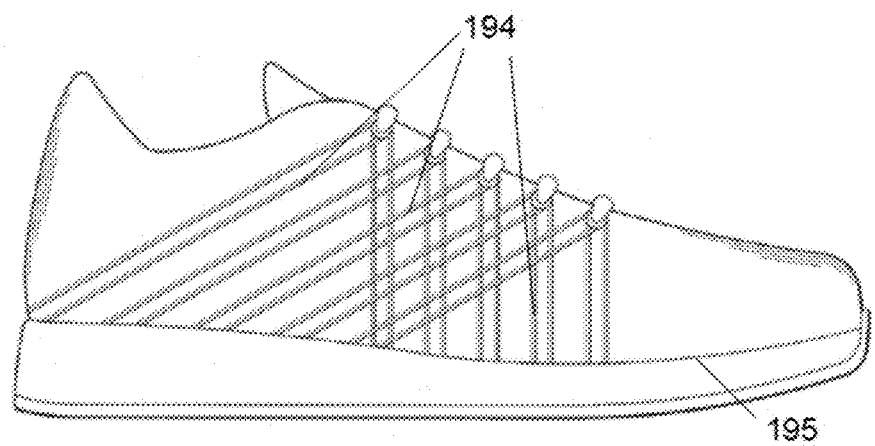

FIGS. 1Q(a)-1Q(e) illustrate additional views of exemplary articles of athletic footwear including various configurations of upper 176. FIG. 1Q(a) is an exploded perspective view of an exemplary article of athletic footwear showing insole 174, upper 176, midsole or optional lasting board 177, and outsole 178. FIG. 1Q(b) is a top view of an exemplary article of athletic footwear indicating an opening 183 configured to receive a wearer's foot as well as cushioning material 181 around a wearer's ankle. Also illustrated are the lateral side 180 and medial side 179 of the exemplary article of athletic footwear. FIG. 1Q(c) is a back view of the article of footwear depicted in FIG. 1Q(b), showing heel clip 184. FIG. 1Q(d) shows a side view of an exemplary article of athletic footwear, which can optionally also include a tongue 186, laces 188, a toe cap 189, a heel counter 190, a decorative element such as a logo 191, and/or eyestays for the laces 192. Toe area 193a, heel area 193b, and upper 193c are also shown. In some aspects, the heel counter 190 can be covered by a layer of knitted, woven, or nonwoven fabric, leather, synthetic leather, or other shoe upper material. In some aspects, the eyestays 192 are formed as one continuous piece; however, they can also comprise several separate pieces surrounding a single eyelet or a plurality of eyelets. While not depicted, foamed articles can be present on the eyestays 192 and/or the laces 188. In some configurations, the sole structure can include a midsole with a foam or airbag bladder in part or substantially all of the midsole and the foamed article can be disposed on midsole foam or the airbag bladder. FIG. 1Q(e) is a side view of another exemplary article of athletic footwear. In certain aspects, the upper can comprise containment elements 194 such as mag wires or a molded plastic piece extending from the lace structure over portions of the medial and lateral sides of the exemplary article of athletic footwear to the top of the sole structure to provide lockdown of the foot to the sole structure, where the containment elements can have a foamed article (not shown) disposed thereon. Also depicted is a biteline 195 between the upper and the sole structure.

Exemplary Aspects of Disclosed Methods for Making Foamed Articles

Figure 2:
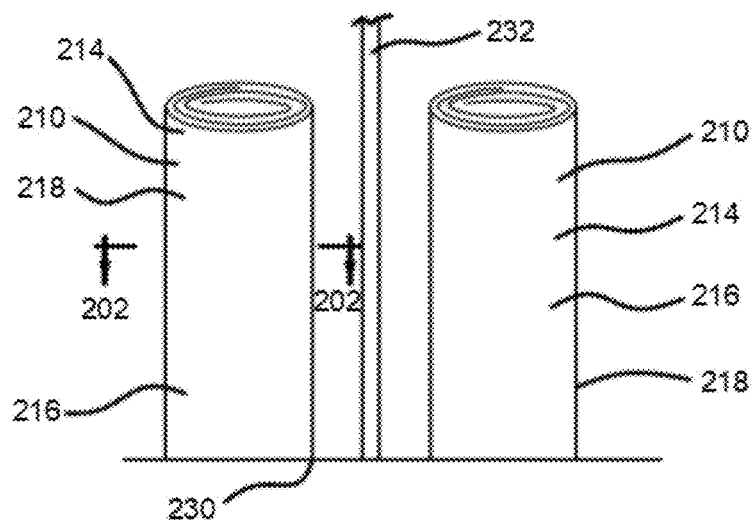
FIG. 2 illustrates, in a side view, a thermoplastic elastomeric material for forming a foamed thermoplastic elastomeric material during an early fabrication stage in accordance with an exemplary embodiment.

In one aspect, with reference to the figures, FIG. 2 illustrates a side view of an article comprising a solid foamable material as described herein. In one aspect, the solid foamable material comprises one or more thermoplastic elastomeric polyurethane copolymers.

Figure 7:
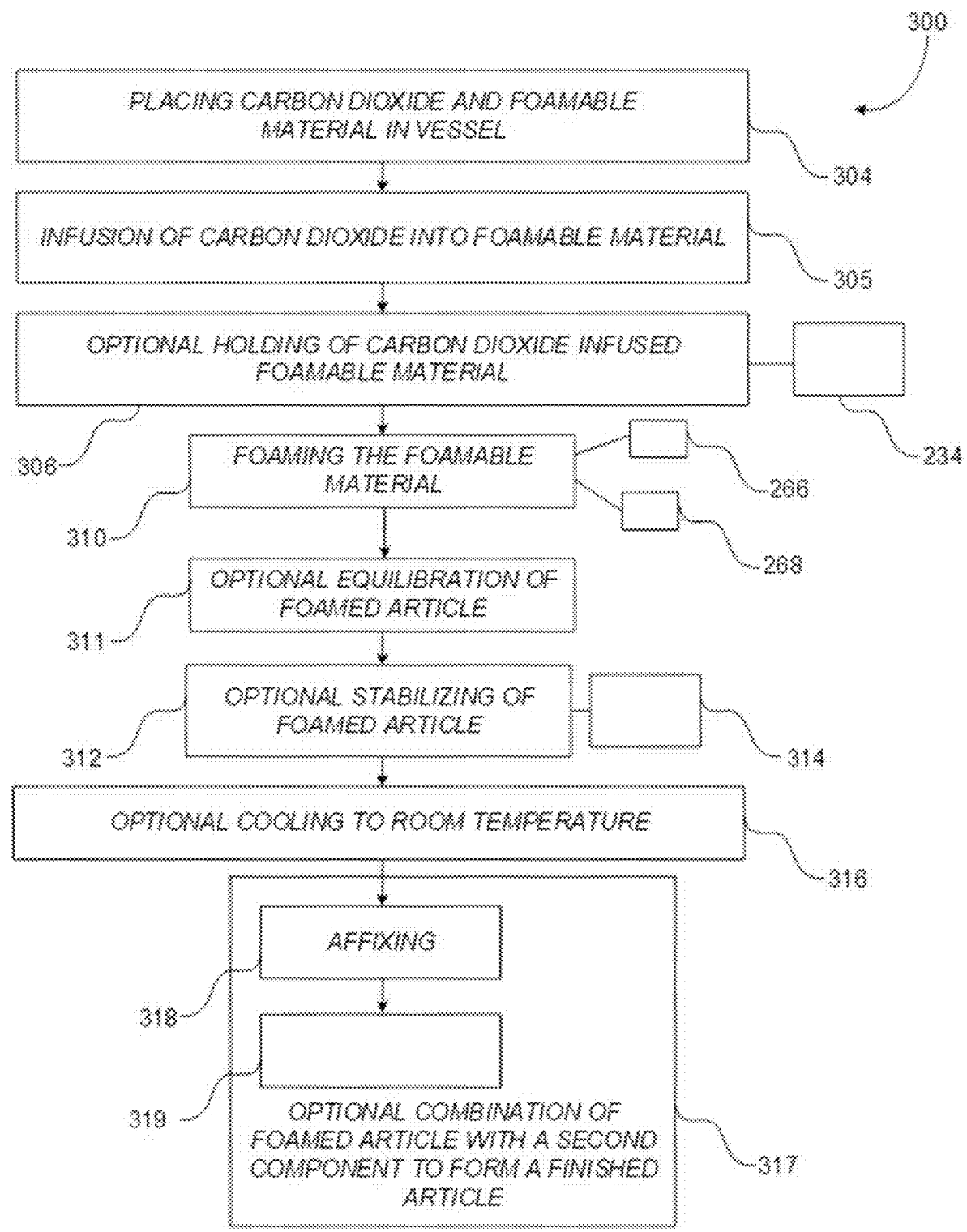
FIG. 7 illustrates a flow chart of a method for making a foamed article in accordance with an exemplary embodiment.

FIG. 7 illustrates a flow chart of a method 300 for making a foamed article as disclosed herein. Referring to FIGS. 2 and 7, optionally, in one aspect, the foamable material 210 is formed (optional step 302) into an article 214. In another aspect, optionally, the article 214 can be configured having a substantially two-dimensional (2-D) shape, or alternatively, the article 214 can be configured having a substantially three-dimensional (3-D) shape or a combination of 2-D and 3-D shapes.

Articles comprising the disclosed foamable materials can take various forms. In one non-limiting aspect, as illustrated, the article 214 can be configured as a sheet 216 that has been rolled or otherwise folded into a roll 218, or the article may not be a sheet, but can be, in some aspects, configured as a roll. In one example, the sheet 216 has a thickness of from about 0.5 millimeters to about 2 centimeters, or from about 0.5 millimeters to about 1 centimeter, or from about 0.5 millimeters to about 100 millimeters, optionally from about 0.5 millimeters to about 5 millimeters, for example about 1.5 millimeters.

Figure 3:
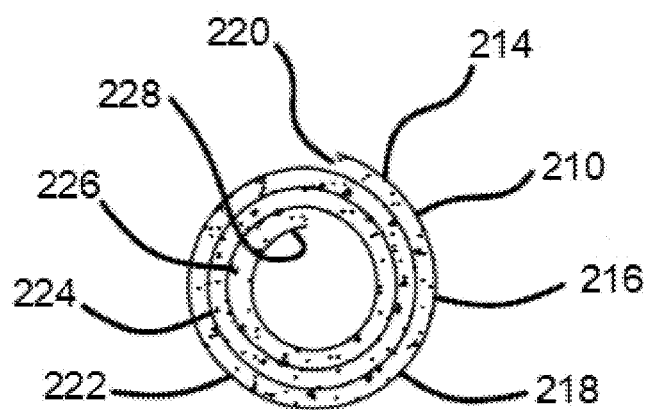
FIG. 3 illustrates, in cross-sectional view, the thermoplastic elastomeric material depicted in FIG. 2 along line 202-202.
Figure 4:
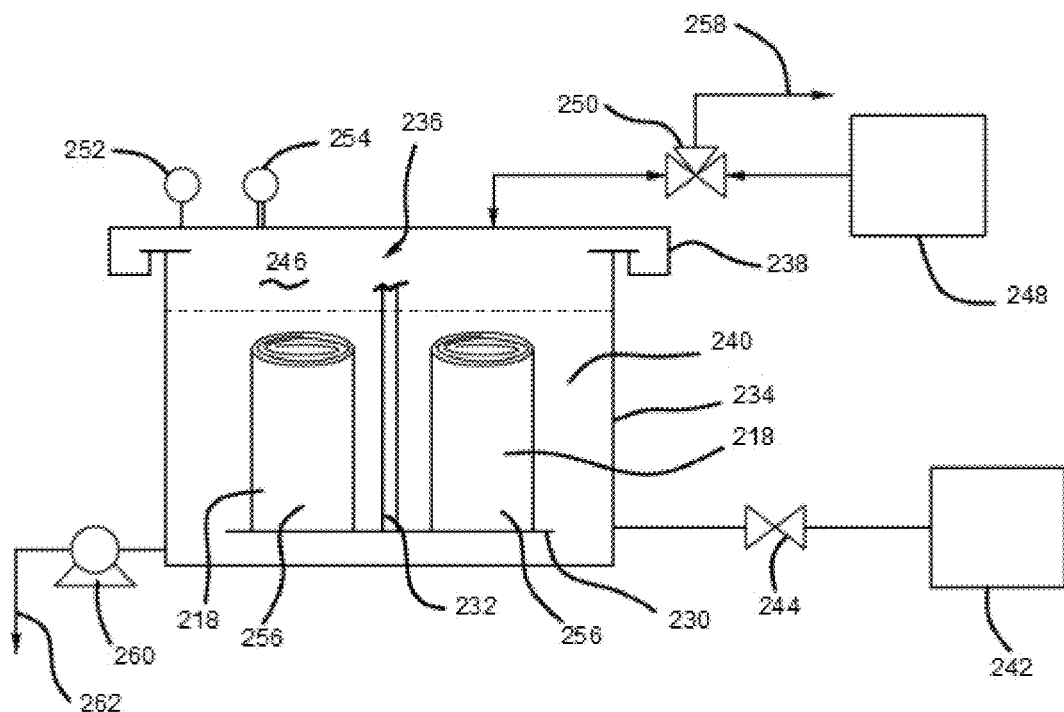
FIG. 4 illustrates, in a partial cross-sectional side view, a thermoplastic elastomeric material in a vessel for forming a foamed thermoplastic elastomeric material during an intermediate fabrication stage in accordance with an exemplary embodiment.

Referring also to FIG. 3, when the article is configured as a roll, an optional porous spacer 220 can be arranged in the roll 218 between adjacent roll sections 222, 224, 226, and 228 of the article 216 comprising the foamable material 210. In one aspect, as will be described in further detail below, the optional porous spacer 220 is sufficiently porous to allow carbon dioxide to advanced or pass through the porous spacer 220 (e.g., through the porous structure and/or along porous passageways) for contact with the foamable material 210. In one aspect, the optional porous spacer 220 is formed of a thermoplastic material, such as, for example, polyolefin (e.g., melt blown polyethylene) or the like. In an alternative aspect, the optional porous spacer 220 can be formed of a non-thermoplastic material, such as, for example, paper or a cellulose product, a fiber product (e.g., natural or synthetic fiber product), a fabric product, or the like. In one example, the optional porous spacer 220 is formed of a recyclable material. In another aspect, the article 216 and the optional porous spacer 220 can be any desired thickness, for example, so that the sheet 216 and/or article 218 can be arranged in a vessel 234 as discussed in further detail below. The optional porous spacer 220 can have a thickness of from about 0.1 millimeters to about 2 millimeters, or from about 0.1 millimeters to about 1 millimeter, or from about 0.1 millimeters to about 0.5 millimeters, for example about 0.25 millimeters. In one example, the optional porous spacer 220 has a porosity such that the diffusion rate of carbon dioxide (e.g., liquid phase) through the spacer 220 is higher or greater than the diffusion rate of carbon dioxide (e.g., liquid phase) through the foamable material 210. In other aspects, the article can be folded and the optional porous spacer placed between folded sections of the article, or a porous spacer can be incorporated between a plurality of discrete articles (e.g., multiple sheets of separate articles or bundles or stacks of separate articles, and the like).

In FIGS. 2-4 and 7, as illustrated, the rolls 218 including the solid foamable material 210 are arranged vertically on a base 230 that is operatively coupled to a rod 232 in one exemplary embodiment. The rolls 218 are positioned in the vessel 234 by maneuvering the rod 232 to lower the base 230 through an opening 236 and into the vessel 234. The opening 236 of the vessel 234 is then covered and sealed with a cover 238 (e.g., clam shell or other pressure-sealing cap). In other aspects (not shown), foamable articles in any suitable shape can be arranged on a base operatively coupled to a rod, where the rod can be maneuvered to lower the base through an opening and into the vessel. Further in this aspect, the opening of the vessel can then be covered and sealed with a cover.

Carbon dioxide 240 is provided or received (step 304) in the vessel 234 for contact with the foamable material 210. In one example, in the step of placing, the liquid carbon dioxide 240 is present in the vessel 234 prior to positioning the rolls 218, articles, or bundles of articles of the foamable material 210 in the vessel 234. In another example, in the step of placing, liquid or gas carbon dioxide 240 from a liquid or gas carbon dioxide source 242 is passed through a control valve 244 and introduced to the vessel 234 after the rolls, articles, or bundles of articles 218 of foamable material 210 are positioned in the vessel 234.

In another example, in the step of placing, rolls 218 of sheets comprising a foamable material 210, or in alternative aspects, articles, bundles of articles, or the like are positioned in the vessel 234 and the vessel 234 is sealed with the cover 238. Carbon dioxide liquid and/or gas 246 from a carbon dioxide liquid and/or gas source 248 is passed through a control valve 250 and is introduced to the vessel 234. In one aspect, the vessel 234 is charged with the carbon dioxide liquid and/or gas 246 to a pressure and temperature condition that is, for example, at a liquid/vapor equilibrium condition for carbon dioxide. The pressure and temperature of the vessel 234 can be monitored via a pressure measuring device 252 and a temperature measuring device 254, respectively. In one example, once charged with the carbon dioxide liquid and/or gas 246, the vessel 234 has a pressure of from about 0.05 pounds per square inch (0.345 kilopascals) to about 6000 pounds per square inch (41,300 kilopascals), optionally about 15 pounds per square inch (103.4 kilopascals) to about 5500 pounds per square inch (37,900 kilopascals), from about 100 pounds per square inch (689.5 kilopascals) to about 5000 pounds per square inch (34,500 kilopascals), from about 500 pounds per square inch (3450 kilopascals) to about 2000 pounds per square inch (13,790 kilopascals) or from about 1000 pounds per square inch (6895 kilopascals) to about 1500 pounds per square inch (10,300 kilopascals), and a temperature can be from about −57 degrees Celsius to about 31 degrees Celsius, optionally from about 0 degrees Celsius to about 23 degrees Celsius, or can be about ambient (e.g., from about 18 degrees Celsius to about 23 degrees Celsius) or greater as desired. After charging the vessel 234 with carbon dioxide liquid and/or gas, the liquid carbon dioxide 240 is introduced to the vessel 234 as described above.

As illustrated, the vessel 234 can be sufficiently filled with the liquid carbon dioxide 240 so that the rolls 218 and/or articles or bundles of articles including foamable material 210 are substantially or fully immersed in the liquid carbon dioxide 240. As briefly mentioned above, the liquid carbon dioxide 240 advances through the optional porous spacer 220 for contact with adjacent roll sections 222, 224, 226, and 228 of the sheets 216 of foamable material 210, or for contact with adjacent discrete articles or sections of folded articles (not pictured). While in contact with the liquid carbon dioxide 240, the foamable material 210 absorbs and/or otherwise takes up the liquid carbon dioxide 240 (e.g., by diffusion step 305) to form a carbon dioxide-infused article 256. In one example, during the steps of maintaining and holding at the first pressure and first temperature, the foamable material 210 is in contact with the carbon dioxide 240 for a time of from about 20 seconds to about 72 hours, optionally from about 30 minutes to about 30 hours, from about 1 hour to about 24 hours, from about 6 hours to about 12 hours, or from about 20 seconds to about 1 hour to form the carbon dioxide-infused article 256. Without being limited by theory, it is believed that during contact with the carbon dioxide 240, the foamable article 210 is solvated by the carbon dioxide 240 to form the carbon dioxide-infused article 256.

In one exemplary aspect, the process continues by discharging the vessel 234 of the carbon dioxide liquid and/or gas 246 through the control valve 250 and line 258. Preferably, the vessel 234 is discharged of the carbon dioxide liquid and/or gas 246 at a temperature that is sufficient to substantially prevent the liquid carbon dioxide-containing foamable material 256 from foaming. In one example, the temperature in the vessel 234 during discharge is from about −60 degrees Celsius to about −20 degrees Celsius, or from about −50 degrees Celsius to about −30 degrees Celsius, or from about −45 degrees Celsius to about −38 degrees Celsius. In another aspect, before, during, or after discharging the vessel 234 of the carbon dioxide liquid and/or gas 246, the liquid carbon dioxide 240 can be removed from the vessel 234 via a pump 260 and line 262.

Figure 5:
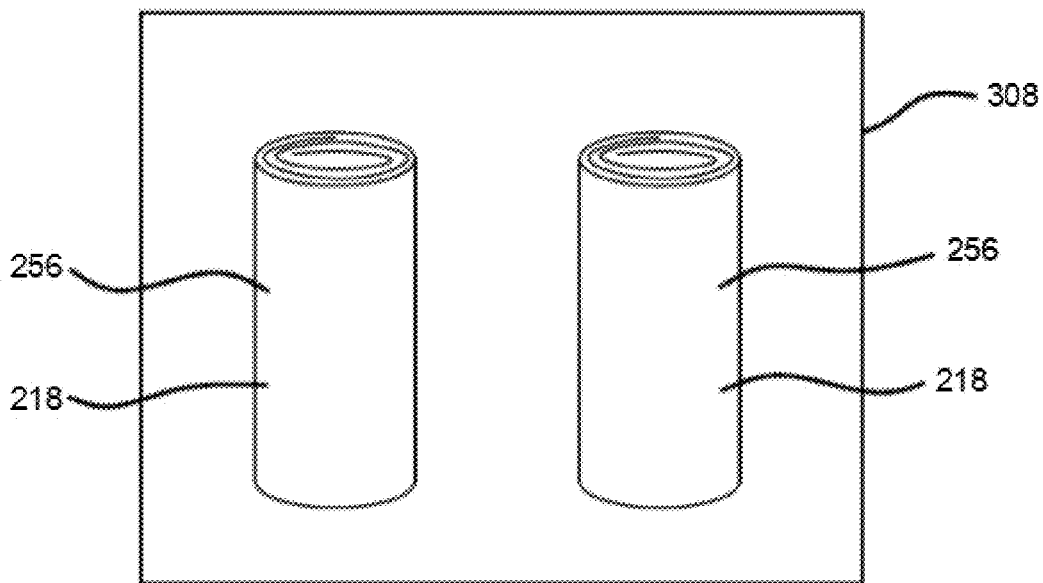
FIG. 5 illustrates, in a partial cross-sectional side view, a carbon dioxide-infused foamable article during exposing at a second temperature and second pressure in accordance with an exemplary embodiment.

The carbon dioxide-infused rolls 218 of carbon dioxide—256 or other carbon dioxide-infused articles or bundles of articles are removed from the vessel 234, for example, by removing the cover 238 and maneuvering the rod 232 to lift the base 230 through the opening 236. Optionally and as illustrated in FIG. 5, the carbon dioxide-infused rolls 218 of or other carbon dioxide-infused articles or bundles of articles 256 can be temporarily exposed to the second pressure and second temperature (step 306) in a cooling zone 308 prior to heating and foaming the material 256. As used herein, the term "zone" refers to an area including one or more equipment items and/or one or more sub-zones. Equipment items can include for example one or more vessels, chambers, heaters, exchangers, coolers/chillers, pipes, pumps, compressors, controllers, and the like. Additionally, an equipment item can further include one or more zones or sub-zones. In one example, the rolls 218 of the carbon dioxide-infused article 256 are stored in the cooling zone 308 at a temperature of from about −100 degrees Celsius to about −20 degrees Celsius, optionally from about −60 degrees Celsius to about −20 degrees Celsius, or from −40 degrees Celsius to about −20 degrees Celsius.

Figure 6:
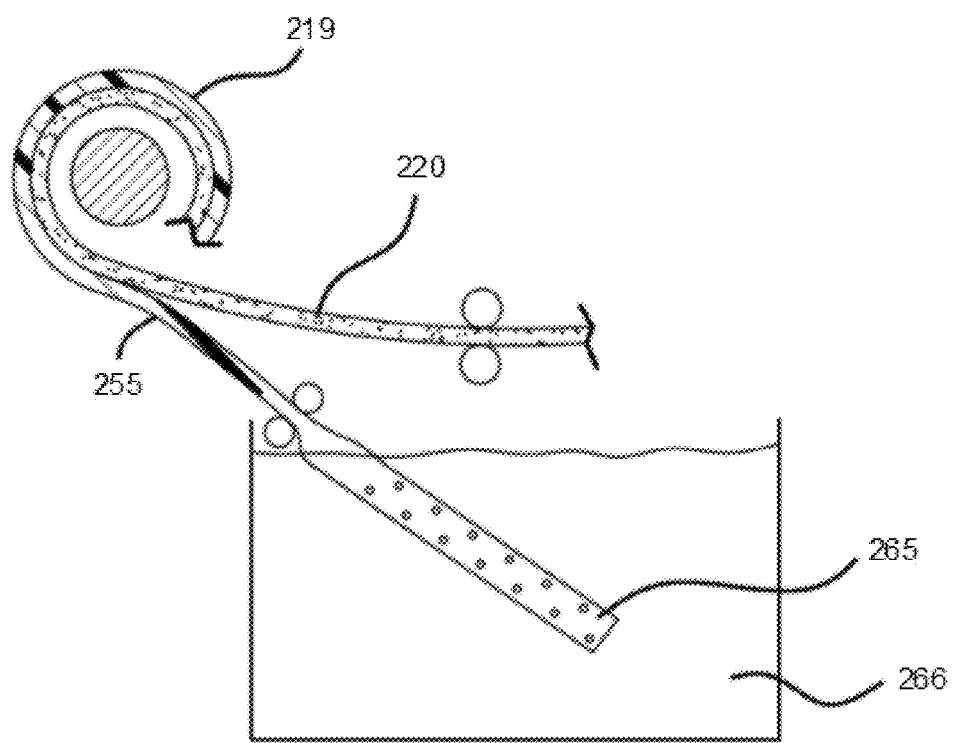
FIG. 6 illustrates, in a partial cross-sectional side view, a carbon dioxide-infused foamable article being introduced to a water bath for forming a foamed article during a subjecting step in accordance with an exemplary embodiment.

Referring to FIGS. 6 and 7, the process continues by subjecting the article comprising a foamable material 256 (step 310) to the third temperature and third pressure in order to cause expansion of the infused carbon dioxide, for example by causing a phase change of the carbon dioxide 240 infused in the foamable material. As the carbon dioxide expand, this expansion foams the foamable material 210 into a foamed material, e.g., a foamed material having a multi-cellular foam structure. In some aspects, nucleating sites within the article promote the formation of gas bubbles which expand and form foam cells. In one aspect, when the article includes a recycled material in the form phase-separated blend, the nucleating sites can be phase-separated interfaces between the one or more first thermoplastic elastomers and the one or more second thermoplastics in the blend. Other nucleating sites and/or nucleating agents are also contemplated and should be considered disclosed. In one example, the carbon dioxide-infused article 255 is subjected to a third temperature of from about 20 degrees Celsius to about 150 degrees Celsius, optionally from about 20 degrees Celsius to about 100 degrees Celsius, from about 40 degrees Celsius to about 80 degrees Celsius, from about 50 degrees Celsius to about 70 degrees Celsius, or at about 60 degrees Celsius, and, independently, for a time of from about 1 seconds to about 5 minutes, optionally from about 10 seconds to about 2 minutes, from about 30 seconds to about 90 seconds, or form about 45 seconds to about 60 seconds, to expand and foam the foamable material 210 and form the foamed article 265. In some aspects, following the subjecting and expanding, the article retains carbon dioxide gas in the cells of the foamed material, or solubilized carbon dioxide in the foamed article 265, or solubilized carbon dioxide in an additional polymeric material of the article.

In one example, during the subjecting step, the carbon dioxide-infused article 255 is heated by introducing the carbon dioxide-infused article 255 to a water bath 266. As illustrated in FIG. 6 for the case of rolled articles, the roll 219 of the carbon dioxide-infused article 255 is unrolled and the porous spacer 220 is removed to expose the carbon dioxide-infused article 255 for introduction to the water bath 266. Other methods of introducing articles, including articles that have not been rolled, are also contemplated and should be considered disclosed. In the water bath 266, the carbon dioxide-infused article 255 is in contact with water that is at a higher temperature than the carbon dioxide-infused article 255. As such, heat is transferred from the water bath 266 to the carbon dioxide-infused article 255 to cause a phase change of the carbon dioxide 240, thereby expanding and foaming the foamable material 210 to form to the foamed article 265. In one example, the water bath 266 is at a third temperature of from about 20 degrees Celsius to about 90 degrees Celsius, or from about 50 degrees Celsius to about 70 degrees Celsius, or about 60 degrees Celsius, and, independently, the carbon dioxide-infused article 255 is soaked in the water bath 266 for a time of from about 2 seconds to about 30 minutes, optionally from about 10 seconds to about 30 minutes, from about 30 seconds to about 20 minutes, from about 30 seconds to about 10 minutes, or from about 30 seconds to about 5 minutes, to form the foamed article 265. In an alternative example, water in the form of steam is used to heat the carbon dioxide-infused article 255. In particular, the temperature of the carbon dioxide-infused article 255 is increased by subjecting the carbon dioxide-infused article 255 to steam. In one example, steam is used to heat the carbon dioxide-infused 255 to a third temperature of from about 60 degrees Celsius to about 150 degrees Celsius, optionally from about 60 degrees Celsius to about 100 degrees Celsius, or from about 75 degrees Celsius to about 90 degrees Celsius to cause a phase change of the carbon dioxide 240 to carbon dioxide gas, thereby expanding and foaming the foamable material 210 to form to the foamed article 265.

In another example, the carbon dioxide-infused article 255 can be heated by subjecting the carbon dioxide-infused article 255 to microwave energy using a microwave generating device or to radio frequency (RF) energy using an RF generating device 268 (schematically illustrated in FIG. 7).

In particular, heat is generated in the carbon dioxide-infused article 255 by absorbing the microwave energy or RF energy to cause a phase change of the carbon dioxide 240, thereby expanding and foaming the foamable material 210 to form to the foamed article 265. In one example, the carbon dioxide-infused article 255 is heated by the microwave energy or RF energy to a third temperature of from about 60 to about 150 degrees Celsius, optionally from about 60 degrees Celsius to about 100 degrees Celsius, or from about 75 degrees Celsius to about 90 degrees Celsius, and, independently, for a time of from about 2 seconds to about 5 minutes, optionally from about 10 seconds to about 2 minutes, or from about 30 seconds to about 1 minute to form the foamed article 265.

Referring to FIG. 7, the process continues by optionally bringing (step 311) the foamed article 265 to a fourth temperature and fourth pressure and holding the foamed article at or below the fourth temperature, the fourth pressure, or both, to form a stabilized foamed thermoplastic article. The stabilized foamed article can be formed in a net shape or can be trimmed, machined, or otherwise tailored to a desired shape to define the shape of a foamed article. Removal of residual carbon dioxide (step 312) is accomplished by optionally holding the foamed article at a fifth temperature and fifth pressure, e.g., in an oven 314. Following removal of residual carbon dioxide, the foamed article can be cooled to room temperature (step 316) by any means including, but not limited to, removing the foamed article from oven 314 and allowing it to equilibrate with room temperature air.

Referring to FIG. 7, in one aspect, the foamed article can be used to manufacture an article, such as an article of sporting equipment, an article of apparel, or an article of footwear (optional step 317). In one aspect, the foamed article 319 can be combined with a second component (e.g., affixed, step 320) to form a finished article 317. In some aspects, the foamed article as described above can be a foamed footwear component. Further in this aspect, the foamed footwear component and a footwear upper 322 and/or a footwear outsole 324 can be affixed (step 320) to make a finished article of footwear.

Property Analysis and Characterization Procedures

Specific Gravity/Density Test Protocol. The specific gravity (S.G.) or density is measured for samples taken using the Component Sampling Procedure as described herein, using a digital balance or a Densicom Tester (Qualitest, Plantation, Florida, USA). Each sample is weighed and then is submerged in a distilled water bath (at 22 degrees Celsius plus or minus 2 degrees Celsius). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated using the following formula:

$$S.G. = \frac{\text{Weight of the sample in air (g)}}{\text{Weight of sample in air (g)} - \text{Weight of sample in water (g)}}$$

Melting Temperature, Glass Transition Temperature, and Enthalpy of Melting Test Protocol. The melting temperature and glass transition temperature are determined using a commercially available Differential Scanning Calorimeter ("DSC") in accordance with ASTM D3418-97, using a sample prepared using the Material Sampling Procedure. Briefly, a 10-15 gram sample is placed into an aluminum DSC pan and then the lid is sealed with a crimper press. The DSC is configured to scan from −100 degrees Celsius to 225 degrees Celsius with a 20 degree Celsius per minute heating rate, hold at 225 degrees Celsius for 2 minutes, and then cool down to 25 degrees Celsius at a rate of −10 degrees Celsius per minute. The DSC curve created from this scan is then analyzed using standard techniques to determine the glass transition temperature and the melting temperature. The enthalpy of melting is calculated by integrating the area of the melting endotherm peak and normalizing by the sample mass.

Alternatively, glass transition temperature can be determined using Dynamic Mechanical Analysis (DMA). In this technique, a piece of the foamable material in the form of a film about 1 millimeter thick, about 5 millimeters to about 10 millimeters wide and about 20 millimeters long is mounted on a film tension fixture of a DMA apparatus. The sample is heated over a pre-determined temperature range at a fixed rate of, for example, about 1 degree Celsius to about 5 degrees Celsius per minute. During heating, the sample is tested at fixed frequency (e.g., about 1 Hertz) and a small oscillation amplitude (e.g. about 0.05 percent strain). The storage modulus (or complex shear) is recorded. In the DMA plot, G' is the storage modulus and G" is the loss modulus. G' measures the energy stored and G" measures the energy lost/dissipated as heat. Tan delta is the ratio of G"/G' and the peak region in the tan delta curve is indicative of the glass transition temperature of the sample.

Shore A Hardness Test Protocol. The hardness of a material is determined according to the test protocol detailed in ASTM D-2240 Durometer Hardness, using a Shore A scale. The sample is prepared using the Material Sampling Procedure and/or the Component Sampling Procedure.

Asker C Hardness Test Protocol. For flat foams, the sample is a minimum of 6 millimeters thick for Asker C durometer testing. If necessary, foam samples are stacked to make up the minimum thickness. Foam samples are large enough to allow all measurements to be performed at a minimum of 12 millimeters from the edge of the sample and at least 12 millimeters from any other measurement. Regions tested are flat and parallel with an area at least 6 millimeters in diameter. Standard samples have dimensions of approximately 35 centimeters by 13 centimeters by 1.8 centimeters and a minimum of 5 hardness measurements are taken and tested using a 1 kilogram heat weight. The sample is prepared using the Material Sampling Procedure and/or the Component Sampling Procedure.

Split-Tear Test Protocol. The test protocol used to obtain the split-tear values for foam articles is as follows. The sample is prepared using the Material Sampling Procedure and/or the Component Sampling Procedure. Four die-cut, rectangular-shaped samples of slab sheet or molded foam are prepared, each measuring 2.54 centimeters by 15.24 centimeters by 10±1 millimeter (thickness). If the foam material to be tested had a skin or barrier layer, the skin or barrier layer is removed before preparing the four samples. A 3 centimeter long cut is made in the center from one end of the sample. Then, five successive 2 centimeter portions are marked on the sample.

The crosshead speed of the tensile test apparatus is set at 50 millimeters per minute. Each separated end of the sample is clamped in an upper grip and a lower grip of the test apparatus. The separation is placed in the middle between both grips. Each section of the sample is held in a clam in such a manner that the original adjacent cut edges forms a straight line joining the centers of the clamps.

As needed, the cut is aided with a sharp knife to keep separating the foam material in the center of the sample. Readings caused by cutting with the knife are discarded. The lowest values for each of the five portions of each sample are recorded in kilograms per centimeter. Five values are recorded for each sample and an average of the five values is then obtained and reported. If a portion of a sample includes a portion having an air bubble more than 2 millimeters in diameter, the value for the portion including the air bubble is not included in the average. If more than one portion of a sample is found to include air bubbles having a diameter greater than 2 millimeters, another sample is then tested.

Sampling Procedures

Using the Test Protocols described above, various properties of the materials disclosed herein and articles formed therefrom can be characterized using samples prepared with the following sampling procedures.

Material Sampling Procedure. The Material Sampling Procedure can be used to obtain a neat sample of a polymeric material or of a polymer, or, in some instances, a sample of a material used to form a polymeric material or a polymer. The material is provided in media form, such as flakes, granules, powders, pellets, or the like. If a source of the polymeric material or polymer is not available in a neat form, the sample can be cut from a component or element containing the polymeric material or polymer, such as a composite element or a sole structure, thereby isolating a sample of the material.

Component Sampling Procedure. This procedure can be used to obtain a sample of a material from a component of an article of footwear, an article of footwear, a component of an article of apparel, an article of apparel, a component of an article of sporting equipment, or an article of sporting equipment. A sample including the material in a non-wet state (e.g., at 25 degrees Celsius and 20 percent relative humidity) is cut from the article or component using a blade. If the material is bonded to one or more additional materials, the procedure can include separating the additional materials from the material to be tested.

The sample is taken at a location along the article or component that provides a substantially constant material thickness for the material as present on the article or component (within plus or minus 10 percent of the average material thickness). For many of the test protocols described above, a sample having a surface area of 4 square centimeters is used. The sample is cut into a size and shape (e.g., a dogbone-shaped sample) to fit into the testing apparatus. In cases where the material is not present on the article or component in any segment having a 4 square centimeter surface area and/or where the material thickness is not substantially constant for a segment having a 4 square centimeter surface area, sample sizes with smaller cross-sectional surface areas can be taken and the area-specific measurements are adjusted accordingly.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

This disclosure is not limited to particular aspects, embodiments, or examples described, and as such can, of course, vary. The terminology used herein serves the purpose of describing particular aspects, embodiments, and examples only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges can independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects, embodiments and examples described and illustrated herein has discrete components and features which can be readily separated from or combined with the features of any of the other several aspects, embodiments, and examples without departing from the scope or spirit of the present disclosure. Any recited method can be carried out in the order of events recited or in any other order that is logically possible.

Although any methods and materials similar or equivalent to those described herein can also be used in the practice or testing of the present disclosure, the preferred methods and materials are now described. Functions or constructions well-known in the art cannot be described in detail for brevity and/or clarity. Aspects of the present disclosure will employ, unless otherwise indicated, techniques of nanotechnology, organic chemistry, materials science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as "hard segments" include segments including a urethane linkage, which can be formed from reacting an isocyanate with a polyol to form a polyurethane. Examples of segments often referred to as "soft segments" include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

The terms "Material Sampling Procedure" and "Component Sampling Procedure" as used herein refer to the respective sampling procedures and test methodologies described in the Property Analysis and Characterization Procedure section. These sampling procedures and test methodologies characterize the properties of the recited materials, films, articles and components, and the like, and are not required to be performed as active steps in the claims.

The term "about," as used herein, can include traditional rounding according to significant figures of the numerical value. In some aspects, the term about is used herein to mean a deviation of 10 percent, 5 percent, 2.5 percent, 1 percent, 0.5 percent, 0.1 percent, 0.01 percent, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and can have a singular or plural connotation depending upon the context in which it is used.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the phrase "consists essentially of" or "consisting essentially of" refer to the feature being disclosed as having primarily the listed feature without other active components (relative to the listed feature) and/or those that do not materially affect the characteristic(s) of the listed feature. For example, the foamable material can consist essentially of a foamable material, which means that foamable material can include fillers, colorants, etc. that do not substantially interact with or interact with the change the function or chemical characteristics of the foamable material. In another example, the foamable material can consist essentially of a thermoplastic polyurethane, which means that the thermoplastic polyurethane does not include a sufficient amount of another type of thermoplastic elastomer to alter the properties (e.g., melting temperature, surface energy of the mixture compared to the pure thermoplastic polyurethane, or the like) of the thermoplastic polyurethane.

Further in this aspect, when the thermoplastic elastomer consists essentially of one polymer type (e.g., a thermoplastic polyurethane), it may contain less than 1 weight percent of another type of polymer.

As used herein, the terms "at least one" and "one or more of" an element are used interchangeably, and have the same meaning that includes a single element and a plurality of the elements, and can also be represented by the suffix "(s)" at the end of the element. For example, "at least one polyurethane", "one or more polyurethanes", and "polyurethane(s)" can be used interchangeably and have the same meaning.

As used herein, "gas" and "vapor" refer to fluid phases of a substance such as, for example, carbon dioxide, wherein the distance between adjacent molecules is large and there are few or no interactions between the atoms or molecules of the substance. Gases and vapors typically expand to fill containers in which they are placed. In some aspects, "vapor" can be used specifically to refer to a substance in the gas phase that is in equilibrium with or exists within a container alongside a solid or liquid phase of the same substance.

As used herein, a "sheet" or "film" refers to a flexible strip comprising one or more polymeric materials, the sheet or film having a thickness that is much smaller than its length and/or width.

As used herein, "physically-expanded" refers to foams, foamed materials, and foamed articles, that have been expanded from an initial solid, un-foamed state through the action of a physical expansion agent. In one aspect, the physically-expanded foams, foamed materials, and foamed articles become expanded when carbon dioxide infused in solid foamable materials is brought to temperature and pressure conditions wherein the carbon dioxide phase transitions to a gas, thereby physically expanding the solid foamable materials.

As used herein, "solid material" refers to a material in an unfoamed state, i.e., a material which is in its solid phase at room temperature and under atmospheric pressure, and which does not have a multi-cellular foam structure. The solid material may be a foamable material that has not been expanded through a foaming process, or may be a material that is not foamable using the methods described herein, such as, for example, a barrier material. Additionally the solid material can be a thermoplastic material which was previously foamed using a method disclosed herein or using a different foaming method, and which has subsequently been recycled by thermally softening or melting the foamed material to an extent that its foamed structure has fully collapsed. In one aspect, a foamable solid material does not melt during the foaming process. In another aspect, a foamable solid material does not thermally soften during the foaming process.

EXAMPLES

The present disclosure is more particularly described in the following examples that are intended as illustrations only, since numerous modifications and variations within the scope of the present disclosure will be apparent to those skilled in the art.

Figure 11A:
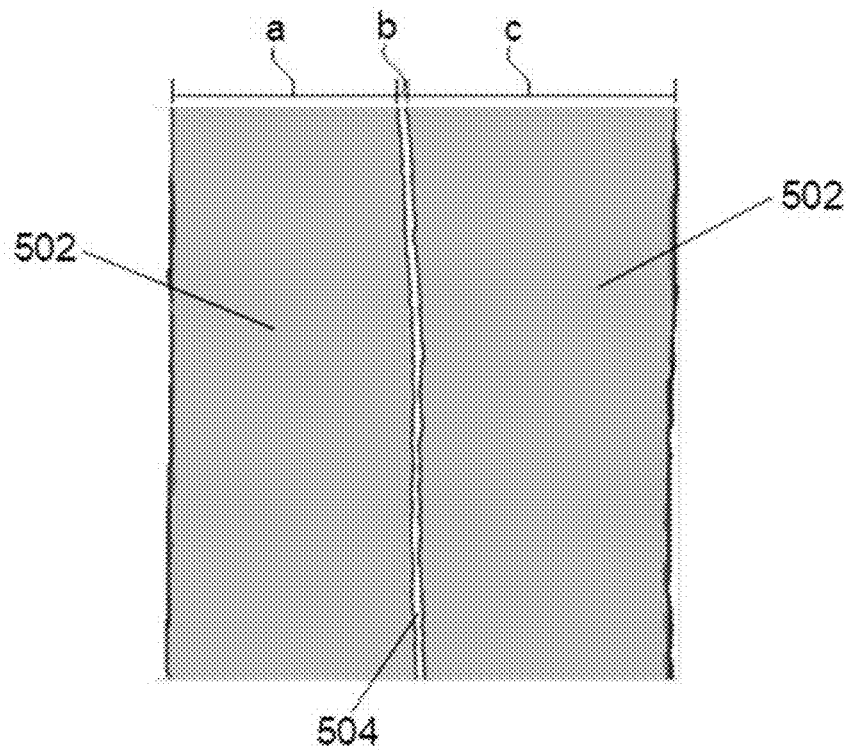
FIGS. 11A-11F are schematics of multilayered articles according to an exemplary embodiment, prior to foaming (FIGS. 11A, 11C, and 11E) and after foaming (FIGS. 11B, 11D, and 11F).
Figure 11B:
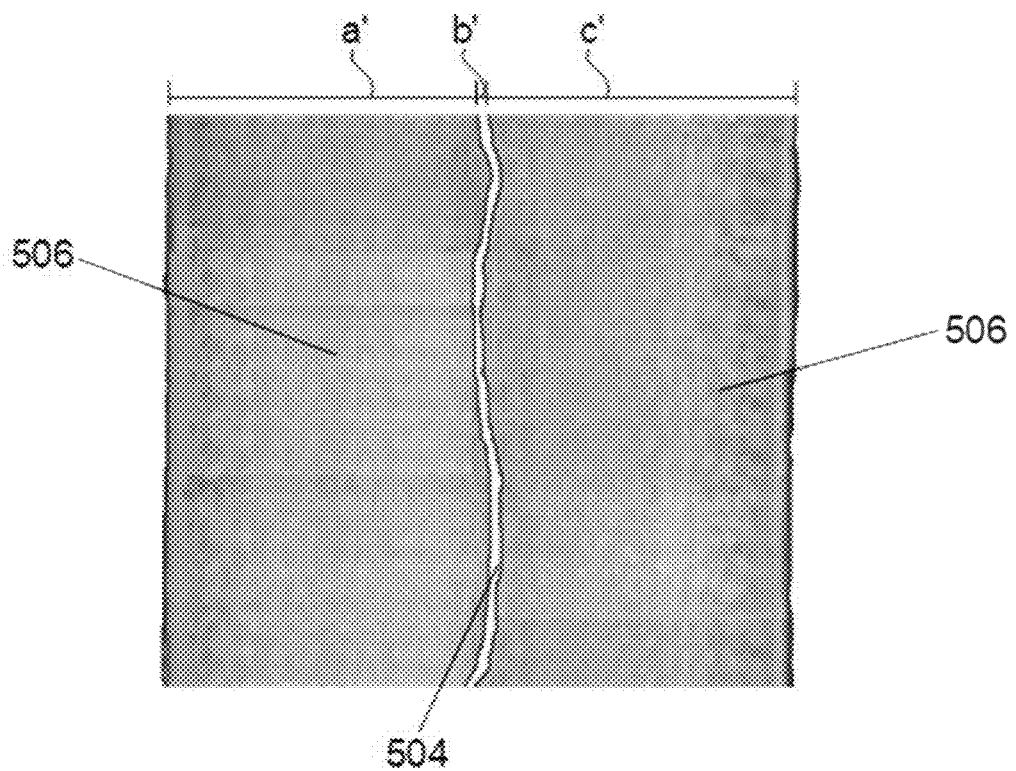

Change in Thickness of Foamable Material on Foaming. FIGS. 11A-11F are schematics of a cross-section of a sheet consisting of a central core of a barrier material 504 sandwiched between two layers of another material. FIG. 11A shows an exemplary sheet prior to undergoing a foaming process as described herein, while FIG. 11B shows the sheet after undergoing the foaming process, where the foamable material has expanded to foamed material 506, where a represents a thickness of a first layer of solid foamable material 502 prior to foaming, b represents a thickness of a barrier layer 504 prior to foaming, and c represents a thickness of a second layer of solid foamable material 502 prior to foaming. After foaming, thickness of the first layer of foamed material 506 is shown as a', thickness of the barrier material 504 is shown as b', and thickness of the second layer of foamed material 506 is shown as c', where a' and c' are greater than a and c, respectively, while b' is substantially unchanged compared to b. However, the surface geometry of barrier material 504 may or may not become distorted following foaming as the result of expansion of layers adjacent to barrier material 504 during the foaming process.

Figure 11C:
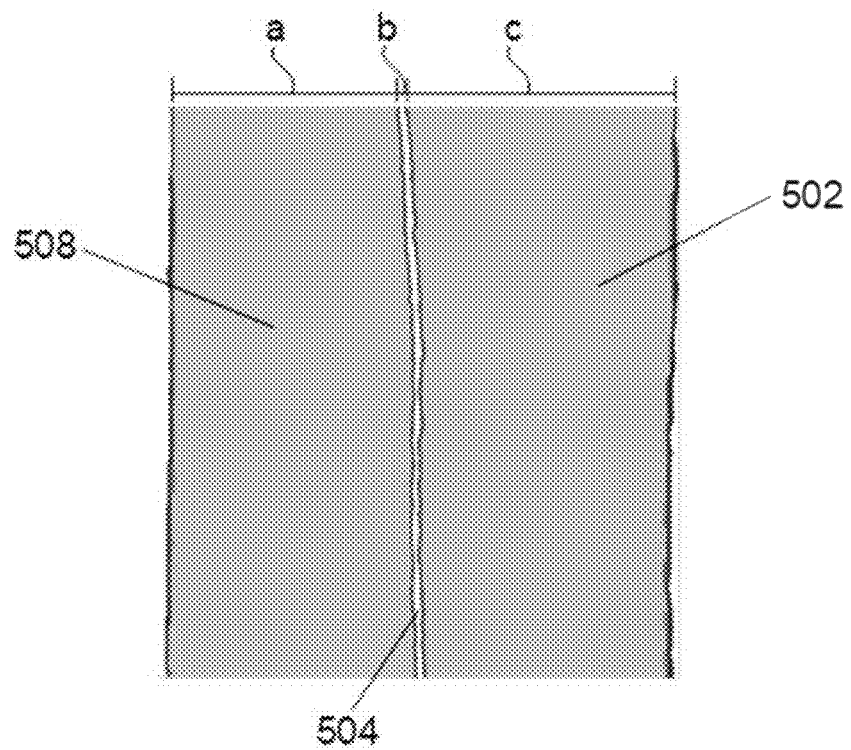
Figure 11D:
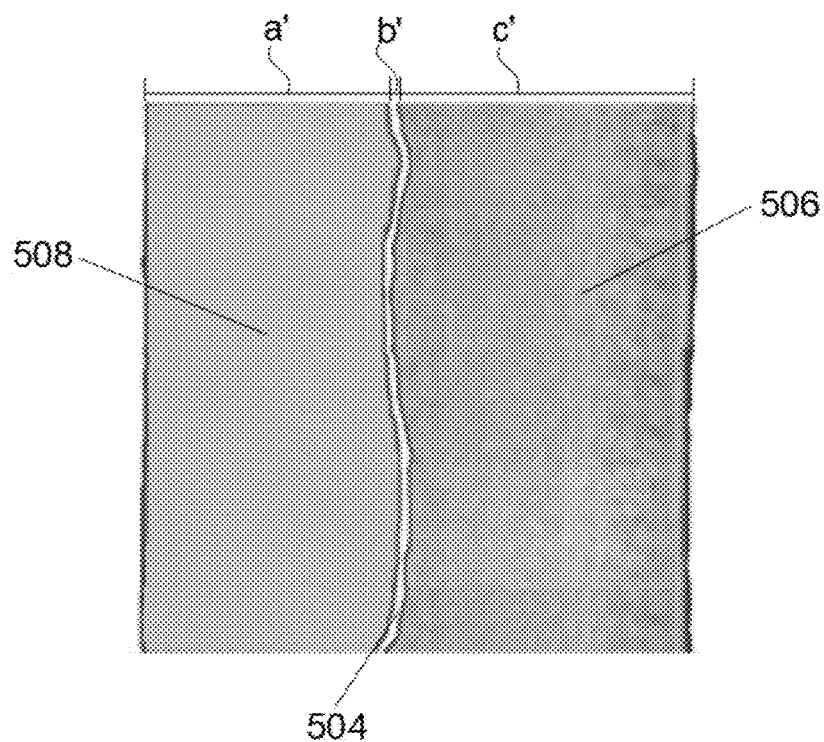

FIG. 11C shows another exemplary sheet prior to undergoing a foaming process as described herein, while FIG. 11D shows the sheet after undergoing the foaming process, where the foamable material has expanded to foamed material 506, where a represents a thickness of a first layer of material 508 prior to foaming, b represents a thickness of a barrier layer 504 prior to foaming, and c represents a thickness of a layer of solid foamable material 502 prior to foaming. Material 508 can be a foamable material not infused with carbon dioxide, a foamable material infused with carbon dioxide that fully dissipates prior to foaming, or a material with low carbon dioxide solubility. After foaming, thickness of the first layer of material 508 is shown as a', thickness of the barrier material 504 is shown as b', and thickness of the layer of foamed material 506 is shown as c', where c' is greater than c, while a' and b' are substantially unchanged compared to a and b, respectively. The surface geometry of barrier material 504 may or may not become distorted following foaming as the result of expansion of layers adjacent to barrier material 504 during the foaming process.

Figure 11E:
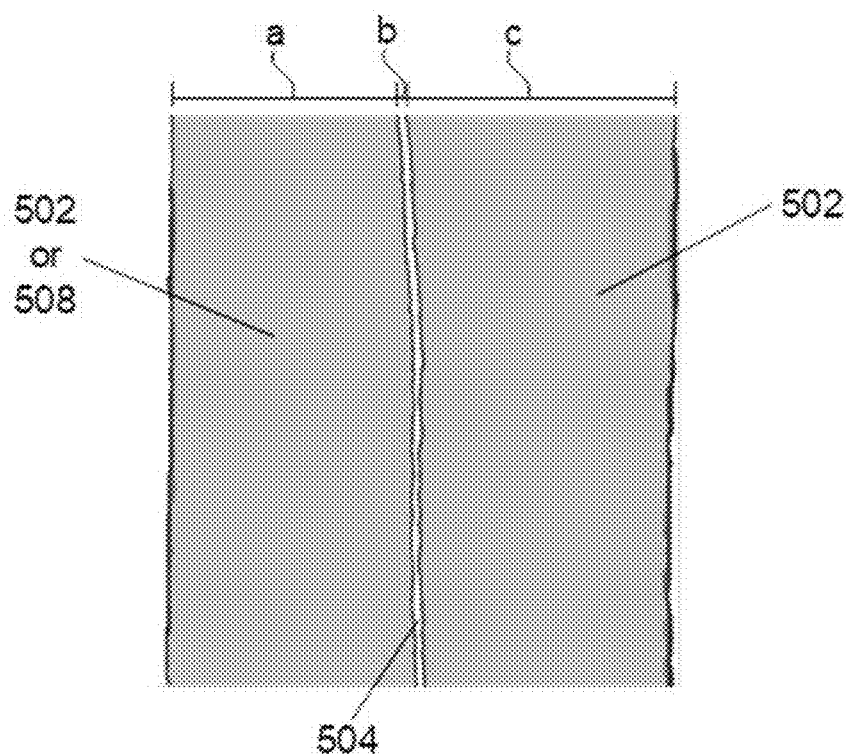
Figure 11F:
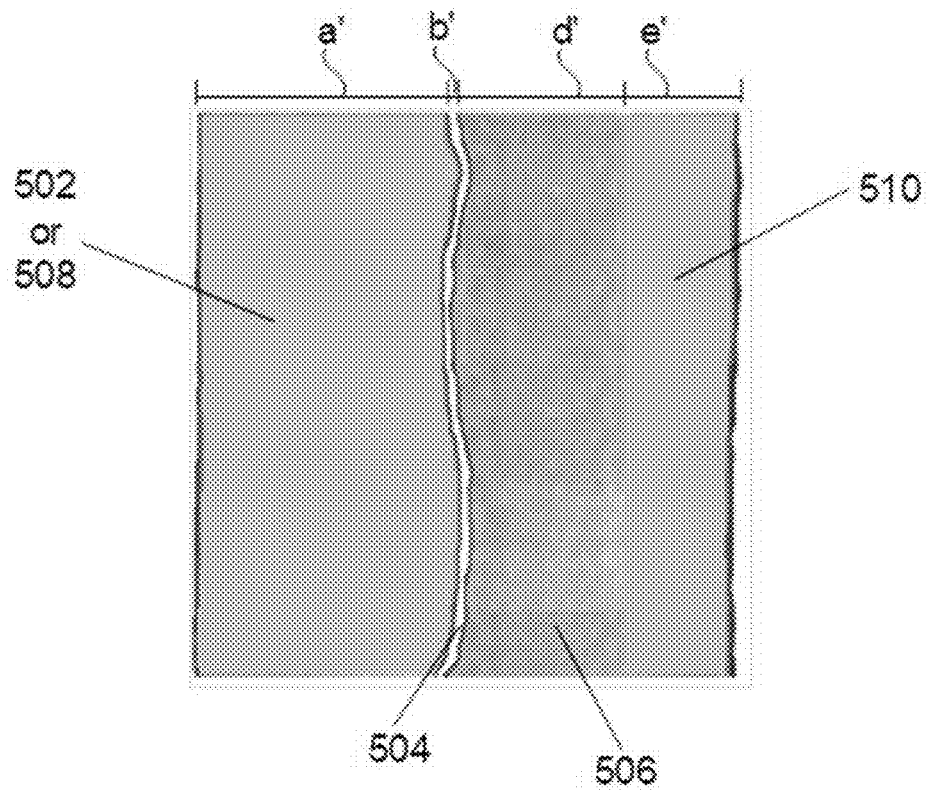

FIG. 11E shows another exemplary sheet prior to undergoing a foaming process as described herein, while FIG. 11F shows the sheet after undergoing the foaming process, where at least a portion the foamable material has expanded to foamed material 506, while another portion of the foamable material 510 does not expand to a foamed material due to dissipation of carbon dioxide from this portion of the foamable material prior to conducting the foaming process. In this instance, a represents a thickness of a first layer of material 502 or 508 prior to foaming, wherein 502 and 508 are consistent with the previous descriptions, b represents a thickness of a barrier layer 504 prior to foaming, and c represents a thickness of a layer of solid foamable material 502 prior to foaming. After foaming, thickness of the first layer of material 502 or 508 is shown as a', thickness of the barrier material 504 is shown as b', and the thickness of the layer of foamed material 506 is shown as d' and the thickness of the portion of the layer of foamable material from which carbon dioxide dissipates is shown as e', where the sum of d' and e' is greater than c, while a' and b' are substantially unchanged compared to a and b, respectively. The surface geometry of barrier material 504 may or may not become distorted following foaming as the result of expansion of layers adjacent to barrier material 504 during the foaming process.

Different foamable materials can expand in thickness by different amounts depending on experimental conditions. Conditions and results for exemplary systems as demonstrated in FIGS. 11A-11F are presented in Table 1 below, where barrier material 504 comprises ethylene vinyl alcohol ("EVOH") and the foamable material comprises a thermoplastic polyurethane ("TPU"):

TABLE 1

Example Foaming Conditions

| | Example System 1 | Example System 2 |
|---|---|---|
| Carbon Dioxide Infusion Temperature (degrees Celsius) | 25 | 25 |
| Carbon Dioxide Infusion Pressure (pounds per square inch) | 1500 | 1500 |
| Carbon Dioxide Infusion Time (hours) | 1 | 1 |
| Water Bath Temperature (degrees Celsius) | 40 | 60 |
| Water Bath Time (minutes) | 1 | 1 |
| Oven Temperature (degrees Celsius) | 50 | 50 |
| Oven Time (minutes) | 30 | 30 |
| Shrinkage of EVOH Layer Due to Stretching (micrometers) | <3 | <4 |
| Increase in Thickness of Thermoplastic Polyurethane Layers Due to Foaming (micrometers) | 26 (<5 percent) | 69 (<13 percent) |

Foaming Selected Portions of the Articles. FIGS. 12A-12K are schematics of a cross-section of a foamable article at various stages during the foaming process and illustrate several different scenarios for selectively foaming one or more portions of a foamable article while leaving other portions unfoamed. While these scenarios are illustrated using an article comprising a single solid foamable material (e.g., a first solid foamable material), it is to be understood that these scenarios apply to articles comprising one or more solid foamable materials (a first solid foamable material, a second solid foamable material, an additional solid foamable material, etc.), alone or in combination with non-foamable materials (e.g., a barrier material, an additional non-foamable material, etc.).

Figure 12A:
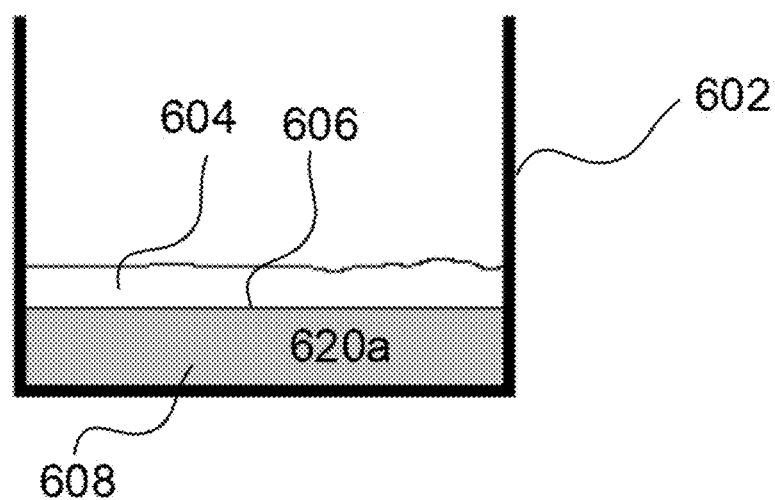
FIGS. 12A-12K are schematics of foamable articles according to an exemplary embodiment, wherein selected portions of foamable articles can be foamed through controlled infusion and diffusion of carbon dioxide into and/or out of all or part of the articles prior to performing the expanding step disclosed herein, while leaving other portions of the articles unfoamed.
Figure 12B:
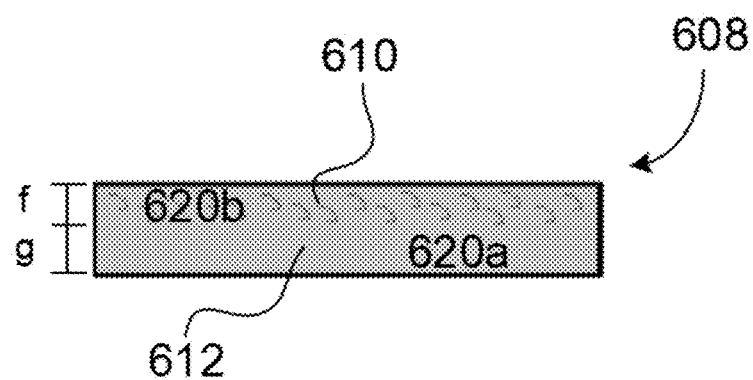
Figure 12C:
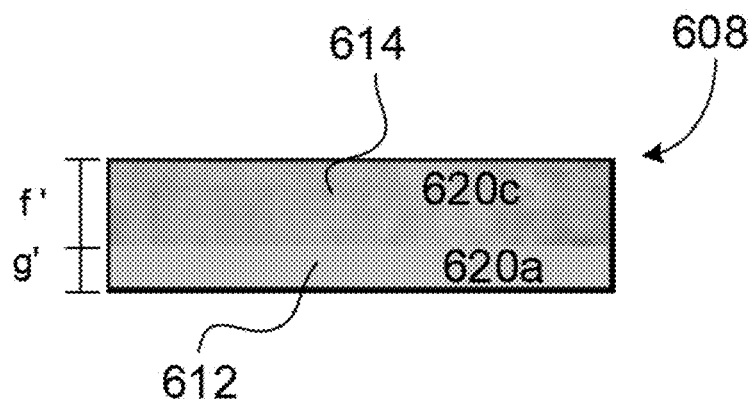

A first scenario is illustrated in FIGS. 12A-12C. In this scenario, as shown in FIG. 12A, a foamable article 608 comprising a solid foamable material 620a is placed at the bottom of a vessel 602, or against another surface of the vessel 602, which is then charged with carbon dioxide such that a single surface 606 of the article 608 including the solid foamable material 620a is exposed to liquid carbon dioxide 604. Since only one surface 606 on one side of the article 608 is exposed to the liquid carbon dioxide 604, only the exposed portion of the solid foamable material 620a of the article 608 becomes infused with carbon dioxide. FIG. 12B shows a cross section of the solid foamable material 620 of foamable article 608 of FIG. 12A at after the infusing and immediately prior to expanding the foamable material. In this stage, the solid foamable material 620b of foamable article 608 is partially infused with carbon dioxide and includes both infused 610 portion containing infused solid foamable material 620b and uninfused portions 612 containing uninfused solid foamable material 620a, where f represents a thickness of the infused portion 610 prior to foaming and g represents a thickness of the uninfused portion 612 prior to foaming. Finally, FIG. 12C shows a cross section of the same region of article 608 as shown in FIG. 12B after the step of expanding has been carried out, and the infused solid foamable material has become foamed material 620c, while the uninfused solid foamable material 620a remains unfoamed. The foamed material 620c of foamable article 608 that had been infused with carbon dioxide (portion 610 in FIG. 12B) 614 has expanded into a foamed state, with the foamed portion 614 having thickness f', where f' is greater than f, while the uninfused portion of the solid foamable material 620a of the article 612 remains solid and unfoamed, having a thickness g' which is substantially the same as thickness g.

Figure 12D:
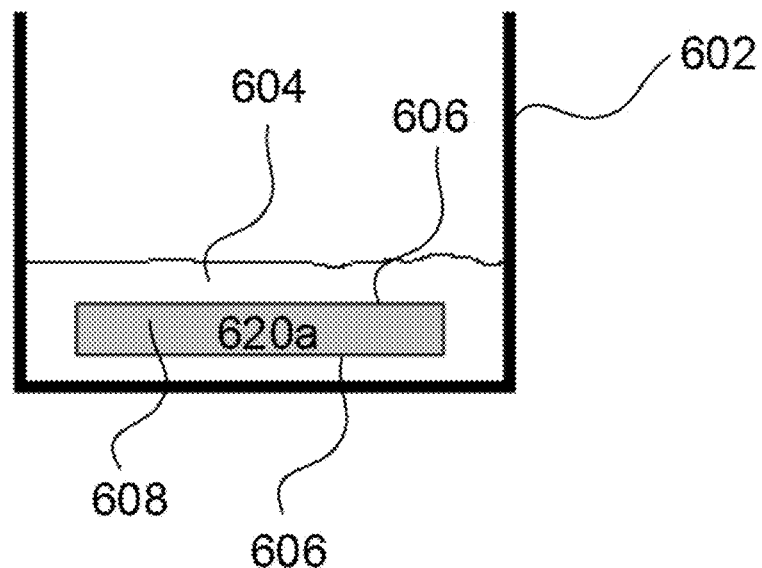
Figure 12E:
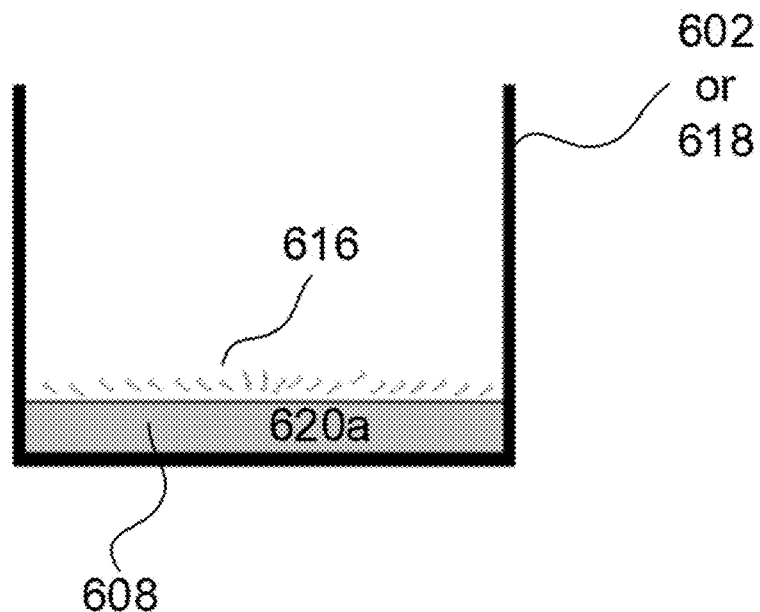
Figure 12F:
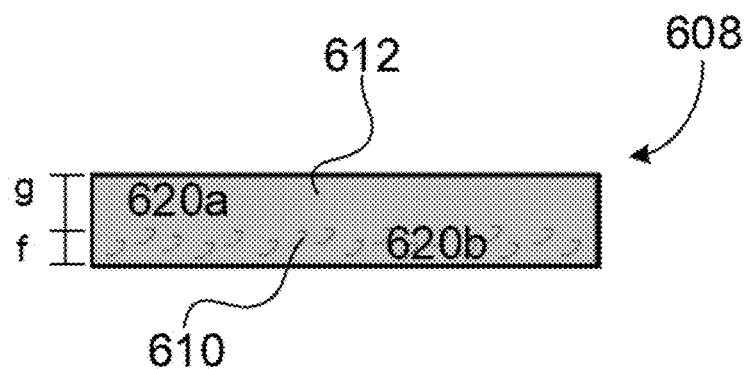
Figure 12G:
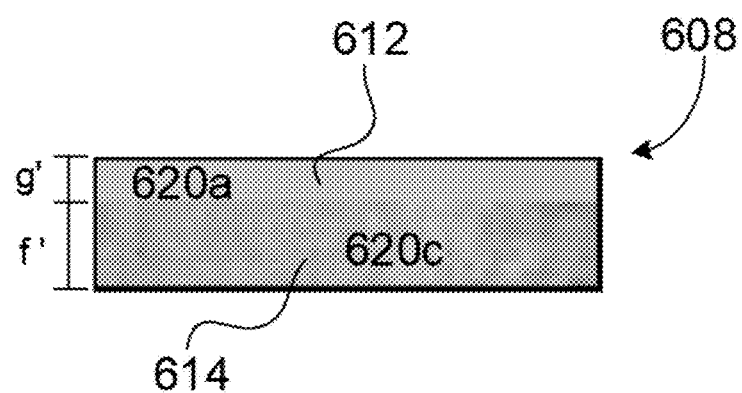

A second scenario is illustrated in FIGS. 12D-12G. In this second scenario, as illustrated in FIG. 12D, a foamable article 608 comprising a solid foamable material 620a is placed in a vessel 602 which has been charged with carbon dioxide such that one or more exterior surfaces 606 of the article 608 comprising the solid foamable material 620a are exposed to liquid carbon dioxide 604 and become infused with carbon dioxide. The carbon dioxide can then be discharged from the vessel 602, or the foamable article 608 can be placed in an oven or other controlled environment 618 such that at least one surface of the article 608 is placed against the side of the vessel or oven, allowing carbon dioxide to diffuse 616 from one or more surfaces of the article 608 comprising the solid foamable material 620a that are not in contact with a side of the vessel 602 or oven 618, as in FIG. 12E. FIG. 12F shows a cross section of the foamable article 608 of FIGS. 12D-12E after the infusing and immediately prior to expanding the infused portion of the solid foamable material 620b. In this stage, the solid foamable material of the foamable article 608 is partially infused with carbon dioxide and includes both infused portion 610 containing infused solid foamable material 620b and uninfused portion 612 containing uninfused solid foamable material 620a, where f represents a thickness of the infused portion 610 prior to foaming and g represents a thickness of the uninfused portion 612 prior to foaming. Finally, FIG. 12G shows a cross section of the same region of article 608 from FIGS. 12D-12F after the step of expanding has been carried out, and the infused portion of the solid foamable material (620b in FIG. 12F) has been foamed, forming foamed material 620c. The portion of the solid foamable material 620b of the article that had been infused with carbon dioxide has expanded into a foamed material 620c in foamed portion 614 having thickness f', where f' is greater than f, while the uninfused portion of the solid foamable material 620a of article 612 remains solid and unfoamed, having a thickness g' which is substantially the same as thickness g.

Figure 12H:
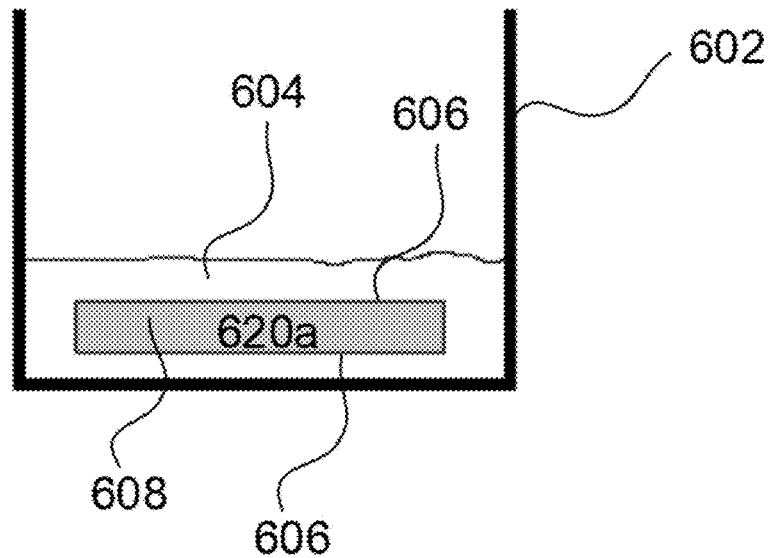
Figure 12I:
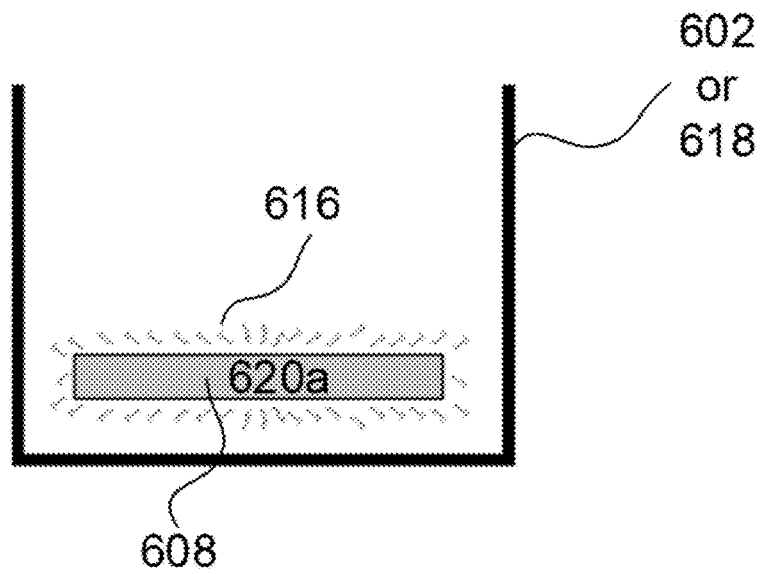
Figure 12J:
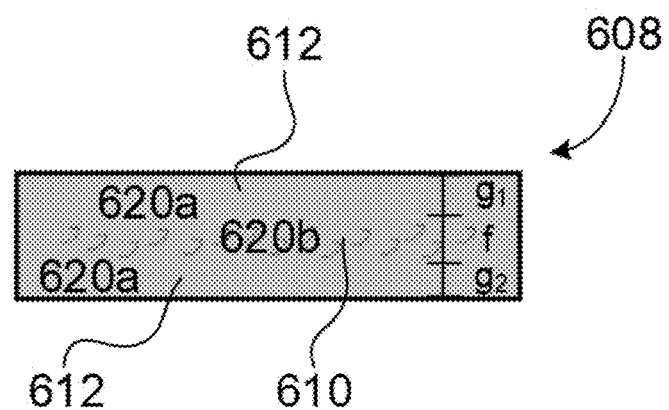
Figure 12K:
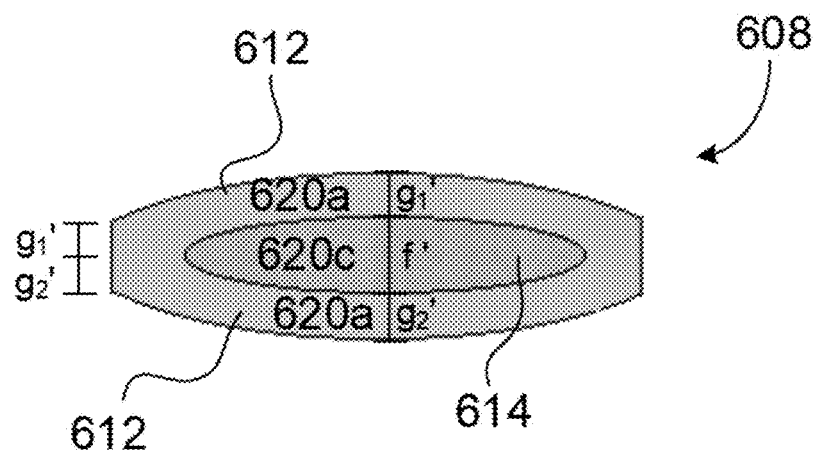

A third scenario is illustrated in FIGS. 12H-12K. In this third scenario, as illustrated in FIG. 12H, a foamable article 608 comprising a solid foamable material 620a is be placed in a vessel 602 which has been charged with carbon dioxide 604 such that the solid foamable material 620a on all exterior surfaces 606 of the article 608 are exposed to liquid carbon dioxide 604 and become infused with carbon dioxide. The carbon dioxide can then be discharged from the vessel 602, or the foamable article 608 can be placed in an oven or other controlled environment 618, allowing carbon dioxide to diffuse from the solid foamable material 620a on all surfaces of the article 608 that are not in contact with a side of the vessel 602 or oven 618, as in FIG. 12I. FIG. 12J shows a cross section of the foamable article 608 of FIGS. 12H-12I after infusing and immediately prior to expanding the carbon dioxide-infused solid foamable material 620b. In this stage, the article 608 is partially infused with carbon dioxide and includes both infused portion 610 containing infused solid foamable material 620b and uninfused portion 612 containing uninfused solid foamable material 620a, where f represents a thickness of the infused portion 610 prior to foaming and $g_1$ and $g_2$ represent thicknesses of the uninfused portions 612 surrounding the infused portion 610, prior to foaming. Finally, FIG. 12K shows a cross section of the same region of article 608 as FIGS. 12H-12J after the step of expanding the solid foamable material into a foamed material 620c has been carried out. The portion of the article 608 that had been infused 610 with carbon dioxide 614 has expanded into a foamed state 614 containing foamed material 620c having thickness f', where f' is greater than f, while the uninfused portions 612 of the solid foamable material 620a of article 608 remain solid and unfoamed, having thicknesses $g_1'$ and $g_2'$ which are substantially the same as thicknesses $g_1$ and $g_2$, respectively.

Combinations of the above scenarios are also envisioned. For example, a combination of the first scenario and the second scenario, where carbon dioxide 614 is first infused into two or more surfaces 606 of the article and then the carbon dioxide 614 is then dissipated from two or more surfaces 606 of the article 608, could result in an article comprising both foamed and unfoamed material having a cross section similar to that shown in FIG. 12K.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

What is claimed is:

1. A method for making a foamed article, the method comprising:
    placing an article and carbon dioxide ($CO_2$) in a vessel, wherein the article comprises a foamable fibrous element including a first plurality of filaments, fibers, yarns, or any combination thereof, the first plurality of filaments, fibers, yarns, or any combination thereof comprising a solid foamable material which is a thermoplastic elastomeric material comprising one or more first thermoplastic elastomers;
    after the placing, maintaining the vessel at a first pressure and first temperature, wherein the first pressure and first temperature are a pressure and temperature at which the carbon dioxide is a liquid and the liquid carbon dioxide is soluble in the solid foamable material, and wherein the maintaining includes holding the article and the liquid carbon dioxide in the vessel for a duration of time sufficient for at least a portion of the liquid carbon dioxide to infuse into the solid foamable material of the foamable fibrous element, thereby forming an infused article;
    following the maintaining and holding, optionally exposing the infused article to a second pressure and second temperature at which the carbon dioxide remains infused within at least a portion of the solid foamable material of the foamable fibrous element;
    following the maintaining and holding and the optional exposing, subjecting the infused article to a third pressure and third temperature at which the carbon dioxide infused in the solid foamable material of the foamable fibrous element phase transitions to a gas, thereby expanding the solid foamable material of the foamable fibrous element into a foamed material and forming the foamed article including a foamed foamable fibrous element.

2. The method of claim 1 wherein the foamable fibrous element comprises a first yarn comprising the solid foamable material.

3. The method of claim 2, wherein the foamable fibrous element is a textile element or a portion of a textile element.

4. The method of claim 3, wherein the textile element comprises or consists essentially of a knit textile, a woven textile, a crocheted textile, a braided textile, a tatted textile, a non-woven textile, or any combination thereof.

5. The method of claim 3, wherein the textile element comprises the first yarn, and the first yarn is inlaid in the textile element.

6. The method of claim 3, wherein the textile element comprises a knit textile comprising a first yarn and a second yarn, wherein the first yarn or the second yarn or both the first yarn and the second yarn comprise the solid foamable material.

7. The method of claim 3, wherein the textile element is an upper for an article of footwear.

8. The method of claim 7, wherein a first zone of the textile element comprises the solid foamable material and is configured to form at least a portion of a forefoot opening area and/or an ankle collar area of an article of footwear.

9. The method of claim 1, wherein the one or more first thermoplastic elastomers comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

10. The method of claim 1, wherein the liquid carbon dioxide is soluble in the one or more first thermoplastic elastomers at a concentration of from about 1 weight percent to about 30 weight percent based on a total weight of the one or more first thermoplastic elastomers present in the solid foamable material.

11. The method of claim 1, wherein the article comprises an additional material, wherein the additional material is a separate material from the foamable material.

12. The method of claim 11, wherein the additional material comprises or consists essentially of a second plurality of filaments, fibers, yarns, or any combination thereof, optionally wherein the second plurality of filaments, fibers, yarns, or any combination thereof comprises or consists essentially of the additional material.

13. The method of claim 11, wherein during the expanding step, the additional material remains substantially unfoamed.

14. The method of claim 1, wherein, in the foamed article, the foamed material has a density of from about 0.01 gram per cubic centimeter to about 3.0 grams per cubic centimeter.

15. A foamed article made by the method of claim 1.

16. The foamed article of claim 15, wherein the foamed article is an article of apparel, footwear or sporting equipment, or is a component of an article of apparel, footwear, or sporting equipment.

17. An article of footwear comprising:
    a foamed fibrous element comprising or consisting essentially of a first plurality of filaments, fibers, yarns, or any combination thereof, wherein each of the first plurality of filaments, fibers, yarns, or any combination thereof, is an individual foamed filament, fiber, yarn, or any combination thereof, comprising a first foamed material which is a physically-expanded foam formed of a thermoplastic elastomeric material comprising one or more first thermoplastic elastomers.

18. The article of footwear of claim 17, wherein the foamed material is a product of placing an unfoamed fibrous element comprising the solid foamable material in liquid carbon dioxide, infusing the solid foamable material with the liquid carbon dioxide, and expanding the infused solid foamable material by phase transitioning the infused carbon dioxide into a gas under conditions which do not soften the solid foamable material, thereby forming the foamed material of the foamed article.

19. The article of footwear of claim 17, wherein the foamed fibrous element comprises:
   a first yarn comprising a core and a solid foamed material surrounding the core, optionally wherein the core comprises or consists essentially of a second solid foamed material.

20. The article of footwear of claim 17, wherein the foamable fibrous element is a textile element or a portion of a textile element, and wherein the textile element comprises a non-woven textile having a sheet or web structure comprising the first plurality of filaments, fibers, yarns, or any combination thereof, optionally wherein the plurality of fibers, filaments, or yarns are bonded together.

* * * * *